(12) United States Patent
Kudo

(10) Patent No.: US 10,840,790 B2
(45) Date of Patent: Nov. 17, 2020

(54) VIBRATION POWER GENERATOR

(71) Applicant: Futaba Corporation, Mobara (JP)

(72) Inventor: Shotaro Kudo, Mobara (JP)

(73) Assignee: FUTABA CORPORATION, Chiba (JP)

( * ) Notice: Subject to any disclaimer, the term of this patent is extended or adjusted under 35 U.S.C. 154(b) by 38 days.

(21) Appl. No.: 16/226,171

(22) Filed: Dec. 19, 2018

(65) Prior Publication Data

US 2019/0199188 A1    Jun. 27, 2019

(30) Foreign Application Priority Data

Dec. 25, 2017 (JP) .................. 2017-247946
Dec. 25, 2017 (JP) .................. 2017-247953
Dec. 25, 2017 (JP) .................. 2017-247958
Dec. 25, 2017 (JP) .................. 2017-247963
Dec. 25, 2017 (JP) .................. 2017-247964

(51) Int. Cl.
*H02K 35/02* (2006.01)
*H02K 1/34* (2006.01)
*H02K 11/33* (2016.01)
*H02K 3/47* (2006.01)
*H02K 7/06* (2006.01)

(52) U.S. Cl.
CPC .............. *H02K 35/02* (2013.01); *H02K 1/34* (2013.01); *H02K 3/47* (2013.01); *H02K 11/33* (2016.01); *H02K 7/063* (2013.01)

(58) Field of Classification Search
CPC .............................. H02K 35/00; H02K 35/02
See application file for complete search history.

(56) References Cited

U.S. PATENT DOCUMENTS

| | | | |
|---|---|---|---|
| 2006/0001324 A1* | 1/2006 | Won | H02K 33/16 310/81 |
| 2006/0233415 A1* | 10/2006 | Chung | H04R 9/025 381/396 |
| 2007/0035210 A1* | 2/2007 | Sasaki | H02N 2/025 310/329 |
| 2010/0194117 A1 | 8/2010 | Pabon et al. | |

(Continued)

FOREIGN PATENT DOCUMENTS

| | | |
|---|---|---|
| CN | 103856100 | 6/2014 |
| CN | 104937823 | 9/2015 |

(Continued)

OTHER PUBLICATIONS

Office Action issued in counterpart Japanese Patent Application No. 2017-247963, dated Jan. 7, 2020, 3 pages.

(Continued)

*Primary Examiner* — Dang D Le
(74) *Attorney, Agent, or Firm* — Hamre, Schumann, Mueller & Larson, P.C.

(57) ABSTRACT

A vibration power generator includes a coil attached to a frame and a moving body that is supported on the frame through a spring and has a magnet facing the coil, and relatively moves the moving body with respect to the coil to generate electric power. The moving body has the magnet, a yoke material that is attached to the magnet and forms a magnetic circuit, and a weight member. Average specific gravity of the moving body is 8 g/cm$^3$ or more.

19 Claims, 28 Drawing Sheets

(56) References Cited

U.S. PATENT DOCUMENTS

2017/0366077 A1* 12/2017 Oonishi ................ H02J 1/00
2018/0301969 A1* 10/2018 Takahashi .......... H04M 19/047

FOREIGN PATENT DOCUMENTS

| | | |
|---|---|---|
| CN | 105453397 | 3/2016 |
| JP | H08-043186 | 2/1996 |
| JP | H10-323006 | 12/1998 |
| JP | H11-091271 | 4/1999 |
| JP | 2004-073983 | 3/2004 |
| JP | 2004-215472 | 7/2004 |
| JP | 2011-050245 | 3/2011 |
| JP | 2011-153646 | 8/2011 |
| JP | 2012-015695 | 1/2012 |
| JP | 2012-157184 | 8/2012 |
| JP | 2012-165538 | 8/2012 |
| JP | 2012-198203 | 10/2012 |
| JP | 2013-039021 | 2/2013 |
| JP | 2013-086907 | 5/2013 |
| JP | 2013-121870 | 6/2013 |
| JP | 2013-146175 | 7/2013 |
| JP | 2014-143792 | 8/2014 |
| JP | 2014-165989 | 9/2014 |
| JP | 2014-207767 | 10/2014 |
| JP | 2015-035892 | 2/2015 |
| JP | 2015-097473 | 5/2015 |
| JP | 2016-025762 | 2/2016 |
| JP | 2016-182569 | 10/2016 |
| JP | 2016-201899 | 12/2016 |
| JP | 2017-089559 | 5/2017 |
| JP | 2017-108536 | 6/2017 |
| JP | 2017-116577 | 6/2017 |
| JP | 6149593 | 6/2017 |
| JP | 2017-129579 | 7/2017 |
| JP | 6160089 | 7/2017 |
| JP | 2017-192271 | 10/2017 |
| JP | 2017-210167 | 11/2017 |
| WO | 2017/060940 | 4/2017 |

OTHER PUBLICATIONS

Office Action issued in counterpart Japanese Patent Application No. 2017-247964, dated Jan. 7, 2020, 3 pages.
Office Action issued in counterpart Japanese Patent Application No. 2017-247958, dated Jan. 7, 2020, 3 pages.
Office Action issued in counterpart Japanese Patent Application No. 2017-247953, dated Jul. 2, 2019, 4 pages.
Office Action issued in counterpart Japanese Patent Application No. 2017-247946, dated Jul. 2, 2019, 3 pages.

* cited by examiner

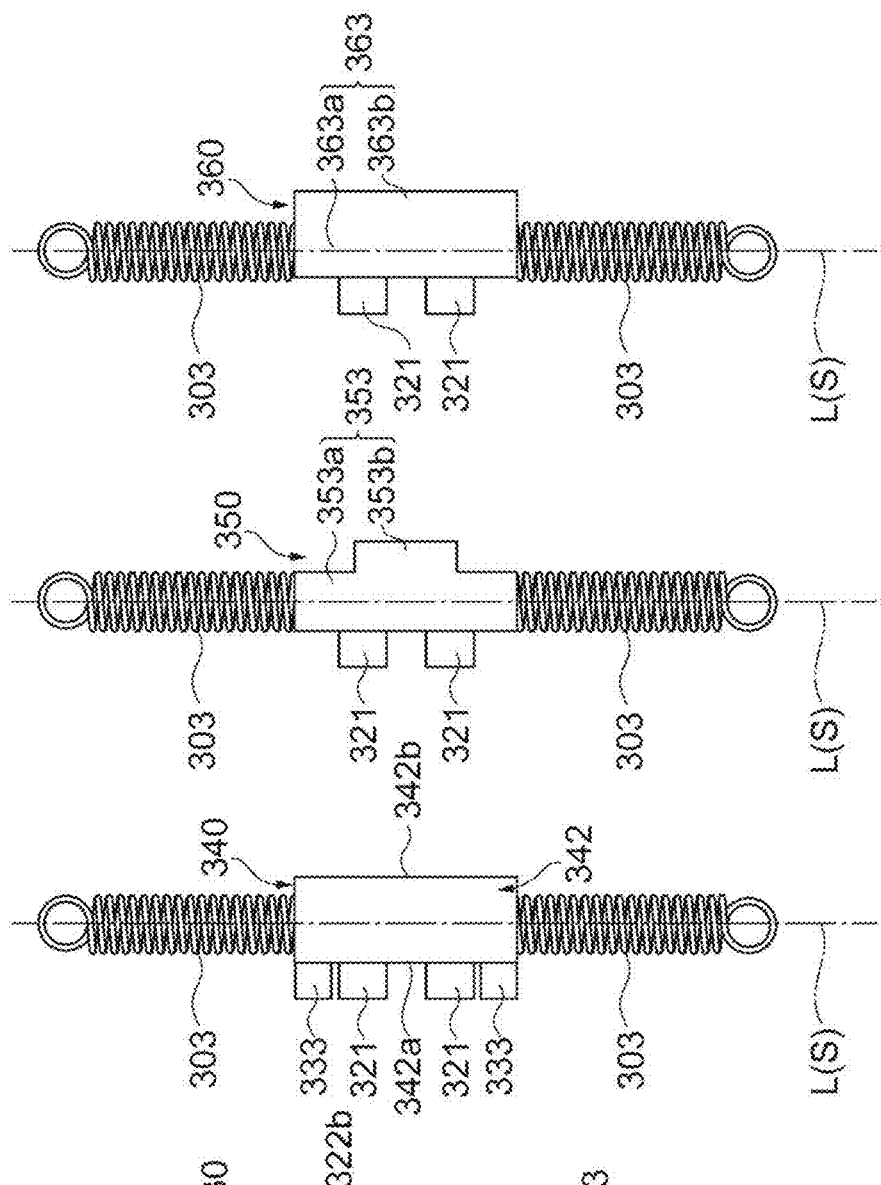

VIBRATION POWER GENERATOR

TECHNICAL FIELD

The present disclosure relates to a vibration power generator.

BACKGROUND

There is a vibration power generator that includes a coil attached to a frame and a magnet supported by the frame through a spring and relatively moves the magnet with respect to the coil by a vibration to generate electric power. Such a vibration power generator is disclosed in, for example, the patent document (Japanese Unexamined Patent Publication No. 2016-25762).

SUMMARY

In such a vibration power generator, the vibration of the magnet may be suppressed due to the influence of a magnetic field generated from the coil during the power generation. When the vibration of the magnet is suppressed, a power generation capacity of the vibration power generator is lowered. Further, in the vibration power generator, it is desired to control a flow of magnetic flux of the magnet for improving the power generation capacity.

The present disclosure describes a vibration power generator capable of reducing that the vibration of the magnet is suppressed due to the influence of the magnetic field generated from the coil during the power generation and improving the power generation capacity by controlling the flow of the magnetic flux of the magnet.

A vibration power generator of the present disclosure includes a coil attached to a frame and a moving body that is supported on the frame through a spring and has a magnet facing the coil, and relatively moves the moving body with respect to the coil to generate electric power. The moving body has the magnet, a yoke material that is attached on a surface of a side opposite to a surface of the magnet facing the coil, and a weight member. Average specific gravity of the moving body is 8 g/cm$^3$ or more.

Since the average specific gravity of the moving body is 8 g/cm$^3$ or more in the vibration power generator, it is possible to increase mass of the moving body. Therefore, when the moving body moves, it is easy to overcome an influence of a magnetic field generated from the coil during power generation in the vibration power generator. Accordingly, the vibration power generator can reduce suppression of a vibration of the magnet due to the influence of the magnetic field generated from the coil during the power generation. Further, since the vibration power generator includes the yoke material that forms a magnetic circuit, it is possible to control a flow of magnetic flux of the magnet. As described above, the vibration power generator can reduce the suppression of the vibration of the magnet due to the influence of the magnetic field generated from the coil during the power generation, and improve a power generation capacity by controlling the flow of the magnetic flux of the magnet.

The weight member may contain a substance having specific gravity of 8 g/cm$^3$ or more. In this case, even when the specific gravity of the magnet and the yoke material is small, the moving body can have the average specific gravity of 8 g/cm$^3$ or more.

The weight member may be formed of a resin containing a powder of the substance having specific gravity of 8 g/cm$^3$ or more. In this case, even when hardness of the substance having specific gravity of 8 g/cm$^3$ or more is hard and thus the substance is difficult to process, it is possible to easily obtain the weight member having a desired shape.

The substance having specific gravity of 8 g/cm$^3$ or more may be tungsten. In this case, the vibration power generator can obtain the moving body having high specific gravity by using tungsten.

The weight members may be attached to the yoke material so as to interpose the magnet therebetween as viewed along a direction in which the coil and the magnet face each other. In this case, it is possible to dispose the weight member having specific gravity of 8 g/cm$^3$ or more while the influence on magnetism between the magnet and the coil is suppressed.

The weight members may be attached to the yoke material so as to interpose the yoke material therebetween in a direction in which the coil and the magnet face each other. In this case, it is possible to dispose the weight member having specific gravity of 8 g/cm$^3$ or more while the influence on magnetism between the magnet and the coil is suppressed.

The magnet may include a first magnet and a second magnet. The first magnet and the second magnet may be disposed side by side along a movement direction when the moving body relatively moves with respect to the coil. In the first magnet, an N pole side may be oriented to the coil side and an S pole side may be in contact with the yoke material. In the second magnet, the S pole side may be oriented to the coil side and the N pole side may be in contact with the yoke material. In this case, the vibration power generator can efficiently generate electric power due to the first magnet and the second magnet disposed side by side along the movement direction of the moving body. Further, a closed magnetic path is formed between the first magnet and the second magnet on the side with which the yoke material is in contact. Accordingly, the vibration power generator can suppress leakage of the magnetic flux and thus improve the power generation capacity.

In the vibration power generator, the spring may have a first tension coil spring and a second tension coil spring that are connected to the frame and elastically support the moving body from mutually opposite directions, and Vickers hardness of the frame may be equal to or less than 700. In the vibration power generator, since the Vickers hardness of the frame is equal to or less than 700, it is possible to suppress degradation in workability of the frame even when the frame is hardened so as to be able to efficiently transfer vibration energy to the moving body.

The frame may have a vibration input surface to which a vibration is input, a first connecting portion to which the first tension coil spring is connected, and a second connecting portion to which the second tension coil spring is connected, and the vibration input surface may be connected with the first connecting portion and the second connecting portion on the frame by a material having Young's modulus that is equal to or larger than 40 GPa. In the vibration power generator, since the vibration input surface is connected with the first connecting portion and the second connecting portion on the frame by the material having Young's modulus that is equal to or larger than 40 GPa, it is possible to suppress attenuation of the vibration input from the vibration input surface before the vibration is transferred to the first connecting portion and the second connecting portion. Therefore, it is possible to efficiently transfer the vibration energy to the moving body.

A first connecting member that connects the first tension coil spring to the frame in the first connecting portion and a second connecting member that connects the second tension coil spring to the frame in the second connecting portion may be included. The first connecting member and the second connecting member may be formed of the material having Young's modulus that is equal to or larger than 40 GPa. In the vibration power generator, since the first connecting member and the second connecting member are formed of the material having Young's modulus that is equal to or larger than 40 GPa, it is possible to suppress the attenuation of the vibration at a position where the frame is connected with the first tension coil spring and the second tension coil spring.

In the vibration power generator, the yoke material may be disposed on a side of the magnet opposite to the coil, and a magnetic path on the coil side of the magnet may be an open magnetic path. In the vibration power generator, since the yoke material is disposed on the side of the magnet opposite to the coil and the magnetic path on the coil side of the magnet is the open magnetic path, it is possible to dispose the moving body only on one side of the coil. Accordingly, since a gap can be formed between the coil and the moving body by separating the moving body from the coil, it is possible to form the gap between the coil and the moving body and thus to suppress a loss of the vibration energy of the moving body.

The spring may elastically support the moving body such that a gap is formed between the moving body and the coil. In the vibration power generator, since the spring elastically supports the moving body such that the gap is formed between the moving body and the coil, it is possible to suppress contact between the moving body and the coil.

The spring may have a first tension coil spring and a second tension coil spring that are connected to the frame and elastically support the moving body from mutually opposite directions. In the vibration power generator, since the spring has a first tension coil spring and a second tension coil spring that are connected to the frame and elastically support the moving body from mutually opposite directions, it is possible to elastically support the moving body such that the gap is easily formed between the moving body and the coil.

The coil may be an air-core coil. When an iron core is provided on the inner peripheral side of the coil, the vibration energy of the moving body may be lost by attraction of the magnet toward the coil side. In the vibration power generator, since the coil is the air-core coil, it is possible to suppress the attraction of the magnet toward the coil side and thus to suppress the loss of the vibration energy of the moving body.

In the vibration power generator, the magnet may be attached at a position shifted from an axial line of the spring, and the weight member may adjust a position of the center-of-gravity of the moving body. The vibration power generator includes the moving body supported by the spring inside the frame, and the magnet and the weight member are attached to the moving body. The magnet is provided on one side as viewed from the axial line of the spring, and the moving body further includes the weight member that adjusts the center-of-gravity of the moving body. Consequently, the weight member adjusts the center-of-gravity of the moving body to bring the center-of-gravity thereof to a position close to the axial line of the spring, and thus it is possible to stabilize the vibration of the spring. Therefore, it is possible to enhance efficiency of the power generation and thus to realize the high output. Further, since the center-of-gravity of the moving body can be adjusted by the weight member, it is possible to eliminate a need for a symmetrical disposition of components. Consequently, even when the components are not disposed symmetrically, it is possible to stabilize the vibration of the spring by adjusting the position of the center-of-gravity of the moving body by the weight member. As a result, since the components can be disposed regardless of the symmetrical disposition, it is possible to enhance a degree of freedom in the disposition of the component.

Further, the weight member may be a high specific gravity material having higher specific gravity than the magnet. In this case, since the weight member is the high specific gravity material, it is possible to increase the mass of the moving body without increasing volume of the moving body. Consequently, it is possible to promote the high output and to realize miniaturization of the component by increasing the mass of the moving body.

Further, the yoke material may have a first surface on which the magnet is attached and a second surface that is oriented to a side opposite to the first surface and on which the weight member is attached, and may be provided on the axial line of the spring. In this case, the yoke material is interposed between the magnet and the weight member, and the yoke material is disposed on the axial line of the spring. Consequently, it is possible to further enhance the degree of freedom in the disposition of the component by attaching the magnet and the weight member with a position of the yoke material as reference.

Further, the moving body may be suspended by at least four springs. Two springs of the four springs may extend from the moving body in a first direction, and remaining two springs may extend from the moving body in a second direction which is a direction opposite to the first direction. The weight member may adjust a position of the center-of-gravity of the moving body so as to be located inside a space obtained by offsetting by a diameter of the spring in a radial direction of the spring with respect to a plane formed by connecting attachment portions of the four springs with respect to the frame. In this case, since the center-of-gravity of the moving body can be disposed at an appropriate position by the weight member, it contributes to further high output.

The vibration power generator further may include a circuit that is fixable on a surface of the frame facing the magnet and includes a magnetic body. The magnet may be movable in an expansion and contraction direction of the spring, and the circuit may be fixed such that the magnetic body is located outside a range where a movable range of the magnet is projected onto the surface. The vibration power generator includes the spring suspending the magnet inside the frame and the circuit, and the magnet is movable in the expansion and contraction direction of the spring. The circuit includes the magnetic body and is fixable on the surface of the frame facing the magnet. The circuit is fixed such that the magnetic body is located outside the range where the movable range of the magnet is projected onto the surface. Accordingly, since the magnetic body of the circuit is located outside the range which is a place affected by the magnet, it is possible to suppress the influence of the magnetic body with respect to the magnet. Consequently, it is possible to vibrate the magnet without attenuation.

Further, the circuit may be a rectifier circuit that converts generated AC power into DC power and adjusts a voltage of the DC power. In this case, it is possible to convert the generated AC power into the DC power and to adjust the voltage thereof by the rectifier circuit.

According to the present disclosure, it is possible to reduce the suppression of the vibration of the magnet due to the influence of the magnetic field generated from the coil during the power generation and to improve the power generation capacity by controlling the flow of the magnetic flux.

BRIEF DESCRIPTION OF THE DRAWINGS

FIG. 22A is a diagram schematically illustrating a weight body and springs according to a fifth embodiment.

FIG. 22B is a diagram schematically illustrating a weight body and springs according to a sixth embodiment.

FIG. 22C is a diagram schematically illustrating a weight body and springs according to a seventh embodiment.

FIG. 22D is a diagram schematically illustrating a weight body and springs according to an eighth embodiment.

FIG. 22E is a diagram schematically illustrating a weight body and springs according to a ninth embodiment.

DETAILED DESCRIPTION

Figure 1:
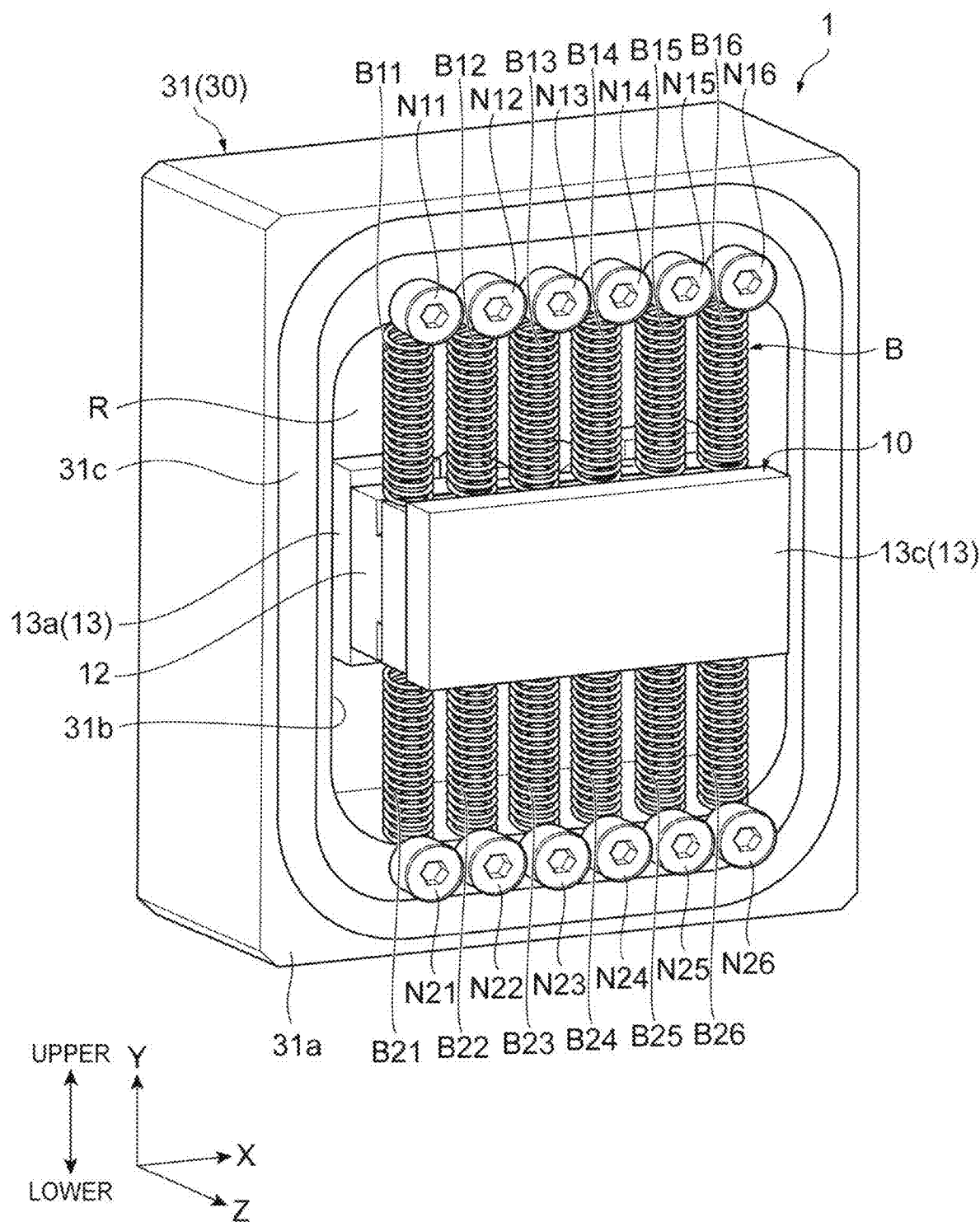
FIG. 1 is a perspective view of an internal configuration of a vibration power generator according to a first embodiment.

Hereinafter, embodiments of the present disclosure will be described with reference to drawings. In the description of the drawings, the same reference numeral is assigned to the same element, and a redundant description is omitted.

First Embodiment

Figure 2:
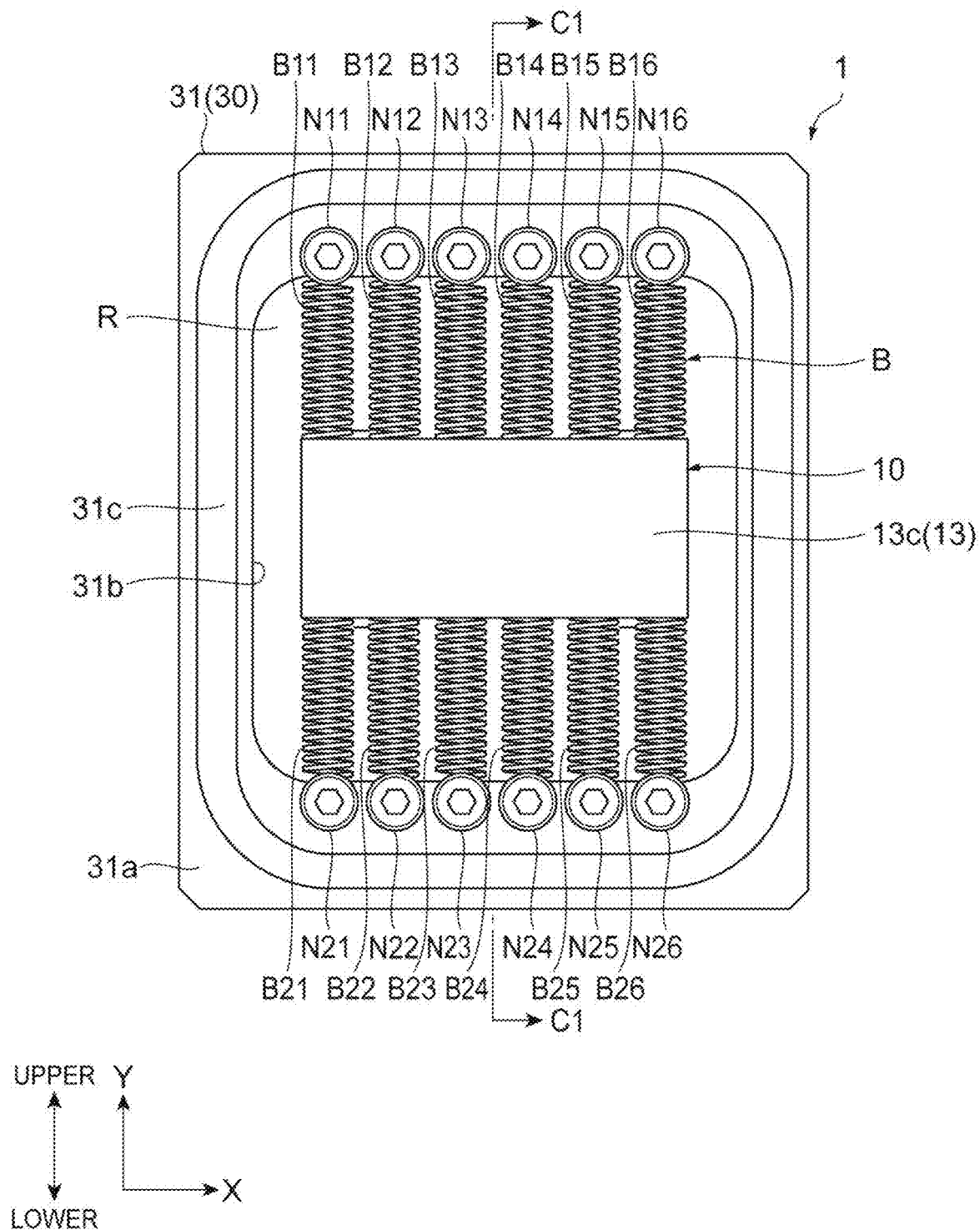
FIG. 2 is a view of the inside of the vibration power generator as viewed along a Z-axis direction.
Figure 3:
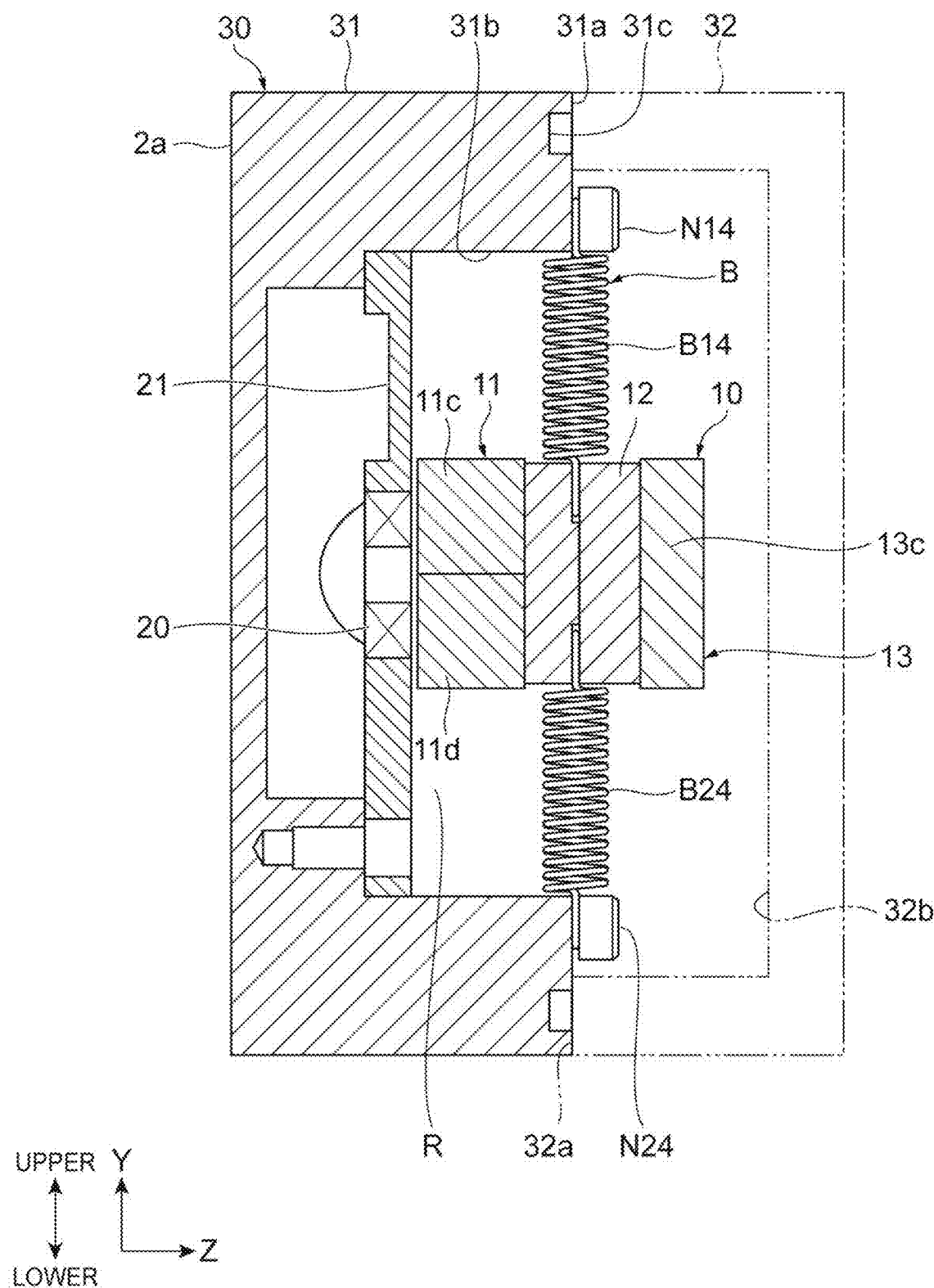
FIG. 3 is a cross-sectional view taken along a line C1-C1 in FIG. 2.

First, a first embodiment will be described. As illustrated in FIGS. 1 to 3, a vibration power generator 1 according to the embodiment is attached to, for example, a vibration source (portion where vibration is generated) such as a motor. The vibration power generator 1 generates electric power by a vibration. The vibration power generator 1 includes a weight body (moving body) 10, a coil 20, a coil spring (spring) B, and a case 30. The vibration power generator 1 may be attached to the vibration source such as the motor by, for example, magnetic force of a neodymium magnet or the like attached to the case 30. Further, the vibration power generator 1 may be attached to the vibration source by, for example, fixing the case 30 and the vibration source such as the motor with a band. Further, the vibration power generator 1 may be attached to the vibration source by fixing the case 30 to the vibration source such as the motor with a screw.

The case 30 is a box body having an appearance of a substantially rectangular parallelepiped shape. The case 30 may be a box body having an appearance such as a substantially columnar shape or a semicylindrical shape (substantially semicircular cross-sectional columnar shape). An accommodation space R that accommodates the weight body 10, the coil 20, and the coil spring B is formed inside the case 30. More specifically, the case 30 includes a case main body portion (frame) 31 and a lid portion 32 (refer to FIG. 3). The lid portion 32 of the case 30 is omitted in FIGS. 1 and 2.

As illustrated in FIG. 3, the lid portion 32 is overlapped on one surface of the case main body portion 31. Hereinafter, the surface on which the lid portion 32 is overlapped in the case main body portion 31 is referred to as "overlapped surface 31a". Further, a surface on which the case main body portion 31 is overlapped in the lid portion 32 is referred to as "overlapped surface 32a". A recessed portion 31b is provided on the overlapped surface 31a of the case main body portion 31. Similarly, a recessed portion 32b is provided on the overlapped surface 32a of the lid portion 32. The accommodation space R is formed inside the case 30 by the recessed portion 31b of the case main body portion 31 and the recessed portion 32b of the lid portion 32.

An annular groove 31c is provided on the overlapped surface 31a of the case main body portion 31 so as to surround the recessed portion 31b. An annular packing (not illustrated) is disposed inside the groove 31c. A gap between the overlapped surface 31a of the case main body portion 31 and the overlapped surface 32a of the lid portion 32 is sealed by this packing.

In the accommodation space R, the coil 20 is disposed so as to face the weight body 10. In the following description, a positional relationship of each portion will be described using an XYZ orthogonal coordinate system for convenience of description. Here, a direction in which the coil 20 and the weight body 10 face each other is set as a Z-axis direction. A direction which is orthogonal to the Z-axis and an expansion and contraction direction of the coil spring B is set as a Y-axis direction. A direction orthogonal to the Z-axis and the Y-axis is set as an X-axis direction.

The coil 20 is disposed closer to a bottom portion side of the recessed portion 31b of the case main body portion 31 than the weight body 10 in the Z-axis direction. The coil 20 is, for example, an air-core coil wound in an annular shape. The coil 20 is disposed such that an annular center axis extends along the Z-axis direction. The coil 20 is held by a coil holder 21. The coil holder 21 is fixed to an inner wall surface of the recessed portion 31b in the case main body portion 31 with the screw, a tape, or the like. In this manner, the coil 20 is attached to the case main body portion 31 through the coil holder 21. Only one end portion (lower side end portion) of the coil holder 21 in the Y-axis direction is fixed to the case main body portion 31 with the screw in FIG. 3, but a fixed place, the number of fixes, and the like of the coil holder 21 are not particularly limited. For example, two positions of both side end portions of the coil holder 21 in the Y-axis direction may be fixed to the case main body portion 31. Further, four positions on four sides of the rectangular coil holder 21 may be fixed to the case main body portion 31. A wire for extracting electric power (not illustrated) is connected to the coil 20. The wire for extracting electric power is drawn to the outside of the case 30.

The weight body 10 is supported by the case main body portion 31 through the coil spring B so as to face the coil 20. The coil spring B is a tension-type spring. That is, the weight body 10 is supported by the coil spring B so as to be in a suspended state in the accommodation space R.

More specifically, the coil spring B includes the coil springs B11 to B16 and the coil springs B21 to B26. The weight body 10 is disposed between the coil springs B11 to B16 and the coil springs B21 to B26 in the Y-axis direction. Hereinafter, a side where the coil springs B11 to B16 are disposed with respect to the weight body 10 is referred to as "upper", and a side where the coil springs B21 to B26 are disposed with respect to the weight body 10 is referred to as "lower". The coil springs B11 to B16 are disposed such that the expansion and contraction direction is the Y-axis direction (vertical direction). The coil springs B11 to B16 are disposed in a row at regular intervals along the X-axis direction. The lower side end portions of the coil springs B11 to B16 are connected to an upper surface of the weight body 10. An upper side end portions of the coil springs B11 to B16 are respectively connected to the overlapped surface 31a of the case main body portion 31 by screws N11 to N16. The upper side end portions of the coil springs B11 to B16 are not limited to being connected to the overlapped surface 31a of the case main body portion 31 by the screws N11 to N16. For example, a plurality of pins may be inserted into the overlapped surface 31a of the case main body portion 31 and the upper side end portions of the coil springs B11 to B16 may be respectively hooked onto the plurality of pins to being connected to the overlapped surface 31a.

The coil springs B21 to B26 are disposed such that the expansion and contraction direction is the Y-axis direction (vertical direction). The coil springs B21 to B26 are disposed in a row at regular intervals along the X-axis direction. The upper side end portions of the coil springs B21 to B26 are connected to a lower surface of the weight body 10. A lower side end portions of the coil springs B21 to B26 are respectively connected to the overlapped surface 31a of the case main body portion 31 by screws N21 to N26. The lower side end portions of the coil springs B21 to B26 are not limited to being connected to the overlapped surface 31a of the case main body portion 31 by the screws N21 to N26. For example, a plurality of pins may be inserted into the overlapped surface 31a of the case main body portion 31 and the lower side end portions of the coil springs B21 to B26 may be respectively hooked onto the plurality of pins to being connected to the overlapped surface 31a.

The coil springs B11 and B16 are respectively connected to the vicinities of both end portions in the X-axis direction on an upper surface of a yoke material 12. The coil springs B21 and B26 are respectively connected to the vicinities of both end portions in the X-axis direction on a lower surface of the yoke material 12. The coil springs B11 to B16 and the coil springs B21 to B26 are symmetrically disposed with respect to the center position in the X-axis direction of the yoke material 12 in the X-axis direction.

In this manner, the coil springs B11 to B16 and the coil springs B21 to B26 are respectively connected to the upper and lower surfaces of the weight body 10. The weight body 10 is held at a position where tension force of the coil springs B11 to B16 balances with tension force of the coil springs B21 to B26. At this time, even in a state where the weight body 10 is pulled by the coil springs B11 to B16 and the coil springs B21 to B26, the weight body 10 is held in a stable posture without rotating or the like. The weight body 10 (magnet 11) and the coil 20 face each other at the position where the pieces of tension force balance with each other. A predetermined gap is provided between the weight body 10 and the coil 20 in the Z-axis direction.

The vibration power generator 1 is fixed to the vibration source such that a vibration direction of the vibration source matches the expansion and contraction direction of the coil spring B. When the vibration is added to the vibration power generator 1, the coil spring B expands and contracts along the Y-axis direction to relatively move (vibrate) the weight body 10 with respect to the coil 20. The coil 20 generates induced electromotive force by the relative movement of the weight body 10 (magnet 11) with respect to the coil 20. In this manner, the vibration power generator 1 generates the electric power by the vibration of the vibration source. Since the upper and lower surfaces of the yoke material 12 are pulled by the coil springs B11 to B16 and the coil springs B21 to B26, the weight body 10 can vibrate in a stable posture along the Y-axis direction without rotating or the like.

Here, a type (free length or the like) of the coil springs B11 to B16 and B21 to B26 is selected such that a stroke of the weight body 10 in the accommodation space R can be further ensured. Since a plurality of coil springs are provided like the coil springs B11 to B16 and B21 to B26, a spring constant required for one coil spring becomes small. When the spring constant becomes small, a size (free length) for one coil spring also can be reduced. In this manner, since the size (free length) of the coil springs B11 to B16 and B21 to B26 can be reduced, the vibration power generator 1 can easily ensure a movement amount of the weight body 10 in the Y-axis direction in the accommodation space R. Further, since the size for one coil spring B can be reduced, the vibration power generator 1 can be miniaturized.

Further, a vibration frequency of the vibration source may match a natural frequency of the weight body 10 in order to largely vibrate the weight body 10. In this case, the weight body 10 can efficiently vibrate by resonating with the vibration of the vibration source. Therefore, mass of the weight body 10 and the spring constant of the coil spring B are set so as to be able to resonate with the vibration of the vibration source.

Figure 4:
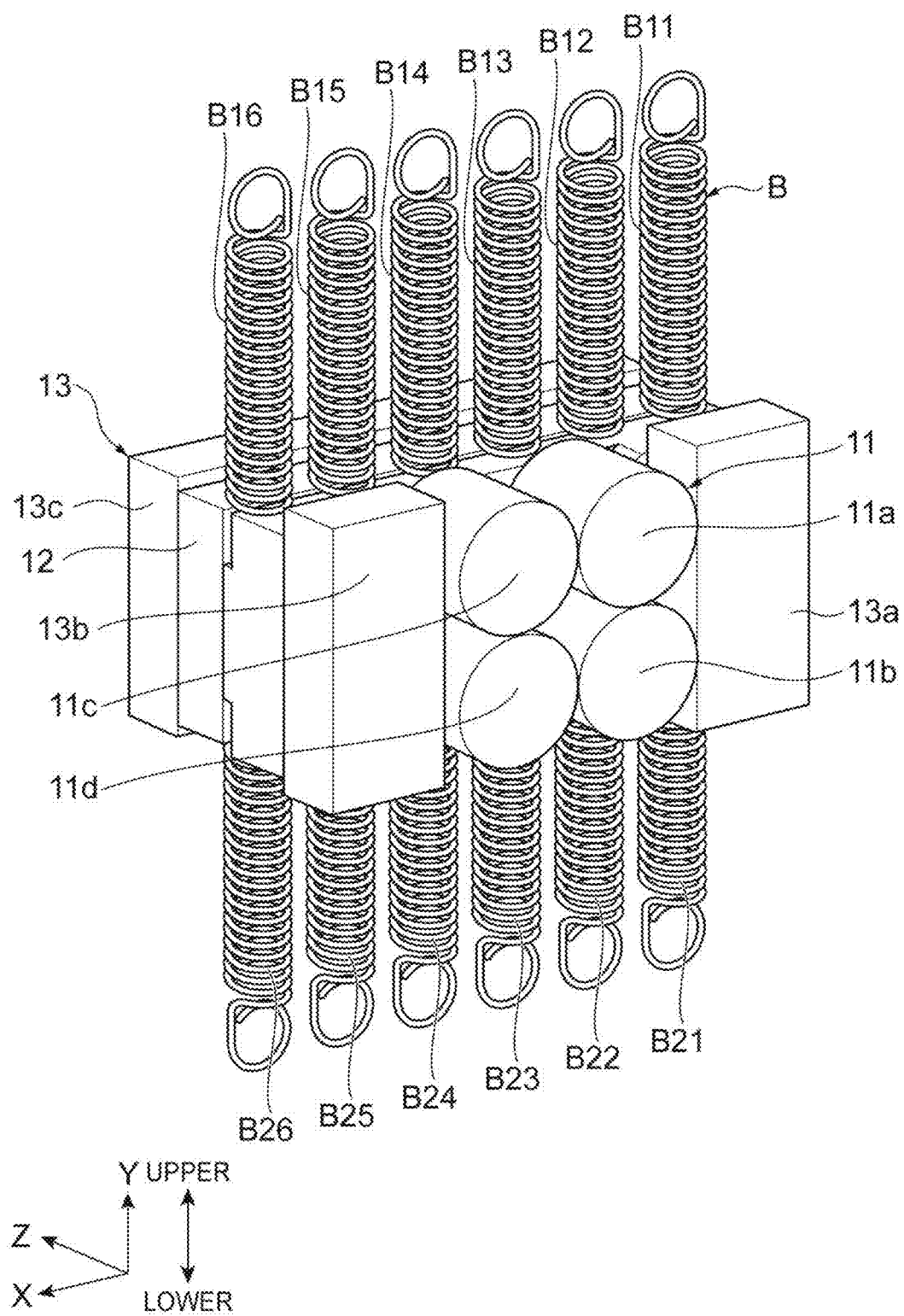
FIG. 4 is a perspective view of a weight body to which a coil spring is connected as viewed from a magnet side.

The weight body 10 has the magnet 11, the yoke material 12, and a weight member 13 as illustrated in FIGS. 3 and 4. The magnet 11 is disposed so as to face the coil 20. The magnet 11 is attached to a center portion in the X-axis direction on a surface of the yoke material 12 on a coil 20 side so as to face the coil 20. In the magnet 11, the S pole or the N pole faces the coil 20 side. The magnet 11 is, for example, the neodymium magnet.

In the embodiment, the magnet 11 has magnets 11*a* to 11*d*. The magnet (first magnet) 11*a* and the magnet (second magnet) 11*b* are disposed side by side along the Y-axis direction. That is, the magnets 11*a* and 11*b* are disposed side by side along a movement direction (Y-axis direction) when the weight body 10 relatively moves with respect to the coil 20. The magnet 11*a* is disposed closer to coil springs B11 to B16 side than the magnet 11*b*. In the magnet 11*a*, an N pole side is oriented to the coil 20 side, and an S pole side is in contact with the yoke material 12. In the magnet 11*b*, the S pole side is oriented to the coil 20 side, and the N pole side is in contact with the yoke material 12.

The magnet (first magnet) 11*c* and the magnet (second magnet) 11*d* are disposed side by side along the Y-axis direction. That is, the magnets 11*c* and 11*d* are disposed side by side along the movement direction (Y-axis direction) when the weight body 10 relatively moves with respect to the coil 20. The magnet 11*c* is disposed closer to the coil springs B11 to B16 side than the magnet 11*d*. In the magnet 11*c*, the N pole side is oriented to the coil 20 side, and the S pole side is in contact with the yoke material 12. In the magnet 11*d*, the S pole side is oriented to the coil 20 side, and the N pole side is in contact with the yoke material 12. The magnets 11*a* and 11*b* and the magnets 11*c* and 11*d* are disposed side by side in the X-axis direction. However, the orientations of the N poles and the S poles of the magnets 11*a* to 11*d* may be opposite to the orientations described above.

The yoke material 12 is, for example, a rolled steel material for general structure such as SS400. The yoke material 12 forms a magnetic circuit. In the embodiment, a closed magnetic path is formed on a side where the yoke material 12 is in contact with the magnet 11. An open magnetic path is formed on the coil 20 side in the magnet 11. The coil springs B11 to B16 are connected to the upper surface of the yoke material 12. The coil springs B21 to B26 are connected to the lower surface of the yoke material 12.

The weight member 13 is a member for adjusting the mass of the weight body 10. The weight member 13 is formed of a substance different from the magnet 11 and the yoke material 12. The weight member 13 contains a substance having specific gravity of 8 g/cm³ or more. The weight member 13 contains tungsten as the substance having the specific gravity of 8 g/cm³ or more. In the embodiment, the weight member 13 is formed of a resin (for example, nylon or the like) containing a tungsten powder. The weight member 13 is not limited to being formed of the resin and may be formed of tungsten alone or an alloy containing tungsten.

The weight member 13 is attached to the yoke material 12. In the embodiment, the weight member 13 has a first weight member 13*a*, a second weight member 13*b*, and a third weight member 13*c*. The first weight member 13*a* and the second weight member 13*b* are attached to the surface of the yoke material 12 on the coil 20 side. The first weight member 13*a* and the second weight member 13*b* are disposed so as to interpose the magnet 11 therebetween in the X-axis. That is, the first weight member 13*a* and the second weight member 13*b* are attached to the yoke material 12 so as to interpose the magnet 11 therebetween as viewed along a direction (Z-axis direction) in which the coil 20 and the magnet 11 face each other.

The third weight member 13*c* is attached to a surface of the yoke material 12 on an opposite side with respect to a surface on a side where the magnet 11 is attached. That is, the first weight member 13*a* and the second weight member 13*b*, and the third weight member 13*c* are attached to the yoke material 12 so as to interpose the yoke material 12 therebetween in the direction (Z-axis direction) in which the coil 20 and the magnet 11 face each other.

In the embodiment, the weight members 13 may be attached to both side surfaces (upper and lower surfaces) of the yoke material 12 in the Y-axis direction. Further, the weight members 13 may be attached to both side surfaces of the yoke material 12 in the X-axis direction. Accordingly, the weight body 10 can ensure the mass.

Average specific gravity of the weight body 10 is 8 g/cm³ or more. A size of the weight member 13 is set such that the average specific gravity of the weight body 10 is 8 g/cm³ or more. Volume occupied by the weight member 13 in the weight body 10 is increased to increase average mass of the weight body 10. The weight body 10 has an appearance of the substantially rectangular parallelepiped shape. Further, the weight body 10 is formed such that the length in the X-axis direction is longer than the length in the Y-axis direction. Accordingly, the weight body 10 can increase the mass thereof while increasing the movement amount in the Y-axis direction in the case 30.

As described above, since the average specific gravity of the weight body 10 is 8 g/cm³ or more, the vibration power generator 1 can increase the mass of the weight body 10. Therefore, in the vibration power generator 1, it is easy to overcome an influence of a magnetic field generated from the coil 20 during the power generation when the weight body 10 is moved. Accordingly, the vibration power generator 1 can reduce the suppression of the vibration of the weight body 10 (magnet 11) due to the influence of the magnetic field generated from the coil 20 during the power generation. Further, since the yoke material 12 forming the magnetic circuit is included, the vibration power generator 1 can control a flow of magnetic flux. As described above, the vibration power generator 1 can improve a power generation capacity by reducing the suppression of the vibration of the weight body 10 (magnet 11) due to the influence of the magnetic field generated from the coil 20 during the power generation and controlling the flow of the magnetic flux. Further, since the average specific gravity of the weight body 10 is 8 g/cm³ or more, the weight body 10 can increase the mass thereof while suppressing the increase in the size thereof. Accordingly, the vibration power generator 1 can be miniaturized.

The weight member 13 contains tungsten as the substance having the specific gravity of 8 g/cm³ or more. In this manner, even when the specific gravity of the magnet 11 and the yoke material 12 is less than 8, the weight body 10 can have the average specific gravity of 8 g/cm$^3$ or more by containing tungsten.

The weight member 13 is formed of the resin containing the tungsten powder. In this case, even when tungsten having hardness that is hard and which is difficult to process is used, the weight member 13 having a desired shape is easily obtained by curing the resin containing the tungsten powder in a desired shape.

The first weight member 13a and the second weight member 13b are attached to the yoke material 12 so as to interpose the magnet 11 therebetween in the X-axis direction as viewed along the Z-axis direction. In this case, the first weight member 13a and the second weight member 13b having the specific gravity of 8 g/cm$^3$ or more are disposed while the influence on magnetism between the magnet 11 and the coil 20 is suppressed.

The first weight member 13a and the second weight member 13b, and the third weight member 13c are attached to the yoke material 12 so as to interpose the yoke material 12 therebetween in the Z-axis. In this case, first weight member 13a and the second weight member 13b, and the third weight member 13c having the specific gravity of 8 g/cm$^3$ or more are disposed while the influence on the magnetism between the magnet 11 and the coil 20 is suppressed.

The N pole sides of the magnets 11a and 11c face the coil 20 side. The S pole sides of the magnets 11b and 11d face the coil 20 side. That is, when the weight body 10 is moved, a plurality of pieces of magnetic flux pass in front of the coil 20. However, the S pole sides of the magnets 11a and 11c may face the coil 20 side, and the N pole sides of the magnets 11b and 11d may face the coil 20 side. In this case, the vibration power generator 1 can efficiently generate the electric power by the magnets 11a and 11c and the magnets 11b and 11d arranged along the movement direction (Y-axis direction) of the weight body 10. Further, the magnet 11 is in contact with the yoke material 12. The closed magnetic path is formed on a side where the yoke material 12 is in contact between the magnets 11a and 11c and the magnets 11b and 11d. Accordingly, the vibration power generator 1 can suppress leakage of the magnetic flux and thus improve the power generation capacity.

The embodiment of the present disclosure has been described, but the present disclosure is not limited to the above embodiment. For example, the magnet 11 has the magnets 11a to 11d, but is not limited to having the four magnets of the magnets 11a to 11d. The weight member 13 has the first weight member 13a to the third weight member 13c, but may have at least any of the weight members. Further, the weight member 13 may be attached to at least any of both end surfaces of the yoke material 12 in the X-axis direction. The weight member 13 may be attached to at least any of both end surfaces (upper and lower surfaces) of the yoke material 12 in the Y-axis direction.

The weight member 13 contains tungsten as the substance having the specific gravity of 8 g/cm$^3$ or more, but may contain a substance other than tungsten as long as the specific gravity is 8 g/cm$^3$ or more. For example, the weight member 13 may contain any one or two or more of materials such as lead, copper, brass, beryllium copper, nickel steel, austenitic stainless steel, and high-speed tool steel as the substance other than tungsten. For example, an appropriate magnet such as the neodymium magnet, an isotropic ferrite magnet, an anisotropic ferrite magnet, a samarium cobalt magnet, or an alnico magnet may be used as the magnet 11. A shape of the magnet 11 is not particularly limited and may be, for example, a columnar shape, a prismatic shape, or the like. Further, an appropriate type of substance may be used as the yoke material 12 as long as the substance can form the magnetic circuit. For example, a material such as soft steel, rolled steel for general structure, carbon steel for machine structure, stainless steel, silicon steel, ferrite, FeNi alloy, or FeCo alloy may be used as the yoke material 12.

The vibration power generator 1 may include a spring having a configuration other than the coil spring instead of the coil springs B11 to B16 and B21 to B26. Further, the coil spring B (B11 to B16 and B21 to B26) may be connected to the weight member 13.

The six coil springs are respectively connected to the upper and lower surfaces of the yoke material 12, but the connection is not limited to being connected with six coil springs. For example, three or more coil springs may be respectively connected to the upper and lower surfaces of the yoke material 12. For example, the number of coil springs connected to the yoke material 12 may be decided according to the spring constant required when the weight body 10 is vibrated. A plurality of coil springs may be disposed in two rows along the X-axis direction on the upper surface of the yoke material 12. Similarly, the plurality of coil springs may be disposed in two rows along the X-axis direction on the lower surface of the yoke material 12. Further, four coil springs B may be respectively connected to four corners on the upper surface of the yoke material 12. Similarly, the four coil springs B may be respectively connected to four corners on the lower surface of the yoke material 12. Further, when the plurality of coil springs are connected to the yoke material 12 as described above, the coil springs may also be disposed so as to be symmetrical with respect to the center position in the X-axis direction of the yoke material 12 in the X-axis direction. The same effects as those of the first embodiment such as stably vibrating the weight body 10 and increasing the movement amount of the weight body 10 can be achieved also with these connection configurations of the coil springs. The present disclosure is not limited that the plurality of coil springs are connected to the upper surface of the yoke material 12 and the plurality of coil springs are connected to the lower surface of the yoke material 12.

Second Embodiment

Figure 5:
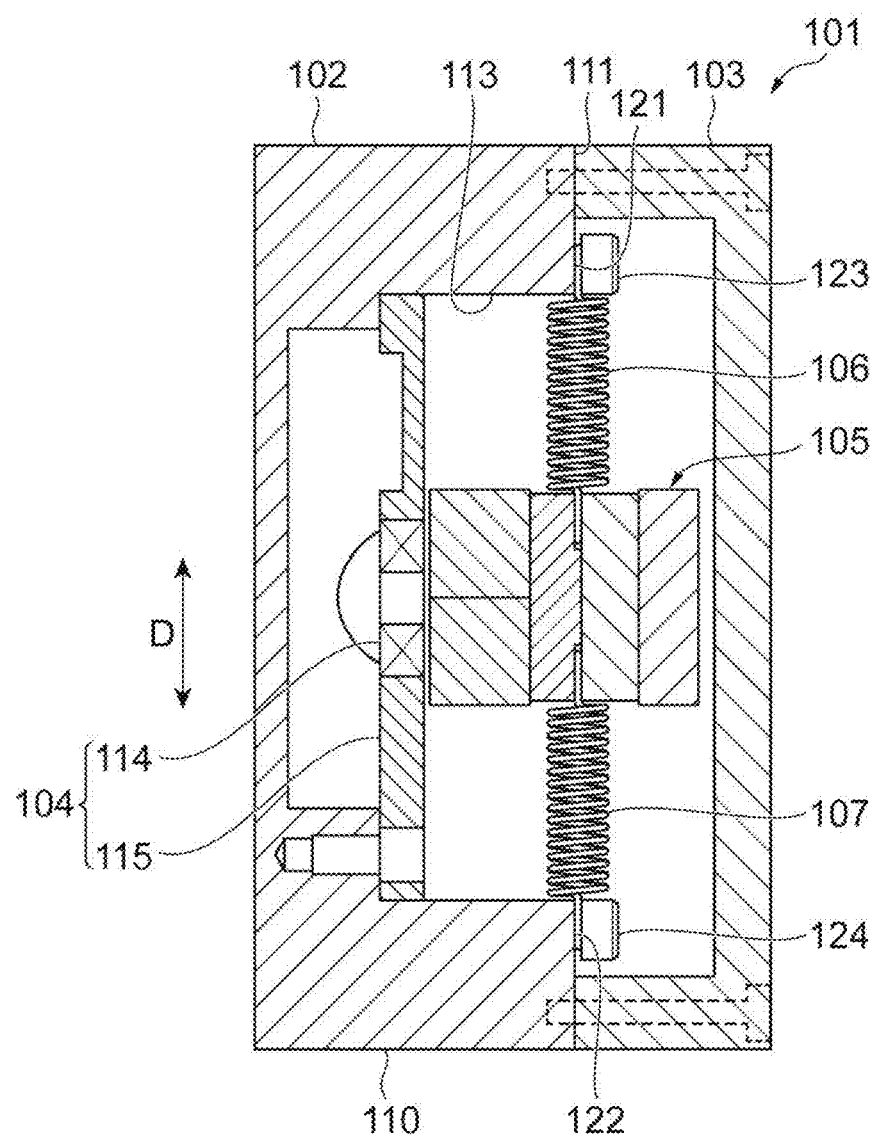
FIG. 5 is a cross-sectional view of a vibration power generator of a second embodiment.
Figure 6:
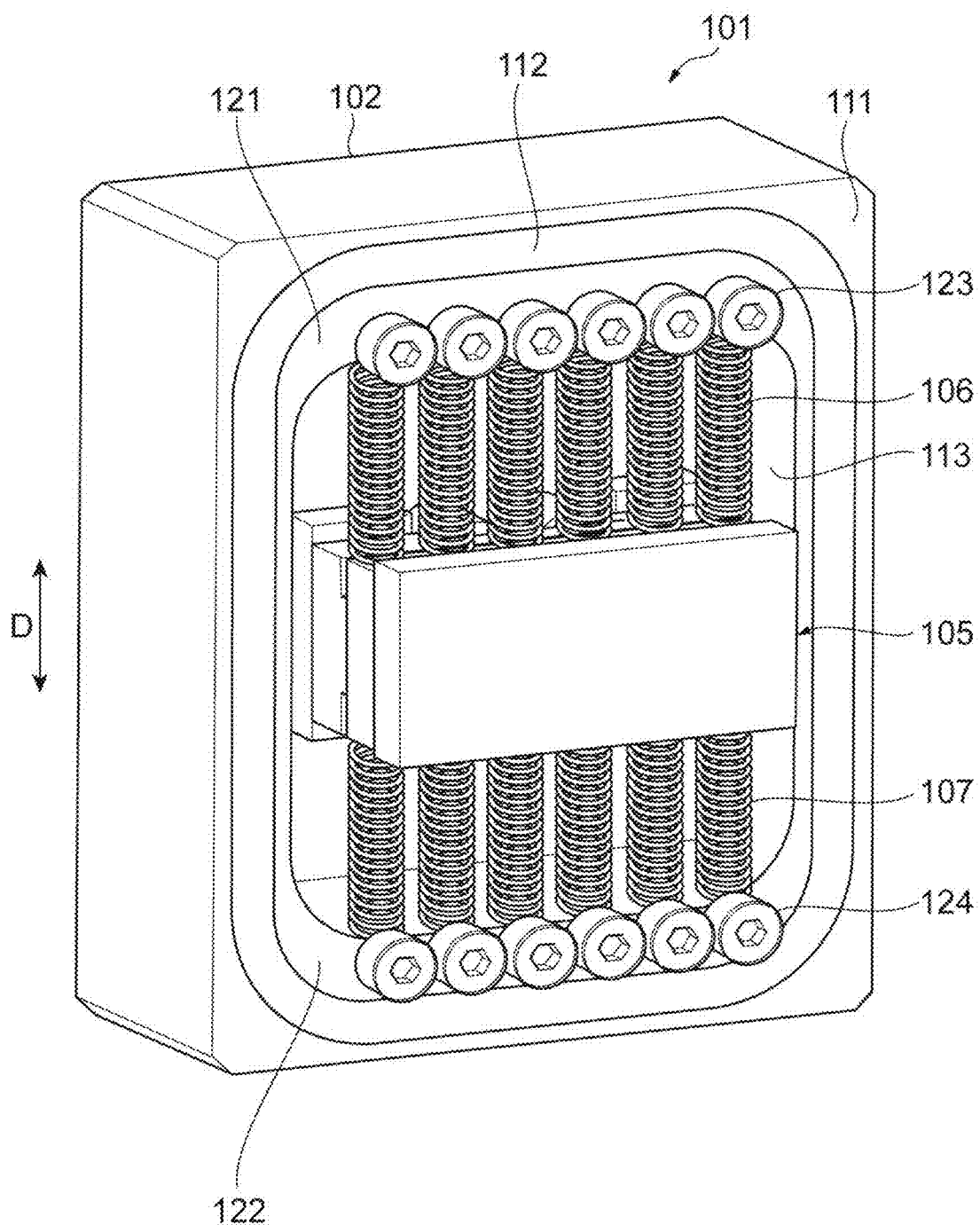
FIG. 6 is a perspective view of the vibration power generator from which a cover is removed.
Figure 7:
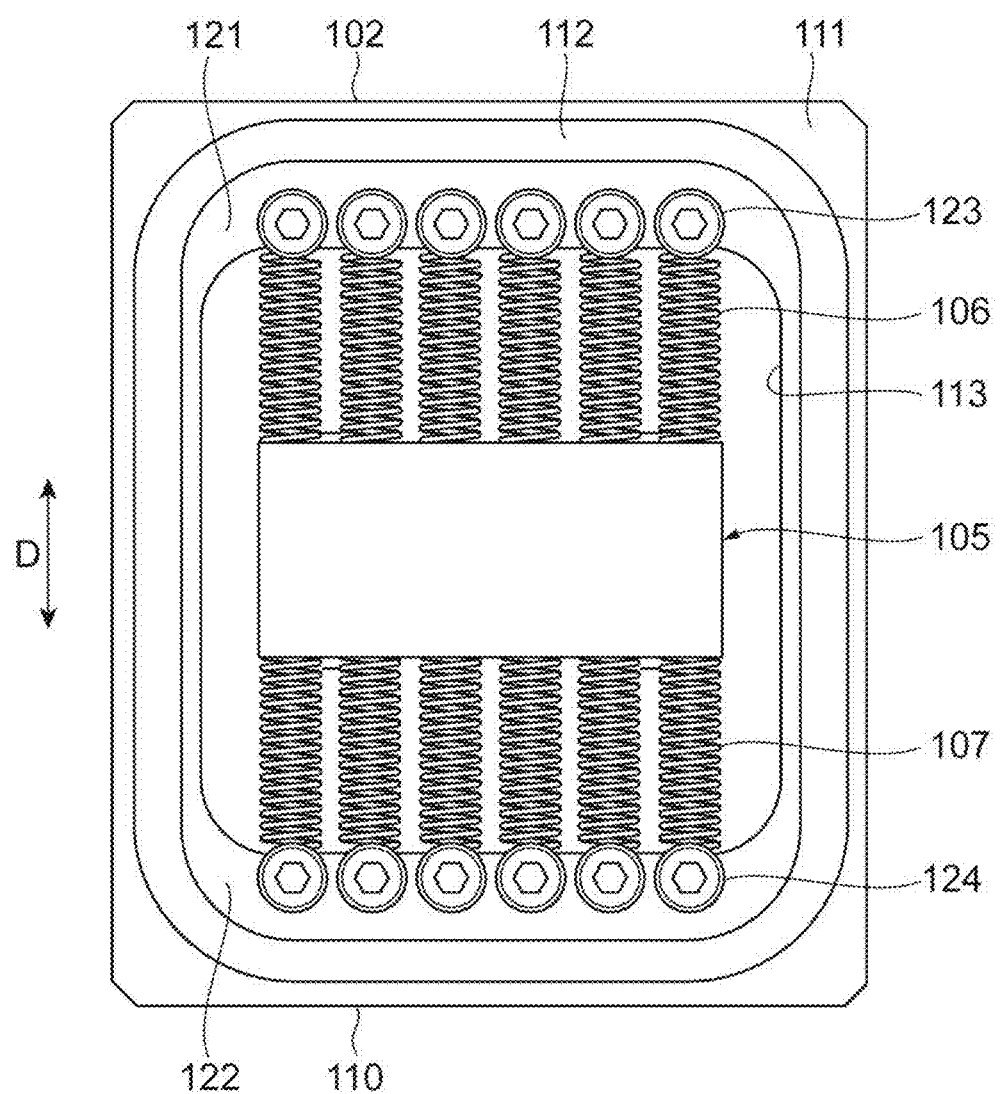
FIG. 7 is a front view of the vibration power generator from which the cover is removed.
Figure 8:
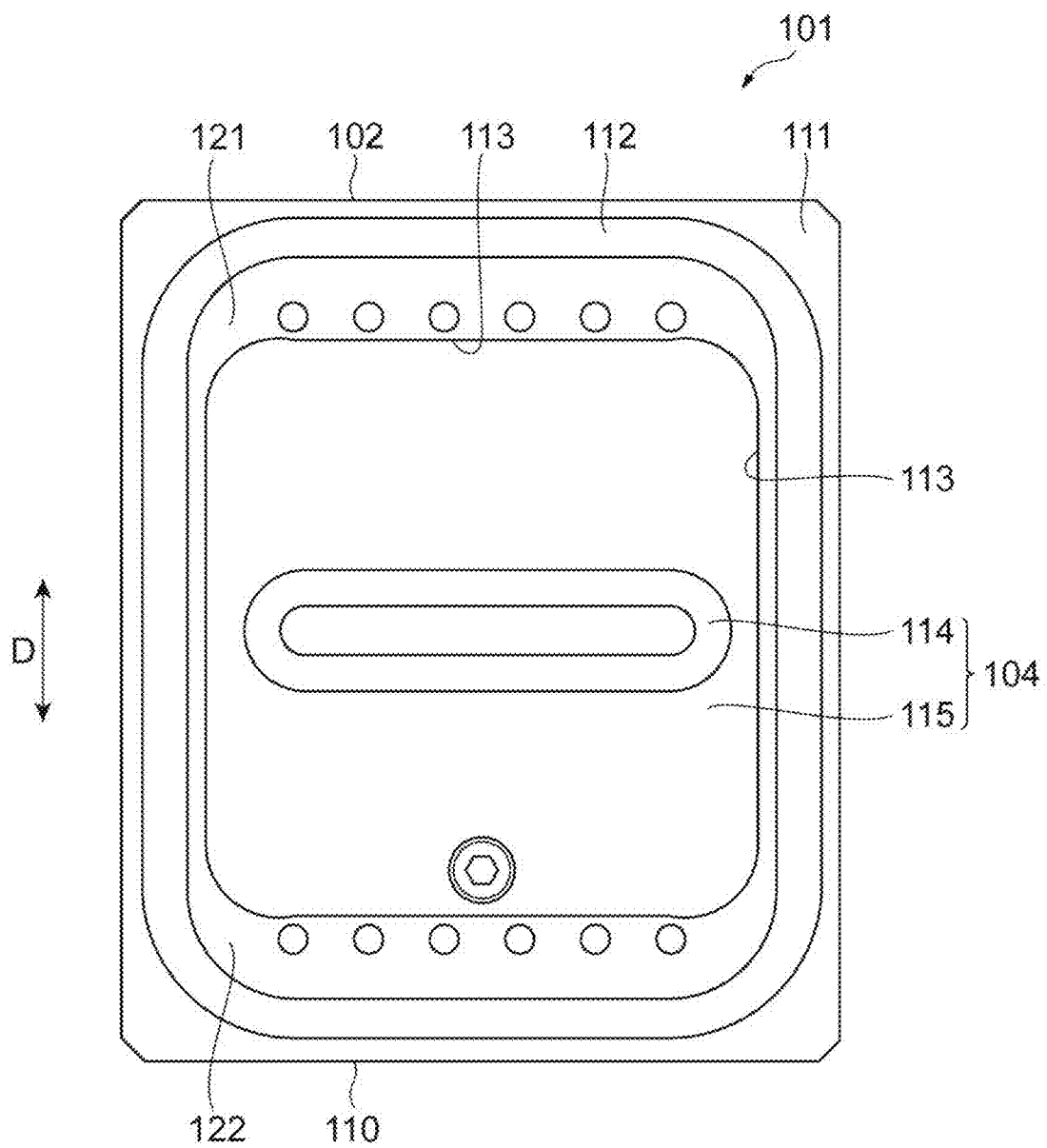
FIG. 8 is a front view of the vibration power generator from which a weight body, a first tension coil spring, and a second tension coil spring are removed.
Figure 9:
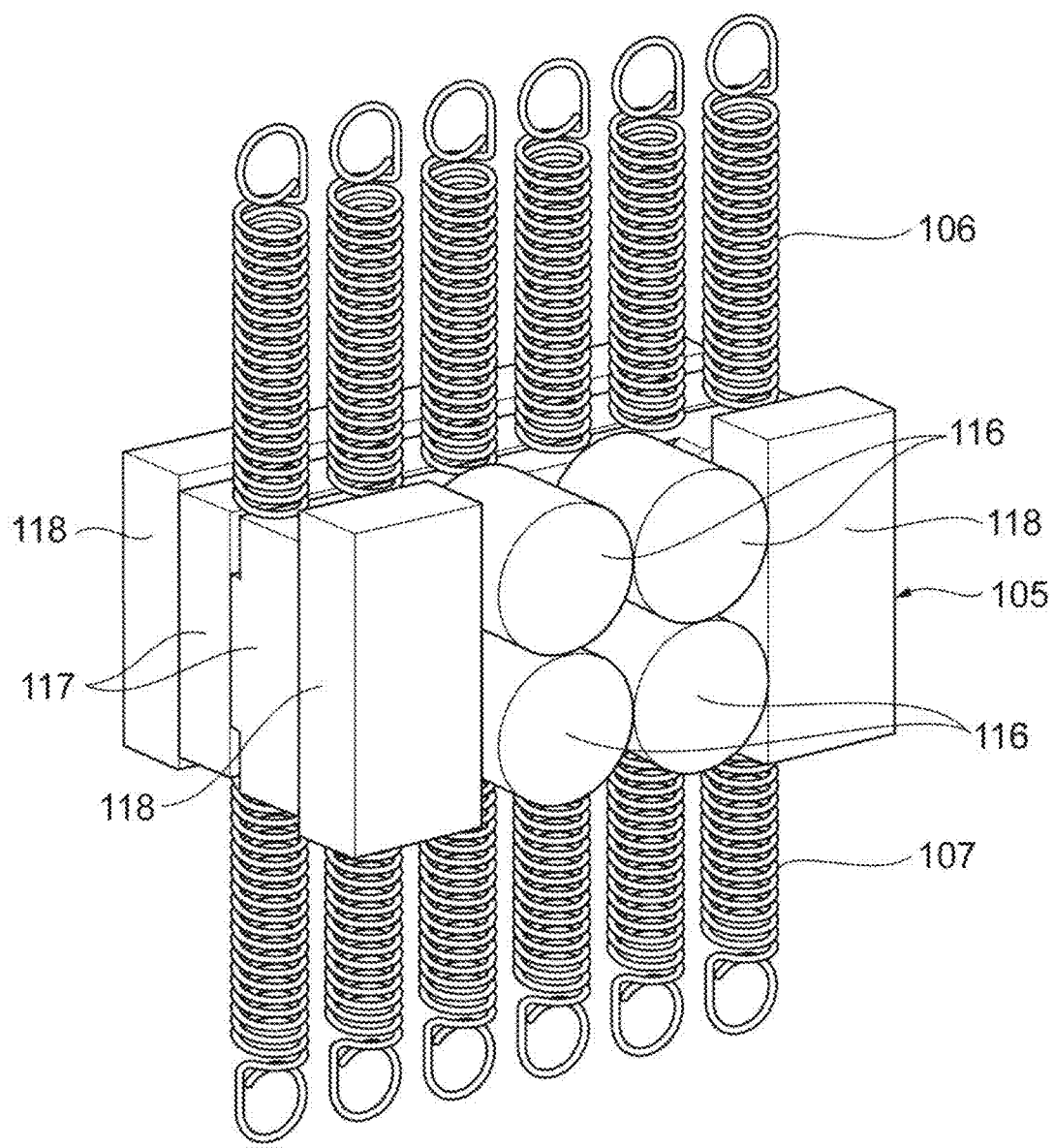
FIG. 9 is a perspective view of the weight body, the first tension coil spring, and the second tension coil spring.

Next, a second embodiment will be described. As illustrated in FIG. 5, a vibration power generator 101 of the embodiment includes a frame 102, a cover 103, a coil unit 104, a weight body (moving body) 105, a first tension coil spring 106, and a second tension coil spring 107.

As illustrated in FIGS. 5 to 8, the frame 102 is a member that forms a housing of the vibration power generator 101 together with the cover 103. The frame 102 is formed in a box shape, a cylindrical shape, the semicylindrical shape (substantially semicircular cross-sectional cylindrical shape), or the like, and one surface thereof is a vibration input surface 110. The vibration input surface 110 is a surface to which the vibration is input. That is, the vibration power generator 101 directly or indirectly connects the vibration input surface 110 to a vibration body (not illustrated) to input an environmental vibration generated from the vibration body from the vibration input surface 110 to the vibration power generator 101. As a method of connecting the vibration input surface 110 to the vibration body, examples of the method are a method of attaching the neodymium magnet to the frame 102 and attaching this neodymium magnet to the vibration body to indirectly connect the vibration input surface 110 to the vibration body, a method of fixedly attaching the frame 102 to the vibration body with the band to directly connect the vibration input surface 110 to the vibration body, and a method of fixedly attaching the frame 102 to the vibration body with the screw to directly connect the vibration input surface 110 to the vibration body. In the following description, directions such as upper direction and lower direction of the vibration power generator 101 refer to directions in a state where the vibration input surface 110 is installed on the vibration body as the lower surface.

The cover 103 is attached to a side surface 111 of the frame 102 in a detachable manner. The side surface 111 is a surface adjacent to the vibration input surface 110. The side surface 111 is provided with a packing 112 for airtightly holding a space between the side surface 111 and the cover 103. The packing 112 is formed in a substantially rectangular annular shape. A substantially rectangular recessed portion 113 is formed on an inner peripheral side of the packing 112 on the side surface 111. The recessed portion 113 is a recess formed on the side surface 111 and is closed by attaching the cover 103 to the frame 102. The attachment of the cover 103 to the frame 102 can be performed by, for example, screwing.

The coil unit 104 is formed in a flat plate shape. The coil unit 104 has an air-core coil 114 and a coil holder 115. The air-core coil 114 is one of members that generate the induced electromotive force. The air-core coil 114 is wound so as to have an oval shape, and the inner peripheral side thereof is hollow. That is, an iron core cannot be provided on the inner peripheral side of the coil in the air-core coil 114. The coil holder 115 is a member that accommodates the air-core coil 114 and fixes the air-core coil 114 to the frame 102. The coil holder 115 is formed in a substantially rectangular shape smaller than the recessed portion 113. The coil holder 115 is fixed to the frame 102 in a state of being inserted into the recessed portion 113 such that the accommodated air-core coil 114 crosses the weight body 105 as viewed from the side surface 111. The coil holder 115 can be fixed to the frame 102 by, for example, the tape, the screw, or the like. In FIG. 5, only one position on one side of the coil holder 115 is fixed to the frame 102, but the fixed place, the number of fixes, and the like of the coil holder 115 are not particularly limited. For example, two positions on both sides of the coil holder 115 may be fixed to the frame 102, or four positions on four sides of the coil holder 115 may be fixed to the frame 102.

As illustrated in FIGS. 5 to 7 and 9, the weight body 105 is a member that is elastically supported on the frame 102. The weight body 105 has one or a plurality of magnets 116, a yoke material 117, and a high specific gravity material (weight member) 118.

The magnet 116 is a member that applies the magnetic field to the air-core coil 114. The number of magnets 116 provided on the weight body 105 is not particularly limited. However, in the embodiment, it is assumed that four magnets 116 are provided on the weight body 105 and the four magnets 116 are disposed at four corners of a square. The magnet 116 is not particularly limited. For example, the magnet such as the neodymium magnet, the isotropic ferrite magnet, the anisotropic ferrite magnet, the samarium cobalt magnet, or the alnico magnet may be used as the magnet 116. The shape of the magnet 116 is not particularly limited and may be, for example, the columnar shape, the prismatic shape, or the like.

The yoke material 117 forms the magnetic circuit. The yoke material 117 is a member that passes the magnetic flux emitted from a side of the magnet 116 opposite to the coil unit 104 to collect the magnetic flux on an air-core coil 114 side of the magnet 116. Therefore, the yoke material 117 is disposed on the side of the magnet 116 opposite to the coil unit 104. The yoke material 117 is not particularly limited. For example, the material such as soft steel, rolled steel for general structure, stainless steel, silicon steel, ferrite, FeNi alloy, or FeCo alloy may be used as the yoke material 117.

The high specific gravity material 118 is a member for increasing the specific gravity of the weight body 105. The high specific gravity material 118 is formed of a material having higher specific gravity than the magnet 116 and the yoke material 117. The high specific gravity material 118 is fixed by a surface of the yoke material 117 on the air-core coil 114 side and a surface of the yoke material 117 on a side opposite to the air-core coil 114. The high specific gravity material 118 is not particularly limited. For example, a material having the specific gravity of 8 $g/cm^3$ or more may be used as the high specific gravity material 118. Such a high specific gravity material 118 may contain any one or two or more of materials such as tungsten, lead, copper, brass, beryllium copper, nickel steel, austenitic stainless steel, and high-speed tool steel.

In the embodiment, the average specific gravity of the weight body 105 is 8 $g/cm^3$ or more.

The first tension coil spring 106 and the second tension coil spring 107 are members that are connected to the frame 102 to elastically support the weight body 105 from mutually opposite directions. The first tension coil spring 106 and the second tension coil spring 107 are respectively configured of a plurality of tension coil springs and are disposed at positions facing each other. In the embodiment, the first tension coil spring 106 and the second tension coil spring 107 are respectively configured of six tension coil springs. Here, the six first tension coil springs 106 and the six second tension coil springs 107 are respectively connected to the upper and lower surfaces of the yoke material 117 in the embodiment, but the connection is not limited to being connected with six tension coil springs. For example, three or more first tension coil springs 106 and three or more second tension coil springs 107 may be respectively connected to the upper and lower surfaces of the yoke material 117. For example, the number of coil springs connected to the yoke material 117 may be decided according to the spring constant required when the weight body 105 is vibrated. The plurality of first tension coil springs 106 may be disposed in two rows along an upper direction on the upper surface of the yoke material 117. Similarly, the plurality of second tension coil springs 107 may be disposed in two rows along a lower direction on the lower surface of the yoke material 117. Further, four first tension coil springs 106 may be respectively connected to four corners on the upper surface of the yoke material 117. Similarly, four second tension coil springs 107 may be respectively connected to four corners on the lower surface of the yoke material 117. Further, when the plurality of first tension coil springs 106 and second tension coil springs 107 are connected to the yoke material 117 as described above, the first tension coil springs 106 and the second tension coil springs 107 may also be disposed so as to be symmetrical with respect to the center position in the vertical direction of the yoke material 117 in the vertical direction.

Here, a portion to which the first tension coil spring 106 of the frame 102 is connected is referred to as a first connecting portion 121, and a portion to which the second tension coil spring 107 of the frame 102 is connected is referred to as a second connecting portion 122. In the embodiment, the first connecting portion 121 is the side surface 111 located above the recessed portion 113, and the second connecting portion 122 is the side surface 111 below the recessed portion 113.

One end portion of the first tension coil spring 106 is connected to the first connecting portion 121 of the frame 102 by a first connecting member 123. One end portion of the second tension coil spring 107 is connected to the second connecting portion 122 of the frame 102 by a second connecting member 124. In the embodiment, the first connecting member 123 and the second connecting member 124 are the screws. The first connecting member 123 locking one end portion of the first tension coil spring 106 is screwed into the first connecting portion 121 to connect one end portion of the first tension coil spring 106 to the first connecting portion 121. Further, the second connecting member 124 locking one end portion of the second tension coil spring 107 is screwed into the second connecting portion 122 to connect one end portion of the second tension coil spring 107 to the second connecting portion 122. The first connecting member 123 and the second connecting member 124 may be pins that are inserted into and locked on the side surface 111 of the frame 102. In this case, the first tension coil spring 106 and the second tension coil spring 107 can be connected to the side surface 111 of the frame 102 by inserting and locking the pins which are the first connecting member 123 and the second connecting member 124 on the side surface 111 of the frame 102 and by locking the first tension coil spring 106 and the second tension coil spring 107 to the pins.

The frame 102, the first connecting member 123, and the second connecting member 124 are formed of a material having Vickers hardness that is equal to or less than 700. In this case, Vickers hardness may be equal to or less than 550 or further may be equal to or less than 400. Examples as the material of the frame 102, the first connecting member 123, and the second connecting member 124 having such hardness are stainless steel, aluminum material, brass, yellow brass, and beryllium copper.

Further, the frame 102, the first connecting member 123, and the second connecting member 124 may be formed of a material having Young's modulus that is equal to or larger than 40 GPa. In this case, Young's modulus may be equal to or larger than 60 GPa or further may be equal to or larger than 100 GPa. Since the frame 102 is formed of such materials, the vibration input surface 110 is connected with the first connecting portion 121 and the second connecting portion 122 on the frame 102 by the material having Young's modulus that is equal to or larger than 40 GPa, the material having Young's modulus that is equal to or larger than 60 GPa, or the material having Young's modulus that is equal to or larger than 100 GPa.

The other end portions of the first tension coil spring 106 and the second tension coil spring 107 are connected to the weight body 105. Specifically, the other end portion of the first tension coil spring 106 is connected to a portion of the weight body 105 on a first connecting portion 121 side, and the other end portion of the second tension coil spring 107 is connected to a portion of the weight body 105 on a second connecting portion 122 side. The connection with respect to the weight body 105 of the first tension coil spring 106 and the second tension coil spring 107 can be performed, for example, by dividing the yoke material 117 into two and by locking and interposing the other end portions of the first tension coil spring 106 and the second tension coil spring 107 between the two divided yoke materials 117. However, the other end portions of the first tension coil spring 106 and the second tension coil spring 107 may be connected to any member configuring the weight body 105.

The weight body 105 is elastically supported by the first tension coil spring 106 and the second tension coil spring 107 in a suspended manner such that the magnet 116 and the coil unit 104 face each other and a gap is formed between the magnet 116 and the coil unit 104. Further, the weight body 105 can vibrate with respect to the frame 102 in a vertical direction D by resisting against elastic force of the first tension coil spring 106 and the second tension coil spring 107. When the weight body 105 vibrates with respect to the frame 102 in the vertical direction D, the magnet 116 vibrates with respect to the air-core coil 114. Therefore, interlinkage magnetic flux of the air-core coil 114 changes. Accordingly, the induced electromotive force is generated in the air-core coil 114. Therefore, the air-core coil 114 and the magnet 116 function as a power generation unit configured to generate the induced electromotive force due to the vibration of the weight body 105 with respect to the frame 102. The weight body 105 (magnet 116, yoke material 117, and high specific gravity material 118) functions as a vibrator in the vibration power generator 101, and the frame 102, the cover 103, and the coil unit 104 (air-core coil 114 and coil holder 115) function as stators in the vibration power generator 101.

When the electric power is generated by using the vibration power generator 101 configured as described above, the vibration power generator 101 is installed (fixed) on the vibration body such that the vibration input surface 110 is directly or indirectly connected to the vibration body. The installation of the vibration power generator 101 with respect to the vibration body can be performed by, for example, screwing, bonding, or the like.

Then, the environmental vibration from the vibration body is input from the vibration input surface 110 to the vibration power generator 101. In the vibration power generator 101, since the weight body 105 is elastically supported by the first tension coil spring 106 and the second tension coil spring 107 on the frame 102, the weight body 105 (magnet 116, yoke material 117, and high specific gravity material 118) vibrates in the vertical direction D with respect to the frame 102, the cover 103, and the coil unit 104 (air-core coil 114 and coil holder 115). At this time, spring constants of the first tension coil spring 106 and the second tension coil spring 107 are set such that the weight body 105 resonates with the environmental vibration generated by the vibration body. As a result, it is possible to cause the weight body 105 to resonate and to increase amplitude thereof. The spring constants of the first tension coil spring 106 and the second tension coil spring 107 can be set by, for example, the number of pieces, the number of windings, and wire diameters of the first tension coil spring 106 and the second tension coil spring 107. The magnet 116 vibrates with respect to the air-core coil 114, and the interlinkage magnetic flux of the air-core coil 114 changes, whereby the induced electromotive force is generated in the air-core coil 114. Accordingly, the vibration power generator 101 generates the electric power.

In this manner, in the vibration power generator 101 according to the embodiment, since Vickers hardness of the frame 102 is equal to or less than 700, it is possible to suppress degradation in workability of the frame 102 even when the frame 102 is hardened so as to be able to efficiently transfer vibration energy to the weight body 105.

Further, since the vibration input surface 110 is connected with the first connecting portion 121 and the second connecting portion 122 on the frame 102 by the material having Young's modulus that is equal to or larger than 40 GPa, it is possible to suppress attenuation of the vibration input from the vibration input surface 110 before the vibration is transferred to the first connecting portion 121 and the second connecting portion 122. Therefore, it is possible to efficiently transfer the vibration energy to the weight body 105.

Further, since the first connecting member 123 and the second connecting member 124 are formed of the material having Young's modulus that is equal to or larger than 40 GPa, it is possible to suppress the attenuation of the vibration at a position where the frame 102 is connected with the first tension coil spring 106 and the second tension coil spring 107.

The embodiment of the present disclosure has been described, but the present disclosure is not limited to the above embodiment.

Figure 10:
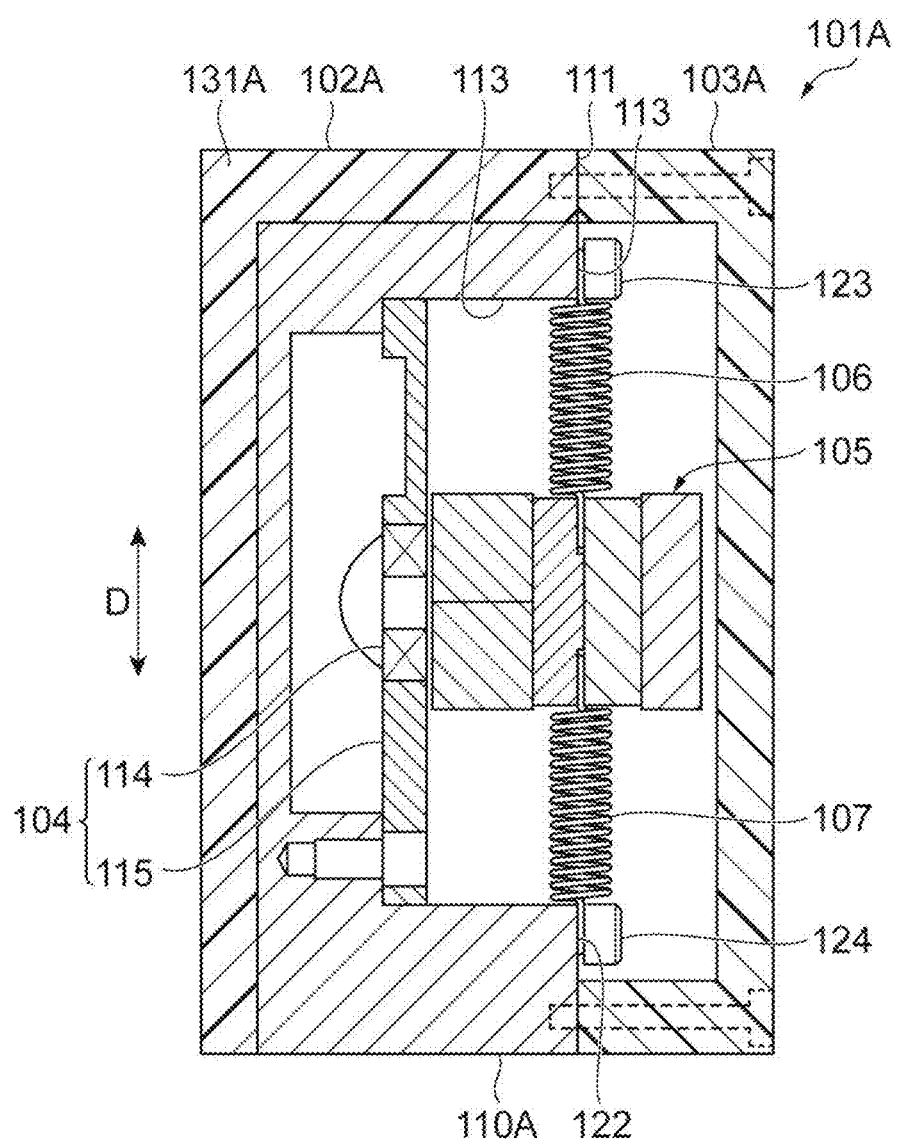
FIG. 10 is a cross-sectional view of a vibration power generator of a modification example.

For example, the frame is not necessary to be configured of one material and may be configured of a plurality of materials. Further, the vibration power generator may include a cover portion that covers a part on the surface of the frame. For example, a vibration power generator 101A illustrated in FIG. 10 includes a cover portion 131A that covers a part on the surface of a frame 102A. The cover portion 131A can be formed of a resin that can be manufactured inexpensively and in large quantities or a metal such as aluminum die-cast. The cover portion 131A may be foamed of the same material as the frame 102A. In this manner, a predetermined shape can be obtained inexpensively and in large quantities by covering a part on the surface of the frame 102A with the cover portion 131A. When the cover portion 131A is made of the resin, the attenuation of the vibration is suppressed at the time of the input of the vibration from the vibration input surface 110A. Therefore, the vibration input surface 110A may be exposed from the cover portion 131A. The productivity further improves by making the cover 103 made of the resin.

Further, the vibration input surface is described as the specific surface of the frame in the second embodiment, but the vibration input surface may be any surface of the frame. Further, the vibration input surface is not necessary to be the entire one surface of the frame, but may be only a part of the one surface of the frame.

Here, the average specific gravity of the weight body 105 is 8 g/cm$^3$ or more in the second embodiment, but the average specific gravity thereof may not be 8 g/cm$^3$ or more. In this case, the vibration power generator can be represented as follows.

[Clause 1] A vibration power generator comprising:
 a frame to which a vibration is input;
 a weight body that is elastically supported on the frame;
 a first tension coil spring and a second tension coil spring that are connected to the frame and elastically support the weight body from mutually opposite directions; and
 a power generation unit configured to generate induced electromotive force by vibrating the weight body with respect to the frame,
 wherein Vickers hardness of the frame is equal to or less than 700.

[Clause 2] The vibration power generator according to Clause 1,
 wherein the frame has a vibration input surface to which the vibration is input, a first connecting portion to which the first tension coil spring is connected, and a second connecting portion to which the second tension coil spring is connected, and
 wherein the vibration input surface is connected with the first connecting portion and the second connecting portion on the frame by a material having Young's modulus that is equal to or larger than 40 GPa.

[Clause 3] The vibration power generator according to Clause 2 further comprising:
 a first connecting member that connects the first tension coil spring to the frame in the first connecting portion; and
 a second connecting member that connects the second tension coil spring to the frame in the second connecting portion,
 wherein the first connecting member and the second connecting member are formed of a material having Young's modulus that is equal to or larger than 40 GPa.

[Clause 4] The vibration power generator according to Clauses 1 to 3 further comprising:
 a cover portion that covers a part on a surface of the frame.

Third Embodiment

Figure 11:
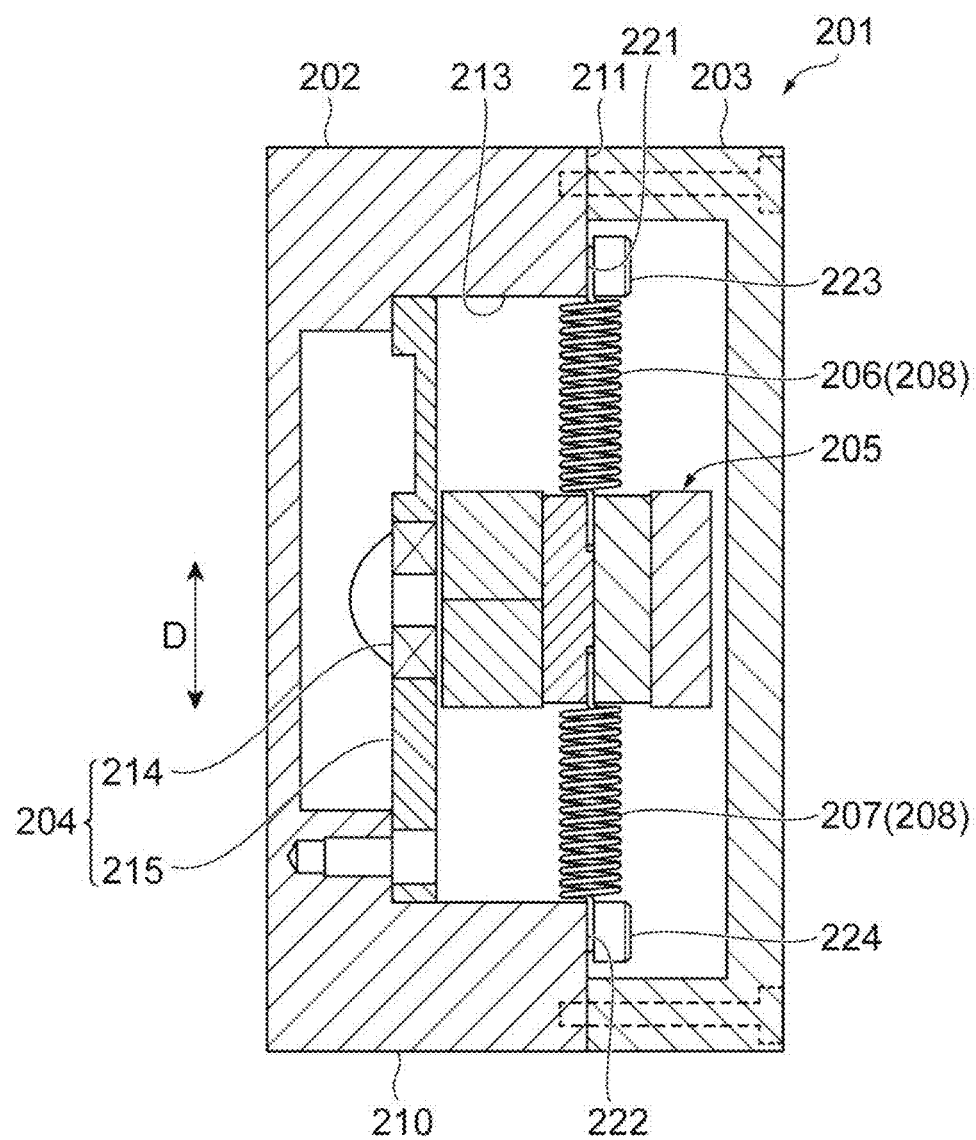
FIG. 11 is a cross-sectional view of a vibration power generator of a third embodiment.
Figure 12:
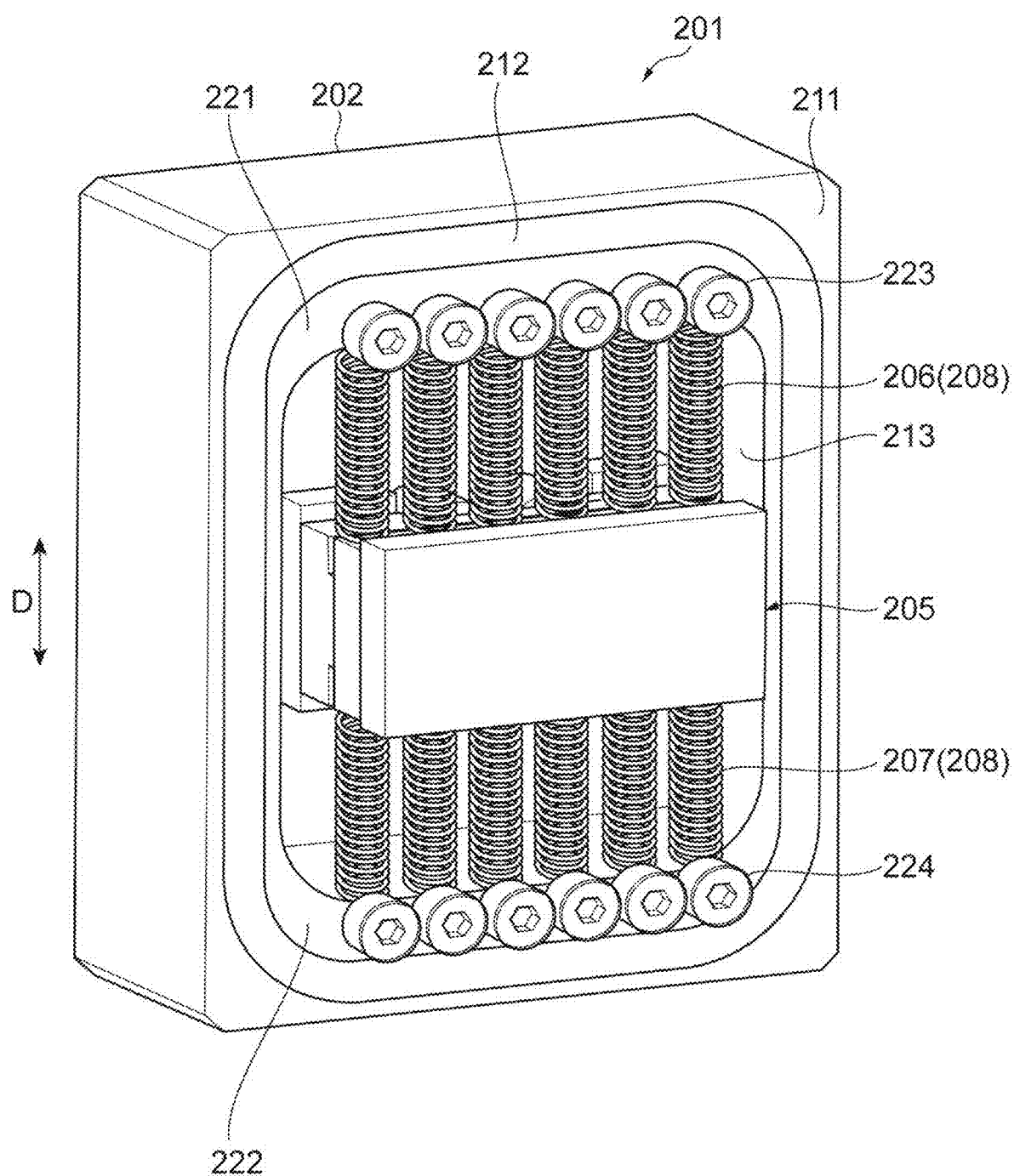
FIG. 12 is a perspective view of the vibration power generator from which a cover is removed.
Figure 13:
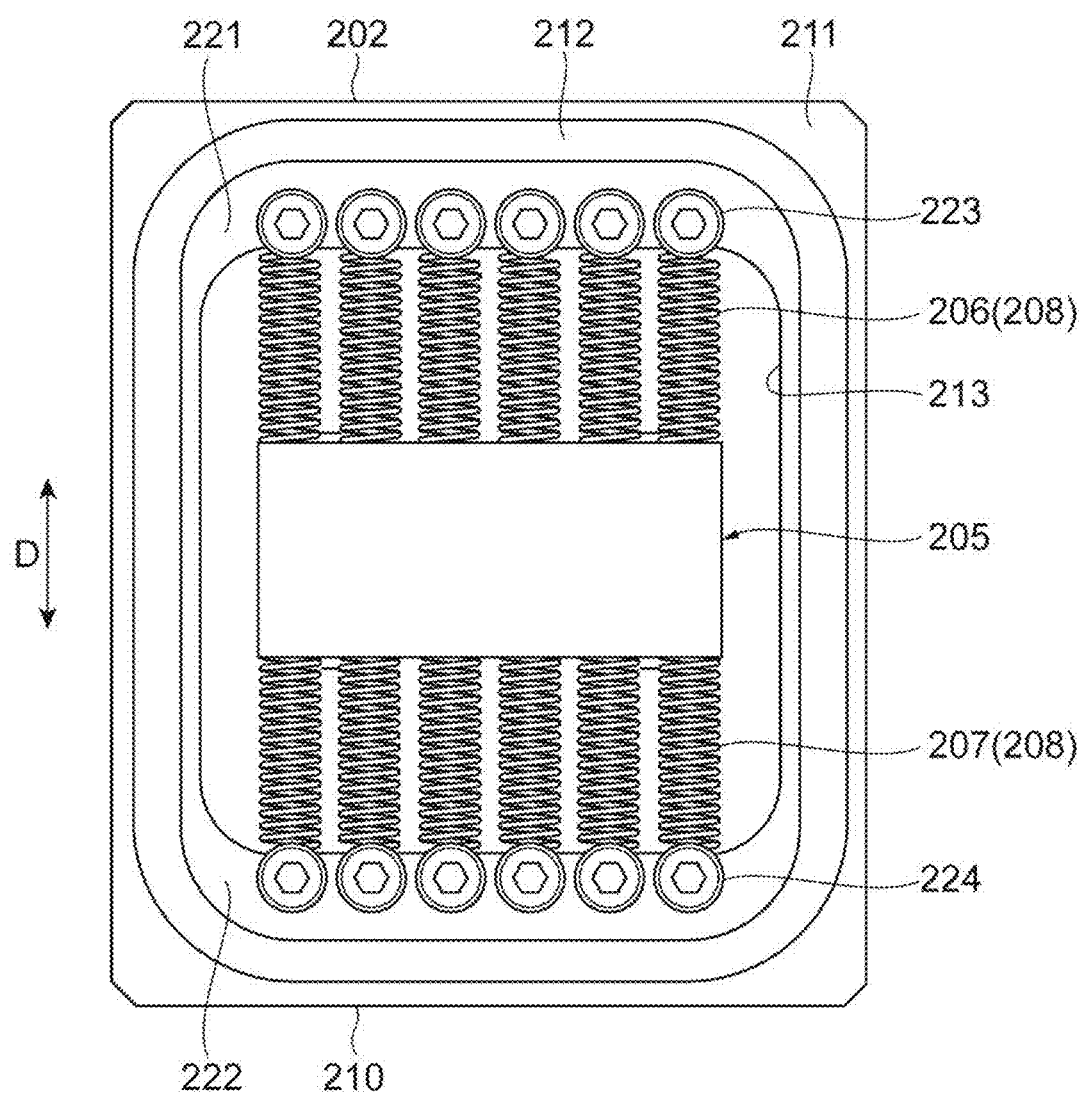
FIG. 13 is a front view of the vibration power generator from which the cover is removed.
Figure 14:
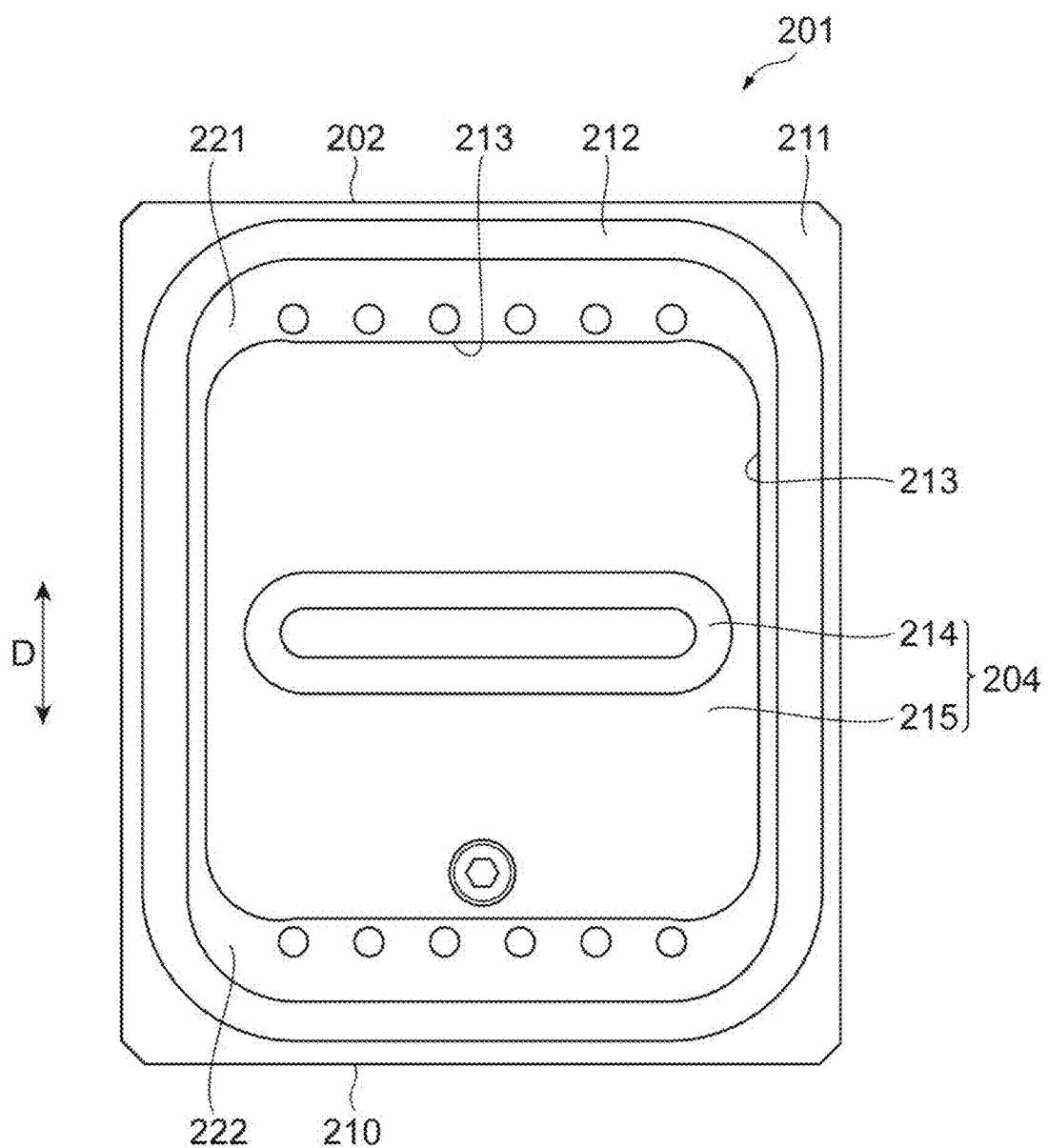
FIG. 14 is a front view of the vibration power generator from which a weight body, a first tension coil spring, and a second tension coil spring are removed.
Figure 15:
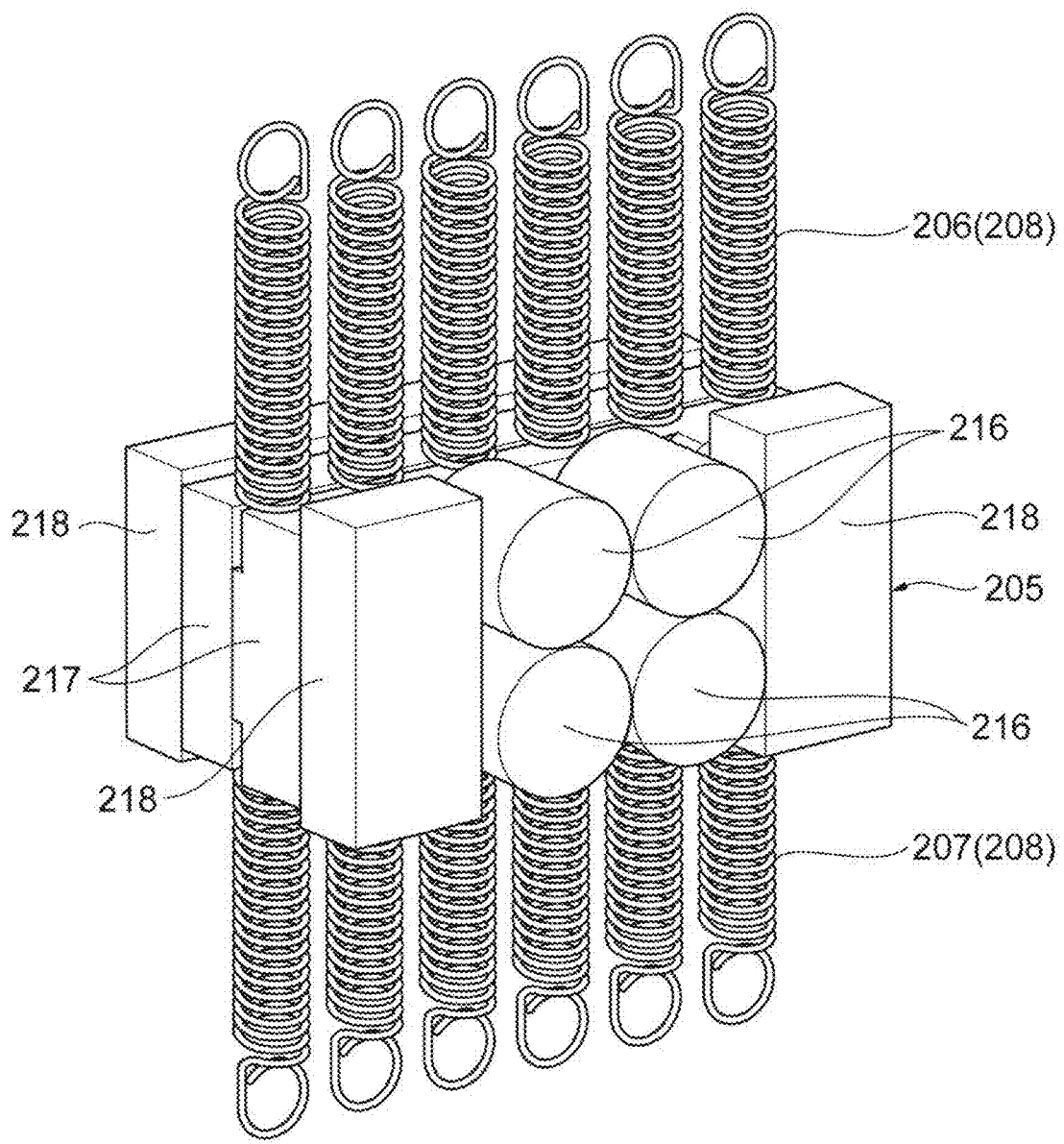
FIG. 15 is a perspective view of the weight body, the first tension coil spring, and the second tension coil spring.
Figure 16:
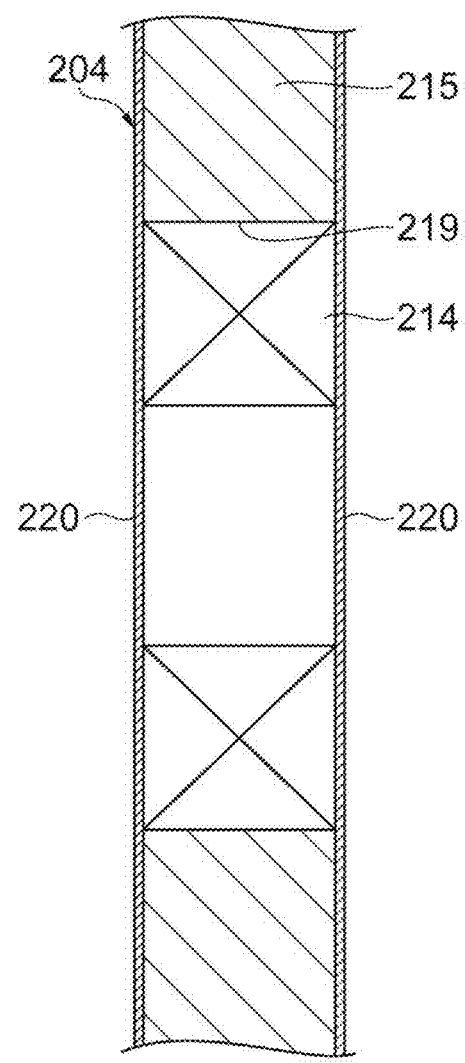
FIG. 16 is an enlarged cross-sectional view of a part of a coil holder.

Next, a third embodiment will be described. As illustrated in FIG. 11, a vibration power generator 201 of the embodiment has a frame 202, a cover 203, a coil unit 204, a weight body (moving body) 205, and an elastic portion (spring) 208.

As illustrated in FIGS. 11 to 14, the frame 202 and the cover 203 are members that form the housing of the vibration power generator 201. The frame 202 is formed in the box shape, the cylindrical shape, the semicylindrical shape (substantially semicircular cross-sectional cylindrical shape), or the like, and one surface thereof is a vibration input surface 210. The vibration input surface 210 is a surface to which the vibration is input. That is, the vibration power generator 201 directly or indirectly connects the vibration input surface 210 to a vibration body (not illustrated) to input an environmental vibration generated from the vibration body from the vibration input surface 210 to the vibration power generator 201. As a method of connecting the vibration input surface 210 to the vibration body, examples of the method are a method of attaching the neodymium magnet to the frame 202 and attaching this neodymium magnet to the vibration body to indirectly connect the vibration input surface 210 to the vibration body, a method of fixedly attaching the frame 202 to the vibration body with the band to directly connect the vibration input surface 210 to the vibration body, and a method of fixedly attaching the frame 202 to the vibration body with the screw to directly connect the vibration input surface 210 to the vibration body. In the following description, directions such as upper direction and lower direction of the vibration power generator 201 refer to directions in a state where the vibration input surface 210 is installed on the vibration body as the lower surface.

The cover 203 is attached to a side surface 211 of the frame 202 in a detachable manner. The side surface 211 is a surface adjacent to the vibration input surface 210. The side surface 211 is provided with a packing 212 for airtightly holding a space between the side surface 211 and the cover 203. The packing 212 is formed in a substantially rectangular annular shape. A substantially rectangular recessed portion 213 is formed on an inner peripheral side of the packing 212 on the side surface 211. The recessed portion 213 is a recess formed on the side surface 211 and is closed by attaching the cover 203 to the frame 202. The attachment of the cover 203 to the frame 202 can be performed by, for example, screwing.

As illustrated in FIGS. 11 to 14 and FIG. 16, the coil unit 204 is formed in the flat plate shape. The coil unit 204 has a coil 214 and a coil holder 215. The coil 214 is one of the members that generate the induced electromotive force. The coil 214 is the air-core coil in which the iron core is not provided on the inner peripheral side of the coil. The 214 is wound so as to have the oval shape, and the inner peripheral side thereof is hollow. The coil holder 215 is a member that accommodates the coil 214 and fixes the coil 214 to the frame 202.

A through hole 219 that accommodates the coil 214 is formed in the coil holder 215, and the coil 214 is accommodated in this through hole 219. The coil 214 is fixed in a state of being accommodated in the through hole 219 by tapes 220 stuck on the front and rear surfaces of the coil holder 215. The tape 220 does not reduce dynamic friction with a weight body 205 on the premise that the weight body 205 is brought into contact with like a friction reduction film disclosed in the patent document (Japanese Unexamined Patent Publication No. 2014-143792), but merely fixes the coil 214 to the coil holder 215. The coil holder 215 is formed in the substantially rectangular shape smaller than the recessed portion 213. The coil holder 215 is fixed to the frame 202 in a state of being inserted into the recessed portion 213 such that the accommodated coil 214 crosses the weight body 205 as viewed from the side surface 211. The coil holder 215 can be fixed to the frame 202 by, for example, the tape, the screw, or the like. In FIG. 11, only one position on one side of the coil holder 215 is fixed to the frame 202, but the fixed place, the number of fixes, and the like of the coil holder 215 are not particularly limited. For example, two positions on both sides of the coil holder 215 may be fixed to the frame 202, or four positions on four sides of the coil holder 215 may be fixed to the frame 202.

As illustrated in FIGS. 11 to 13 and 15, the weight body 205 is a member that is elastically supported on the frame 202. The weight body 205 has one or a plurality of magnets 216, a yoke material 217, and a high specific gravity material (weight member) 218.

The magnet 216 is a member that applies the magnetic field to the coil 214. The number of magnets 216 provided on the weight body 205 is not particularly limited. However, in the embodiment, it is assumed that four magnets 216 are provided on the weight body 205 and the four magnets 216 are disposed at four corners of a square. The magnet 216 is not particularly limited. For example, the magnet such as the neodymium magnet, the isotropic ferrite magnet, the anisotropic ferrite magnet, the samarium cobalt magnet, or the alnico magnet may be used as the magnet 216. The shape of the magnet 216 is not particularly limited and may be, for example, the columnar shape, the prismatic shape, or the like.

The yoke material 217 forms the magnetic circuit. The yoke material 217 is a member that passes the magnetic flux emitted from the magnet 216 to collect the magnetic flux of the magnet 216. The yoke material 217 is disposed on a side of the magnet 216 opposite to the coil unit 204 and is not disposed on a coil unit 204 side of the magnet 216. A magnetic path on the side of the magnet 216 opposite to the coil unit 204 is the closed magnetic path by the yoke material 217, and a magnetic path on the coil unit 204 side of the magnet 216 is the open magnetic path. That is, the magnetic flux does not leak from the coil unit 204 by passing through the yoke material 217 on the side of the magnet 216 opposite to the coil unit 204, but the magnetic flux leaks toward the coil unit 204 on the coil unit 204 side of the magnet 216. The yoke material 217 is not particularly limited. For example, the material such as soft steel, rolled steel for general structure, stainless steel, silicon steel, ferrite, FeNi alloy, or FeCo alloy may be used as the yoke material 217.

The high specific gravity material 218 is a member for increasing the specific gravity of the weight body 205. The high specific gravity material 218 is formed of a material having higher specific gravity than the magnet 216 and the yoke material 217. The high specific gravity material 218 is fixed by a surface of the yoke material 217 on a coil 214 side and a surface of the yoke material 217 on a side opposite to the coil 214. The high specific gravity material 218 is not particularly limited. For example, the material having the specific gravity of 8 $g/cm^3$ or more may be used as the high specific gravity material 218. Such a high specific gravity material 218 may contain any one or two or more of materials such as tungsten, lead, copper, brass, beryllium copper, nickel steel, austenitic stainless steel, and high-speed tool steel.

In the embodiment, the average specific gravity of the weight body 205 is 8 $g/cm^3$ or more.

The elastic portion 208 is connected to the frame 202 to elastically support the weight body 205. The elastic portion 208 has a first tension coil spring 206 and a second tension coil spring 207 that are connected to the frame 202 to elastically support the weight body 205 from mutually opposite directions. The first tension coil spring 206 and the second tension coil spring 207 are respectively configured of a plurality of tension coil springs and are disposed at positions facing each other. In the embodiment, the first tension coil spring 206 and the second tension coil spring 207 are respectively configured of six tension coil springs. Here, the six first tension coil springs 206 and the six second tension coil springs 207 are respectively connected to the upper and lower surfaces of the yoke material 217 in the embodiment, but the connection is not limited to being connected with six tension coil springs. For example, three or more first tension coil springs 206 and three or more second tension coil springs 207 may be respectively connected to the upper and lower surfaces of the yoke material 217. For example, the number of coil springs connected to the yoke material 217 may be decided according to the spring constant required when the weight body 205 is vibrated. The plurality of first tension coil springs 206 may be disposed in two rows along an upper direction on the upper surface of the yoke material 217. Similarly, the plurality of second tension coil springs 207 may be disposed in two rows along an lower direction on the lower surface of the yoke material 217. Further, four first tension coil springs 206 may be respectively connected to four corners on the upper surface of the yoke material 217. Similarly, four second tension coil springs 207 may be respectively connected to four corners on the lower surface of the yoke material 217. Further, when the plurality of first tension coil springs 206 and second tension coil springs 207 are connected to the yoke material 217 as described above, the first tension coil springs 206 and the second tension coil springs 207 may also be disposed so as to be symmetrical with respect to the center position in the vertical direction of the yoke material 217 in the vertical direction.

One end portion of the first tension coil spring 206 is connected to a first side surface portion 221 located above the recessed portion 213 on the side surface 211 by a screw 223. One end portion of the second tension coil spring 207 is connected to a second side surface portion 222 located below the recessed portion 213 on the side surface 211 by a screw 224. That is, one end portion of the first tension coil spring 206 is locked by the screw 223 screwed into the first side surface portion 221 to connect one end portion of the first tension coil spring 206 to the first side surface portion 221. Further, one end portion of the second tension coil spring 207 is locked by the screw 224 screwed into the second side surface portion 222 to connect one end portion of the second tension coil spring 207 to the second side surface portion 222. A first pin and a second pin that are inserted into and locked on the side surface 211 of the frame 202 may be used instead of the screws 223 and 224. In this case, the first tension coil spring 206 and the second tension coil spring 207 can be connected to the side surface 211 of the frame 202 by inserting and locking the first pin and the second pin on the side surface 211 of the frame 202 and by locking the first tension coil spring 206 and the second tension coil spring 207 to the first pin and the second pin.

The other end portions of the first tension coil spring 206 and the second tension coil spring 207 are connected to the weight body 205. Specifically, the other end portion of the first tension coil spring 206 is connected to a portion of the weight body 205 on a first side surface portion 221 side, and the other end portion of the second tension coil spring 207 is connected to a portion of the weight body 205 on a second side surface portion 222 side. The connection with respect to the weight body 205 of the first tension coil spring 206 and the second tension coil spring 207 can be performed, for example, by dividing the yoke material 217 into two and by locking and interposing the other end portions of the first tension coil spring 206 and the second tension coil spring 207 between the two divided yoke materials 217. However, the other end portions of the first tension coil spring 206 and the second tension coil spring 207 may be connected to any member configuring the weight body 205.

The weight body 205 is disposed only on one side of the coil unit 204. The weight body 205 is elastically supported by the first tension coil spring 206 and the second tension coil spring 207 in a suspended manner such that the magnet 216 and the coil unit 204 face each other and a gap is formed between the magnet 216 and the coil unit 204. Here, the first tension coil spring 206 and the second tension coil spring 207 are locked by the screws 223 and 224, and are connected to the first side surface portion 221 and the second side surface portion 222 as described above. Therefore, the gap between the weight body 205 and the coil unit 204 can be adjusted by adjusting locking positions of the first tension coil spring 206 and the second tension coil spring 207 with respect to the screws 223 and 224 or by adjusting distances of the coil unit 204 from the first side surface portion 221 and the second side surface portion 222 in the depth direction of the recessed portion 213.

Further, the weight body 205 can vibrate with respect to the frame 202 in the vertical direction D by resisting against elastic force of the first tension coil spring 206 and the second tension coil spring 207. When the weight body 205 vibrates with respect to the frame 202 in the vertical direction D, the magnet 216 vibrates with respect to the coil 214. Therefore, interlinkage magnetic flux of the coil 214 changes. Accordingly, the induced electromotive force is generated in the coil 214. The weight body 205 (magnet 216, yoke material 217, and high specific gravity material 218) functions as a vibrator in the vibration power generator 201, and the frame 202, the cover 203, and the coil unit 204 (coil 214 and coil holder 215) function as stators in the vibration power generator 201.

When the electric power is generated by using the vibration power generator 201 configured as described above, the vibration power generator 201 is installed (fixed) on the vibration body such that the vibration input surface 210 is directly or indirectly connected to the vibration body. The installation of the vibration power generator 201 with respect to the vibration body can be performed by, for example, screwing, bonding, or the like.

Then, the environmental vibration from the vibration body is input from the vibration input surface 210 to the vibration power generator 201. In the vibration power generator 201, since the weight body 205 is elastically supported by the first tension coil spring 206 and the second tension coil spring 207 on the frame 202, the weight body 205 (magnet 216, yoke material 217, and high specific gravity material 218) vibrates in the vertical direction D with respect to the frame 202, the cover 203, and the coil unit 204 (coil 214 and coil holder 215). At this time, spring constants of the first tension coil spring 206 and the second tension coil spring 207 are set such that the weight body 205 resonates with the environmental vibration generated by the vibration body. As a result, it is possible to cause the weight body 205 to resonate and to increase amplitude thereof. The spring constants of the first tension coil spring 206 and the second tension coil spring 207 can be set by, for example, the number of pieces, the number of windings, and wire diameters of the first tension coil spring 206 and the second tension coil spring 207. The magnet 216 vibrates with respect to the coil 214, and the interlinkage magnetic flux of the coil 214 changes, whereby the induced electromotive force is generated in the coil 214. Accordingly, the vibration power generator 201 generates the electric power.

In this manner, in the vibration power generator 201 according to the embodiment, since the yoke material 217 is disposed on the side of the magnet 216 opposite to the coil unit 204 and the magnetic path on the coil unit 204 side of the magnet 216 is the open magnetic path, the weight body 205 can be disposed only on one side of the coil unit 204. Accordingly, the gap can be formed between the coil unit 204 and the weight body 205 by separating the weight body 205 from the coil unit 204. As a result, the gap is formed between the coil unit 204 and the weight body 205, and thus a loss of the vibration energy of the weight body 205 can be suppressed.

Further, since the elastic portion 208 elastically supports the weight body 205 such that the gap is formed between the weight body 205 and the coil unit 204, contact between the weight body 205 and the coil unit 204 can be suppressed.

Further, since the elastic portion 208 has the first tension coil spring 206 and the second tension coil spring 207 that are connected to the frame 202 and elastically support the weight body 205 from mutually opposite directions, the weight body 205 can be elastically supported such that the gap is easily formed between the weight body 205 and the coil unit 204.

Further, since the coil 214 is the air-core coil, it is possible to suppress attraction of the magnet 216 toward the coil 214 side and thus to suppress the loss of the vibration energy of the weight body 205.

The embodiment of the present disclosure has been described, but the present disclosure is not limited to the above embodiment.

Further, the coil is described as the air-core coil in the third embodiment. However, the iron core may be provided on the inner peripheral side of the coil as long as the attraction of the magnet toward the coil side is not a problem or there is another means for suppressing the attraction of the magnet toward the coil side.

Further, the vibration input surface is described as the specific surface of the frame in the third embodiment, but the vibration input surface may be any surface of the frame. Further, the vibration input surface is not necessary to be the entire one surface of the frame, but may be only a part of the one surface of the frame.

Here, the average specific gravity of the weight body 205 is 8 g/cm$^3$ or more in the third embodiment, but the average specific gravity thereof may not be 8 g/cm$^3$ or more. Further, for example, the elastic portion has the first tension coil spring and the second tension coil spring in the third embodiment. However, any elastic portion that is connected to the frame and elastically supports the weight body may be employed. In these cases, the vibration power generator can be represented as follows.

[Clause 1] A vibration power generator comprising:
a frame to which the vibration is input;
a coil unit that is fixed to the frame;
a weight body that is elastically supported on the frame; and
an elastic portion that is connected to the frame and elastically supports the weight body,
wherein the weight body has a magnet and a yoke material that is disposed on a side of the magnet opposite to the coil unit, and
wherein a magnetic path on a coil unit side of the magnet is an open magnetic path.

[Clause 2] The vibration power generator according to Clause 1,
wherein the elastic portion elastically supports the weight body such that a gap is formed between the weight body and the coil unit.

[Clause 3] The vibration power generator according to Clause 2,
wherein the elastic portion has a first tension coil spring and a second tension coil spring that are connected to the frame and elastically support the weight body from mutually opposite directions.

[Clause 4] The vibration power generator according to any of Clauses 1 to 3,
wherein the coil is an air-core coil.

Fourth Embodiment

Figure 17:
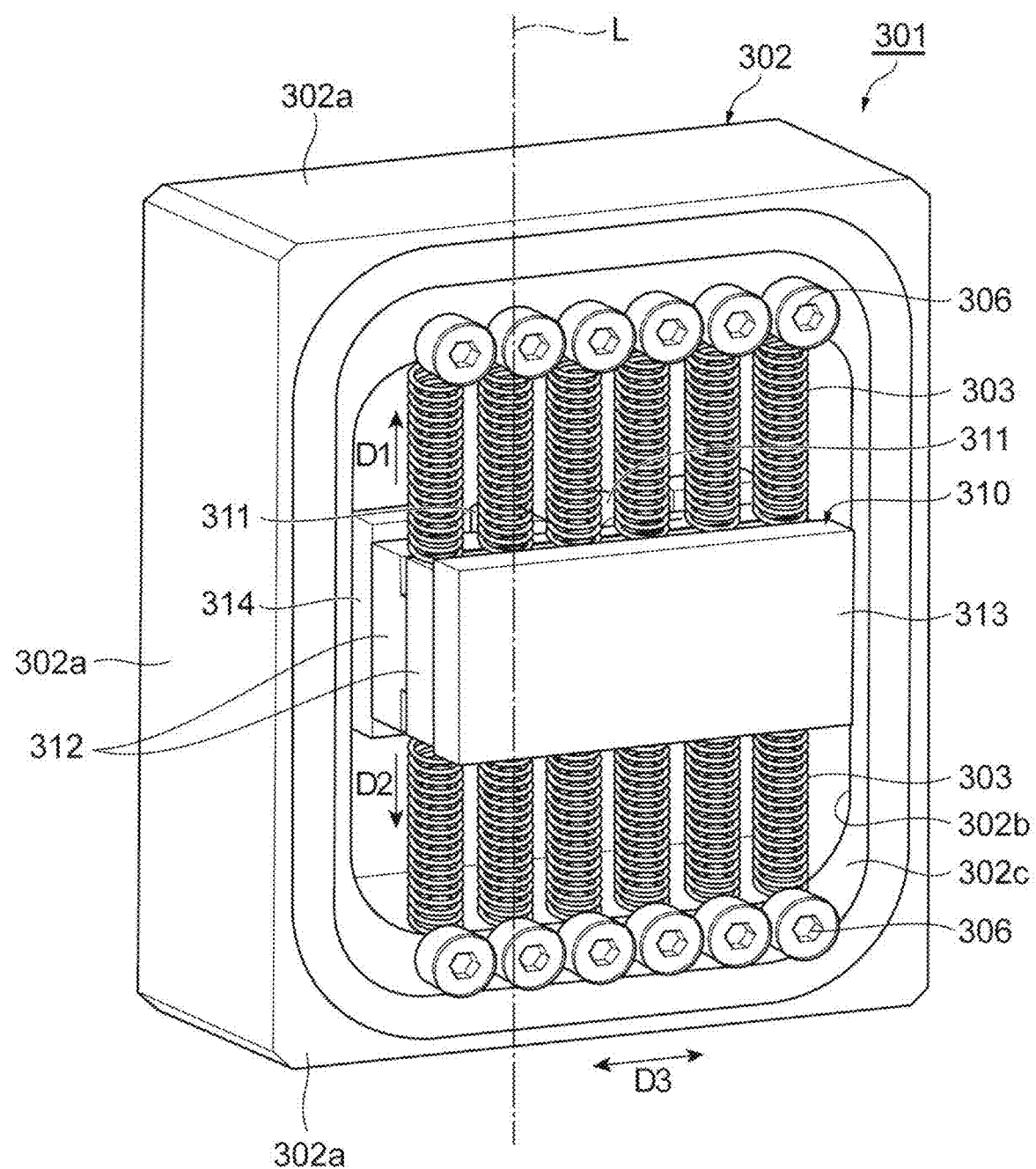
FIG. 17 is a perspective view of a vibration power generator according to a fourth embodiment.
Figure 18:
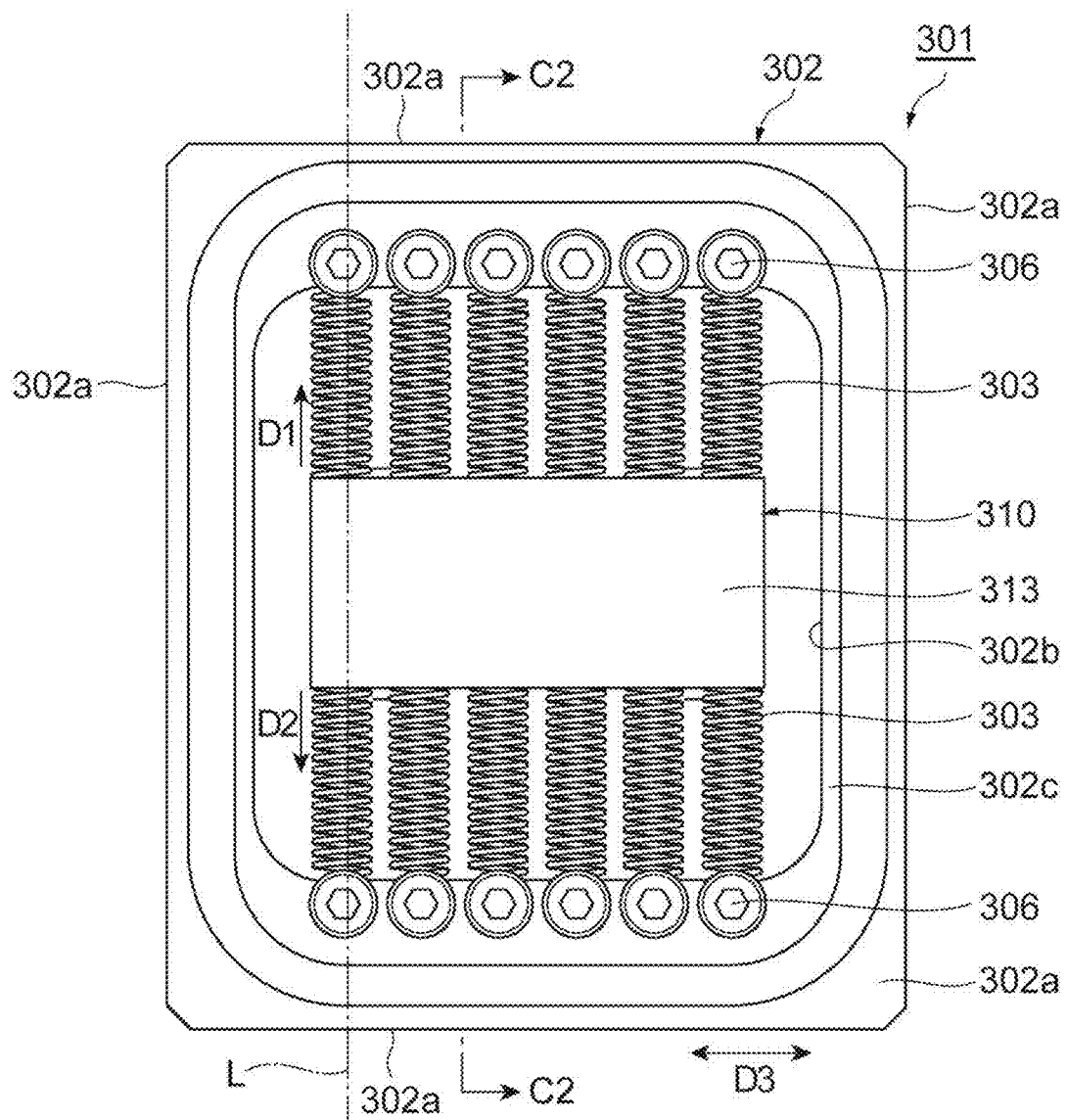
FIG. 18 is a side surface view of the vibration power generator of FIG. 17.
Figure 19:
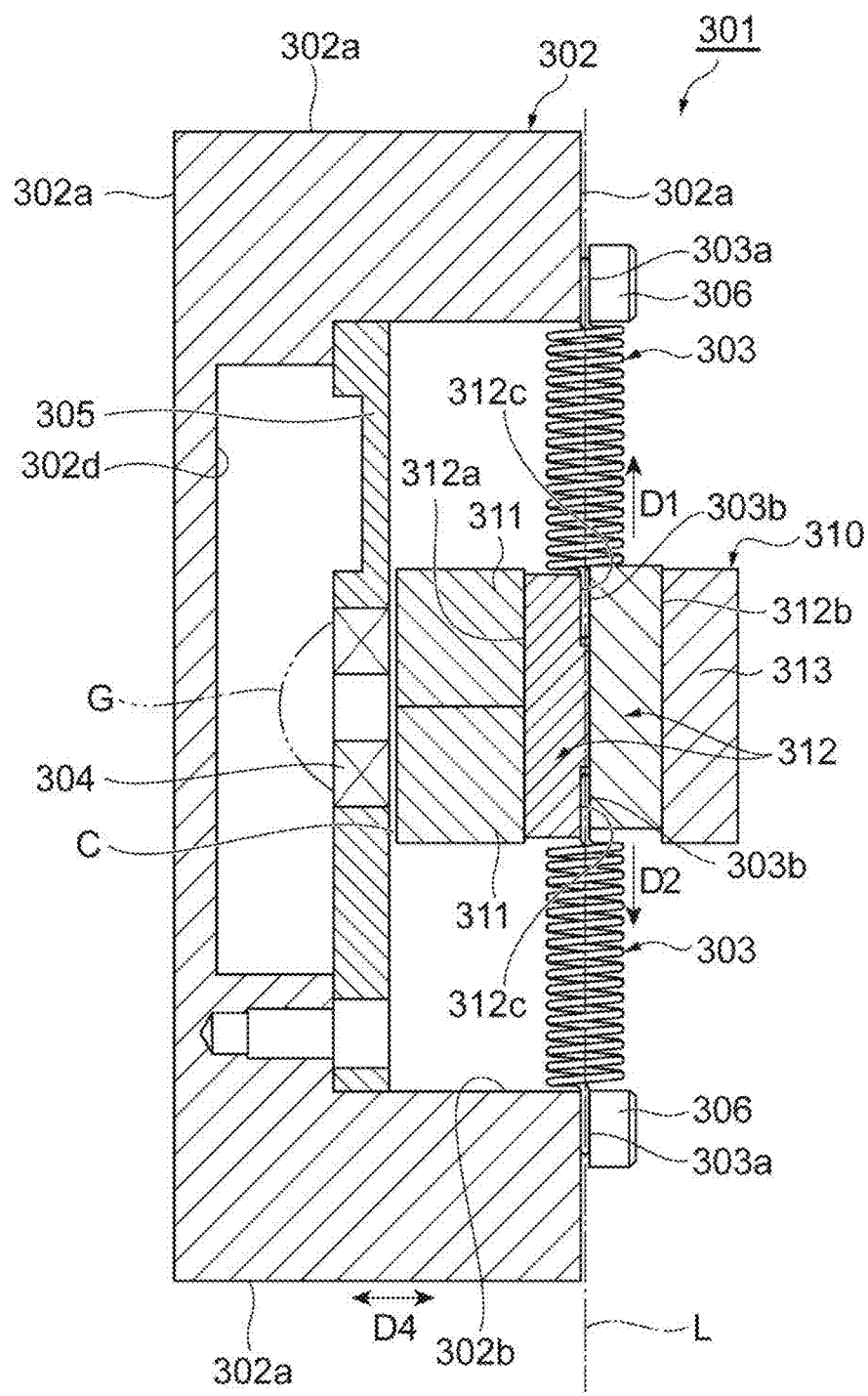
FIG. 19 is a cross-sectional view taken along a line C2-C2 in FIG. 18.

Next, a fourth embodiment will be described. As illustrated in FIGS. 17 to 19, a vibration power generator 301 according to the embodiment includes, for example, a housing (frame) 302, a plurality of springs 303 attached to the housing 302, a coil 304 fixed inside the housing 302, and a weight body (moving body) 310 suspended by the springs 303.

A magnet 311 is attached to the weight body 310. The vibration power generator 301 receives a vibration from the outside, and the weight body 310 resonates in an extension direction of an axial line L of the spring 303 accompanied by the received vibration. A resonance frequency of the weight body 310 is, for example, 50 Hz. The magnet 311 relatively moves with respect to the fixed coil 304 to generate the induced electromotive force in the coil 304 due to electromagnetic induction. That is, the vibration power generator 301 is a vibration power generation device that generates the electric power by an electromagnetic induction type.

The vibration power generator 301 is attached to, for example, a machine including a machine tool, a moving body, or the like, or a construction including a bridge or the like to obtain electromotive force from the vibration of the machine, the construction, or the like. The vibration power generator 301 may be attached to the vibration source such as the motor by, for example, the magnetic force of the neodymium magnet or the like attached to the housing 302. The vibration power generator 301 may be attached to the vibration source by, for example, fixing the housing 302 and the vibration source such as the motor with a band. Further, the vibration power generator 301 may be attached to the vibration source by fixing the housing 302 to the vibration source such as the motor with a bolt.

The housing 302 has a rectangular parallelepiped shape including, for example, six surfaces 302*a*. The shape of the housing 302 is not limited to the rectangular parallelepiped shape. For example, the housing 302 may be the box body having the appearance such as the substantially columnar shape or the semicylindrical shape (substantially semicircular cross-sectional columnar shape). In the embodiment, four corners of the widest surface 302*a* of the six surfaces 302*a* are chamfered. Further, a recessed portion 302*b* in which the spring 303, the coil 304, and the weight body 310 are accommodated is formed on the widest one surface 302*a*. A frame-shaped spring-holding frame 302*c* to which the plurality of springs 303 are attached is provided in the recessed portion 302*b*. The spring-holding frame 302*c* has a shape in which rectangular corner portions are rounded. The spring-holding frame 302*c* is made of, for example, metal and may be configured of aluminum.

Further, the spring-holding frame 302*c* may be configured of the material having Young's modulus that is equal to or larger than 40 GPa. In the spring-holding frame 302*c*, an attachment portion 303*a* of each spring 303 is fixed by fixing member 306. The attachment portion 303*a* has, for example, a ring shape (refer to FIG. 20), and the fixing member 306 is inserted into the attachment portion 303*a* and the fixing member 306 is screwed into the spring-holding frame 302*c* to fix the attachment portion 303*a* to the spring-holding frame 302*c*. The fixing member 306 is, for example, a hexagonal socket head bolt. Connection means of the attachment portion 303*a* of the spring 303 to the spring-holding frame 302*c* is not limited to the fixing member 306 and can be changed as appropriate. For example, a plurality of pins may be inserted into the spring-holding frame 302*c* of the housing 302 and each attachment portion 303*a* of the spring 303 may be hooked onto the plurality of pins to connect the attachment portion 303*a* thereof to the spring-holding frame 302*c*.

The spring 303 is, for example, the tension coil spring. As an example, the wire diameter of the spring 303 is 0.29 mm, a diameter H (refer to FIG. 21B) which is the outer diameter of the spring 303 is 2.50 mm, the free length of the spring 303 is 11.6 mm, an allowable maximum length of the spring 303 is 18.9 mm, and the spring constant of the spring 303 is 0.225 N/mm. The vibration power generator 301 includes the plurality of springs 303, and the plurality of springs 303 are disposed so as to be parallel to each other. On end of each spring 303 is attached to the spring-holding frame 302*c*, and the other end of each spring 303 is attached to the weight body 310. The weight body 310 is provided at least between two springs 303. A part of the plurality of springs 303 extends from the weight body 310 in a first direction D1, and a remaining portion of the plurality of springs 303 extends from the weight body 310 in a second direction D2 which is a direction opposite to the first direction D1.

The first direction D1 and the second direction D2 match a direction in which the axial line L of each spring 303 extends. The plurality of springs 303 are provided side by side along a width direction D3 of the vibration power generator 301 and are disposed, for example, at regular intervals along the width direction D3. One spring 303 is disposed along a thickness direction D4 of the vibration power generator 301, but the plurality of springs 303 may be disposed along the thickness direction D4. As an example, a total of twelve springs 303 can be provided. Six springs 303 of the twelve springs 303 are provided side by side along the width direction D3 and extend from the weight body 310 in the first direction D1. Remaining six springs 303 are provided side by side along the width direction D3 and extend from the weight body 310 in the second direction D2. The weight body 310 is suspended between the six springs 303 extending in the first direction D1 and the six springs 303 extending in the second direction D2.

However, the number of the springs 303 is not limited to twelve. For example, four springs 303 respectively extending from four corners of the weight body 310 in the first direction D1 and the second direction D2 may be provided, and the number of the springs 303 can be changed as appropriate. Further, three springs 303 extending from the weight body 310 in the first direction D1 and three springs 303 extending from the weight body 310 in the second direction D2 may be included. Furthermore, the plurality of springs 303 may be disposed at mutually symmetrical positions with respect to the center of the weight body 310. In this case, suppression of the vibration of the weight body 310 in a direction other than the first direction D1 and the second direction D2 and of a rotation of the weight body 310, division of the spring constant of each spring 303, and ensuring of the stroke of the spring 303 can be satisfied. Furthermore, since each spring 303 can be miniaturized, it is possible to improve stability of the vibration power generator 301 and to realize the miniaturization of the vibration power generator 301 itself.

The coil 304 is disposed between a bottom surface 302d of the recessed portion 302b of the housing 302 and the weight body 310. Further, the vibration power generator 301 includes a coil holder 305 holding the coil 304, and the coil holder 305 is fixed to the housing 302 by, for example, the tape in a state of holding the coil 304. Fixing means of the coil holder 305 to the housing 302 is not limited to the tape and can be changed as appropriate. The coil holder 305 may be fixed to the housing 302 by, for example, the screw. Further, only end portion (lower side end portion of FIG. 19) of the coil holder 305 in the second direction D2 may be fixed to the housing 302, or a plurality of positions of the coil holder 305 may be respectively fixed to the housing 302. The number of fixed places and a disposition form of the coil holder 305 with respect to the housing 302 can be changed as appropriate.

The coil holder 305 is made of, for example, plastic. Further, the coil 304 is the air-core coil. For example, an open magnetic path G is formed between the magnet 311 attached to the weight body 310 and the coil 304 and the bottom surface 302d. Further, a space C is formed between the coil holder 305 and the weight body 310, and the coil holder 305 and the weight body 310 are non-contact with each other. Accordingly, since friction force accompanied by contact with the coil holder 305 is not generated in the weight body 310, it is possible to avoid the reduction in the vibration of the weight body 310.

Figure 20:
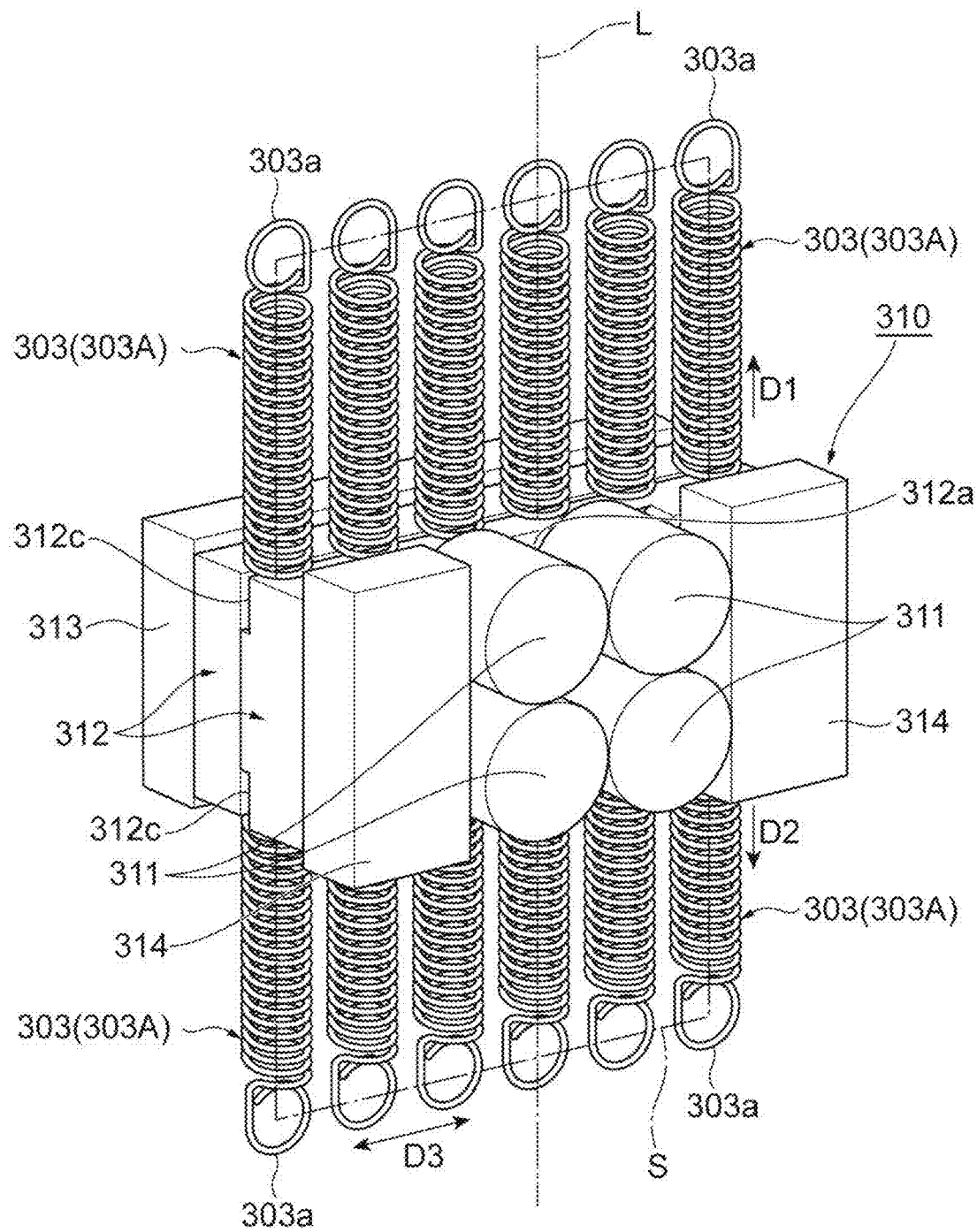
FIG. 20 is a perspective view of a weight body and a spring of the vibration power generator of FIG. 17.

FIG. 20 is a perspective view of the spring 303 and the weight body 310. As illustrated in FIGS. 19 and 20, the weight body 310 includes the magnet 311 described above, a yoke material 312, and center-of-gravity adjusting members (weight members) 313 and 314. Here, when a plane formed by connecting the attachment portions 303a of four springs 303A located at each of both ends in the width direction D3 is set as a plane S, the yoke material 312 is disposed on the plane S. The magnet 311 is disposed on one side (front side of FIG. 20) as viewed from the plane S, and the center-of-gravity adjusting member 313 is disposed on a side (rear side of FIG. 20) opposite to the magnet 311 as viewed from the plane S. In other words, the magnet 311 and the center-of-gravity adjusting member 313 are disposed at positions shifted from the axial line L of each spring 303, and the center-of-gravity adjusting member 313 is attached to the side opposite to the magnet 311 as viewed from the axial line L of each spring 303. In this manner, in the weight body 310 according to the embodiment, each component is disposed asymmetrically with respect to the spring 303.

In the specification, the component "disposed on one side as viewed from the axial line of the spring" includes a component disposed in a specific direction as viewed from the axial line of the spring, and a component disposed on the axial line of the spring and to be shifted in the specific direction with respect to the axial line. For example, "a magnet is disposed on one side as viewed from the axial line of the spring" includes a state where a part of the magnet 311 interferes on the axial line L of the spring 303, a state where a dimension of a portion of the magnet 311 protruded from the yoke material 312 is smaller than a dimension of a portion of the magnet 311 entered into the yoke material 312, and the like.

A plurality of magnets 311 are attached to the weight body 310, and, for example, four magnets 311 are disposed so as to form a square shape at the center of the yoke material 312. Among the four magnets 311, for example, two magnets 311 on a first direction D1 side expose N pole surfaces and two magnets 311 on a second direction D2 side expose S pole surfaces. Each magnet 311 is, for example, the neodymium magnet. Magnetic flux density of each magnet 311 is 5000 gauss, and the specific gravity of each magnet 311 is 7.4 g/cm$^3$. Further, each magnet 311 has the columnar shape, and a diameter of each magnet 311 is 6 mm and a height of each magnet 311 is 5 mm as an example.

An end portion 303b on a side opposite to the attachment portion 303a of each spring 303 is fixed in a state of being interposed between two yoke materials 312. For example, one of the two yoke materials 312 is provided with a recessed portion 312c into which the end portion 303b enters, and a depth of the recessed portion 312c in the thickness direction D4 is approximately the same as the wire diameter of the end portion 303b of the spring 303. The four magnets 311 are attracted to one of the two yoke materials 312. In other words, the two yoke materials 312 are in close contact with the four magnets 311. Each yoke material 312 is configured of iron or steel and has a rectangular plate shape.

The four magnets 311 are provided on one side of the two yoke materials 312 and are oriented to a bottom surface 302d side of the recessed portion 302b to form the open magnetic path G described above. The yoke material 312 forms the magnetic circuit. Here, the yoke material 312 forms the closed magnetic path on a side of the magnet 311 opposite to the bottom surface 302d to suppress the flow of the magnetic flux to an outer side of the recessed portion 302b. The yoke material 312 may be configured of a SS400 material. In this case, it is possible to obtain the yoke material 312 that has relatively good magnetic characteristics and is inexpensive and easily available. The specific gravity of the yoke material 312 is, for example, 7.8 g/cm$^3$.

The yoke material 312 has a first surface 312a on which the magnet 311 is stuck and a second surface 312b that is oriented to a side opposite to the first surface 312a and on which the center-of-gravity adjusting member 313 is stuck.

The center-of-gravity adjusting member 313 is a member that adjusts the center-of-gravity of the weight body 310 and is, for example, the high specific gravity material. In the specification, the high specific gravity material indicates a member configured of a material having higher specific gravity than at least the magnet 311 and may be a member configured of a material having the specific gravity of 8.0 g/cm$^3$ or more. That is, the high specific gravity material includes a member configured of a material having higher specific gravity than a common steel material (7.8 g/cm$^3$ to 7.9 g/cm$^3$).

In the embodiment, the average specific gravity of the weight body 310 is 8 g/cm$^3$ or more.

In the embodiment, the high specific gravity material may be configured of a tungsten-containing resin. When the high specific gravity material is configured by containing the resin, the high specific gravity material can be manufactured by injection molding of the resin. Therefore, it is possible to manufacture the high specific gravity material inexpensively and in large quantities, and to manufacture the high specific gravity material in any shape. The tungsten-containing resin includes tungsten made into a powder and the resin such as nylon, and the specific gravity of the tungsten-containing resin is, for example, 13 g/cm$^3$. In this manner, when the center-of-gravity adjusting member 313 is the high specific gravity material such as the tungsten-containing resin, the mass of the weight body 310 can be increased while the miniaturization is maintained. Accordingly, it is possible to realize the miniaturization of the vibration power generator 301 and to increase an output of the electric power from the vibration power generator 301 by enhancing inertia energy of the weight body 310 to increase the amplitude of the vibration.

The center-of-gravity adjusting member 313 has, for example, the rectangular plate shape and is stuck on a side of the yoke material 312 opposite to the magnet 311. Accordingly, it is possible to adjust the center-of-gravity of the weight body 310. By the way, a position of the center-of-gravity of the weight body 310 may be close to the plane S formed by connecting the attachment portions 303a of the four springs 303A described above. In this case, it is possible to move the weight body 310 in vibration modes in the first direction D1 and the second direction D2 and to suppress an input of a vibration mode other than the first direction D1 and the second direction D2. In this manner, since the weight body 310 can vibrate along the first direction D1 and the second direction D2 by suppressing the vibration mode other than the first direction D1 and the second direction D2, it is possible to further increase the output.

However, when the volume of the center-of-gravity adjusting member 313 is approximately the same as the volume of the plurality (four) of magnets 311, the center-of-gravity of the weight body 310 is shifted to a center-of-gravity adjusting member 313 side compared with the plane S. Accordingly, it is necessary to reduce the volume of the center-of-gravity adjusting member 313 or stick a center-of-gravity adjusting member 314 also on a magnet 311 side of the yoke material 312 to bring the center-of-gravity of the weight body 310 close to the plane S. In the embodiment, the center-of-gravity adjusting member 314 is stuck on the magnet 311 side of the yoke material 312 to bring the center-of-gravity of the weight body 310 close to the plane S. The center-of-gravity adjusting member 314 may be configured of, for example, the same material as the center-of-gravity adjusting member 313.

The center-of-gravity adjusting member 314 is respectively disposed on both sides of the magnet 311 in the width direction D3. For example, the sum of the volume of the center-of-gravity adjusting member 314 and the volume of the four magnets 311 is larger than the volume of the center-of-gravity adjusting member 313. Accordingly, it is possible to bring the center-of-gravity of the weight body 310 close to the plane S by balancing the center-of-gravity of the weight body 310.

As an example, the length of the weight body 310 in an axial line direction (first direction D1 and second direction D2) of the spring 303 is 12.8 mm, the length of the weight body 310 in the width direction D3 thereof is 23.0 mm, and the length of the weight body 310 in the thickness direction D4 thereof is 13.5 mm. The magnet 311, the yoke material 312, and the center-of-gravity adjusting members 313 and 314 are housed within a range of 12.8 mm×23.0 mm×13.5 mm, and the mass of the weight body 310 is, for example, 32 g.

Figure 21A:
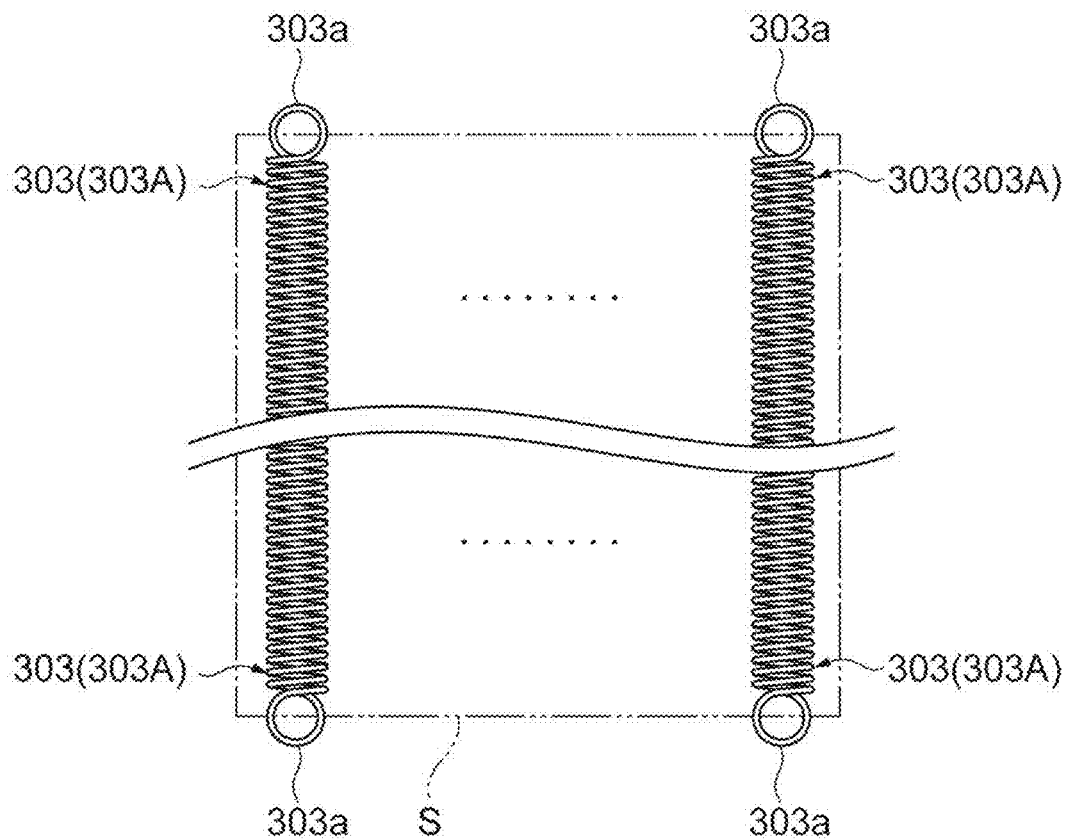
FIG. 21A is a diagram describing a plane formed by connecting attachment portions of a plurality of springs.
Figure 21B:
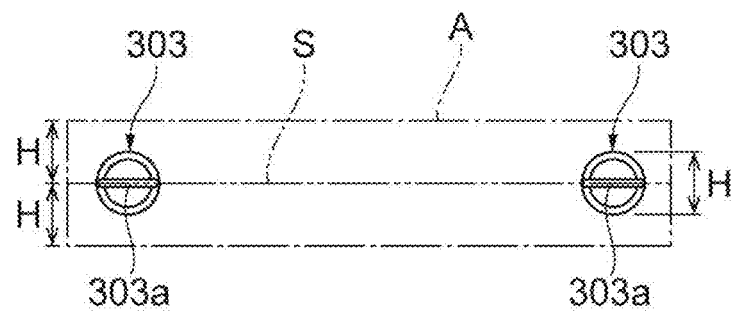
FIG. 21B is a diagram describing a space obtained by being offset with respect to the plane of FIG. 21A.

FIG. 21A is a diagram illustrating the plane S formed by connecting the attachment portions 303a of the four springs 303A. FIG. 21B is a diagram illustrating a space A obtained by offsetting the plane S in a radial direction of the spring 303. In the weight body 310, since the magnet 311 and the center-of-gravity adjusting member 314 are stuck on one side of the yoke material 312 and the center-of-gravity adjusting member 313 is stuck on the other side of the yoke material 312, the center-of-gravity of the weight body 310 is located inside the space A. The space A is a space obtained by offsetting by the diameter H of the spring 303 in the radial direction of the spring 303 with respect to the plane S. In this manner, the center-of-gravity adjusting member 313 and the center-of-gravity adjusting member 314 are stuck to adjust the position of the center-of-gravity of the weight body 310 so as to be brought inside the space A. As a result, it is possible to stabilize the vibration of the weight body 310.

Next, action effects obtained from the vibration power generator 301 according to the embodiment will be described in detail. As illustrated in FIGS. 19 and 20, the vibration power generator 301 includes the weight body 310 supported by the spring 303 inside the housing 302, and the magnet 311 and the center-of-gravity adjusting member 313 are attached to the weight body 310. The magnet 311 is provided on one side as viewed from the axial line L of the spring 303, and the weight body 310 further includes the center-of-gravity adjusting member 313 that adjusts the center-of-gravity of the weight body 310. Consequently, the center-of-gravity adjusting member 313 adjusts the center-of-gravity of the weight body 310 to bring the center-of-gravity thereof to a position close to the axial line of the spring 303 (plane S), and thus it is possible to stabilize the vibration of the spring 303. As a result, it is possible to enhance efficiency of the power generation and thus to realize the high output.

Further, since the center-of-gravity of the weight body 310 can be adjusted by the center-of-gravity adjusting members 313 and 314, it is possible to eliminate a need for the symmetrical disposition of the components. Consequently, even when the components are not disposed symmetrically, it is possible to stabilize the vibration of the spring 303 by adjusting the position of the center-of-gravity of the weight body 310 by the center-of-gravity adjusting members 313 and 314. As a result, since the components can be disposed regardless of the symmetrical disposition, it is possible to enhance a degree of freedom in the disposition of the component. Specifically, it is possible to enhance the degree of freedom in the disposition of the magnet 311 and the yoke material 312 and to enhance the degree of freedom in the disposition of a newly added component by including the center-of-gravity adjusting members 313 and 314.

Further, the center-of-gravity adjusting members 313 and 314 are the high specific gravity materials having higher specific gravity than the magnet 311. Consequently, since the center-of-gravity adjusting members 313 and 314 are the high specific gravity material, it is possible to increase the mass of the weight body 310 without increasing the volume of the weight body 310. Consequently, it is possible to promote the high output and to realize the miniaturization of the component by increasing the mass of the weight body 310.

Further, the weight body 310 has the yoke material 312 provided on the axial line L of the spring 303, and the yoke material 312 has the first surface 312a on which the magnet 311 is attached, and the second surface 312b that is oriented to the side opposite to the first surface 312a and on which the center-of-gravity adjusting member 313 is attached. Accordingly, the yoke material 312 is interposed between the magnet 311 and the center-of-gravity adjusting member 313, and the yoke material 312 is disposed on the axial line L of the spring 303. The "disposed on the axial line" includes that at least a part of an object is disposed at a position that blocks the axial line. For example, the providing of the yoke material 312 on the axial line L of the spring 303 includes that at least a part of the yoke material 312 is located at a position that blocks the axial line L of the spring 303. In the embodiment, it is possible to enhance the degree of freedom in the disposition of the component by attaching the magnet 311 and the center-of-gravity adjusting members 313 and 314 with the position of the yoke material 312 as reference.

Further, as illustrated in FIGS. 20, 21A, and 21B, the weight body 310 is suspended by at least the four springs 303A, and two springs 303A of the four springs 303A extend from the weight body 310 in the first direction D1 and remaining two springs 303A extend from the weight body 310 in the second direction D2. The center-of-gravity adjusting members 313 and 314 adjust the position of the center-of-gravity of the weight body 310 so as to be located inside the space A obtained by offsetting by the diameter H of the spring 303 in the radial direction of the spring 303 with respect to the plane S formed by connecting the attachment portions 303a of the four springs 303A with respect to the housing 302. Consequently, since the center-of-gravity of the weight body 310 can be disposed at an appropriate position by the center-of-gravity adjusting members 313 and 314, it contributes to further high output.

Fifth Embodiment

Next, a vibration power generator according to a fifth embodiment will be described with reference to FIG. 22A. As illustrated in FIG. 22A, the configuration of a weight body 320 disposed between two springs 303 differs from the weight body 310 of the fourth embodiment in the vibration power generator according to the fifth embodiment. In the following description of the fifth to tenth embodiments, a description overlapping with the fourth embodiment is omitted as appropriate. Further, FIGS. 22A to 22E schematically illustrate the weight body and the spring in order to make illustrations easy to understand.

The weight body 320 includes a magnet 321 provided at a position shifted from the axial line L of the spring 303, a yoke 322 provided at a position along the axial line L of the spring 303, and a center-of-gravity adjusting member 323 provided on a side of the yoke 322 opposite to the magnet 321. A plurality (for example, two) of magnets 321 are stuck on the yoke 322, and the center-of-gravity adjusting member 323 is stuck on a side opposite to the magnet 321 as viewed from the yoke 322. For example, the total volume of the magnets 321 is larger than the volume of the center-of-gravity adjusting member 323. Further, each material of the magnet 321, the yoke 322, and the center-of-gravity adjusting member 323 may be the same as or different from each material of the magnet 311, the yoke material 312, and the center-of-gravity adjusting member 313.

The vibration power generator according to the fifth embodiment includes the weight body 320 supported by the spring 303, and the magnet 321 and the center-of-gravity adjusting member 323 are attached to the weight body 320. The magnet 321 is provided on one side as viewed from the axial line L of the spring 303, and the center-of-gravity adjusting member 323 is provided for adjusting the center-of-gravity of the weight body 320. Consequently, the center-of-gravity adjusting member 323 adjusts the center-of-gravity of the weight body 320 to bring the center-of-gravity thereof to a position close to the axial line L of the spring 303 (plane S), and thus it is possible to stabilize the vibration of the spring 303. As a result, it is possible to enhance the efficiency of the power generation and thus to realize the high output. Further, since the center-of-gravity of the weight body 320 can be adjusted by the center-of-gravity adjusting member 323, it is possible to eliminate the need for the symmetrical disposition of the components. Consequently, since the components can be disposed regardless of the symmetrical disposition, it is possible to enhance the degree of freedom in the disposition of the component. Accordingly, it is possible to obtain the same effect as that of the fourth embodiment.

Sixth Embodiment

Next, a vibration power generator according to a sixth embodiment will be described with reference to FIG. 22B. As illustrated in FIG. 22B, in the vibration power generator according to the sixth embodiment, a weight body 330 includes the magnet 321, the yoke 322, and center-of-gravity adjusting members 333 respectively stuck on both surfaces of the yoke 322. The center-of-gravity adjusting members 333 are respectively stuck on a first surface 322a of the yoke 322 on which the magnet 321 is stuck, and on a second surface 322b of the yoke 322 that is oriented to a side opposite to the first surface 322a. A pair of center-of-gravity adjusting members 333 is stuck on the first surface 322a along the direction in which the axial line L of the spring 303 extends, and the plurality of magnets 321 are stuck between the pair of center-of-gravity adjusting members 333. For example, the total volume of the center-of-gravity adjusting members 333 and the magnets 321 stuck on the first surface 322a is larger than the volume of the center-of-gravity adjusting member 333 stuck on the second surface 322b.

In the vibration power generator according to the sixth embodiment, the weight body 330 includes the magnet 321 and the center-of-gravity adjusting member 333, and the magnet 321 is provided on one side as viewed from the axial line L of the spring 303, and the center-of-gravity adjusting member 333 is provided for adjusting the center-of-gravity of the weight body 330. Consequently, the center-of-gravity adjusting member 333 adjusts the center-of-gravity of the weight body 330 to bring the center-of-gravity thereof to a position close to the axial line L of the spring 303 (plane S), and thus it is possible to stabilize the vibration of the spring 303. As a result, it is possible to enhance the efficiency of the power generation and thus to realize the high output. Further, since the center-of-gravity of the weight body 330 can be adjusted by the center-of-gravity adjusting member 333, it is possible to eliminate the need for the symmetrical disposition of the components and to dispose the components regardless of the symmetrical disposition. Consequently, since the degree of freedom in the disposition of the component can be enhanced, it is possible to obtain the same effects as those of the fourth and fifth embodiments described above.

Seventh Embodiment

Next, a vibration power generator according to a seventh embodiment will be described with reference to FIG. 22C. As illustrated in FIG. 22C, in the vibration power generator according to the seventh embodiment, a weight body 340 includes the magnet 321, the center-of-gravity adjusting member 333, and a yoke material 342 extending along the axial line L of the spring 303 and extending to a side opposite to the magnet 321 and the center-of-gravity adjusting member 333. The magnet 321 and the center-of-gravity adjusting member 333 are stuck on a first surface 342a of the yoke material 342 similarly to the sixth embodiment. On the other hand, a second surface 342b of the yoke material 342 is exposed. For example, the specific gravity of the yoke material 342 is higher than the specific gravity of the magnet 321, and the specific gravity of the center-of-gravity adjusting member 333 is higher than the specific gravity of the yoke material 342. Accordingly, in order to balance the weight body 340 with respect to the yoke material 342 having higher specific gravity than the magnet 321, the center-of-gravity adjusting member 333 having high specific gravity is stuck on the same side as the magnet 321 to balance the weight body 340.

In the vibration power generator according to the seventh embodiment, in the weight body 340, and the magnet 321 is provided on one side as viewed from the axial line L of the spring 303, and the center-of-gravity adjusting member 333 is provided for adjusting the center-of-gravity of the weight body 340. Consequently, the center-of-gravity adjusting member 333 adjusts the center-of-gravity of the weight body 340 to bring the center-of-gravity thereof to a position close to the axial line L of the spring 303 (plane S), and thus it is possible to enhance efficiency of the power generation and to realize the high output similarly to the fourth to sixth embodiments described above. Further, since it is possible to eliminate the need for the symmetrical disposition of the components and to dispose the components regardless of the symmetrical disposition, the degree of freedom in the disposition of the component can be enhanced similarly to the above.

Eighth Embodiment

Next, a vibration power generator according to an eighth embodiment will be described with reference to FIG. 22D. A weight body 350 according to the eighth embodiment does not include the yoke and includes the magnet 321 and a center-of-gravity adjusting member 353. The center-of-gravity adjusting member 353 may also function as the yoke. As illustrated in FIG. 22D, the center-of-gravity adjusting member 353 has a first portion 353a extending along the axial line L of the spring 303 and a second portion 353b protruding from the first portion 353a on a side opposite to the magnet 321. The second portion 353b protrudes from the center of the first portion 353a on the side opposite to the magnet 321 in the direction in which the axial line L of the spring 303 extends. The plurality of magnets 321 are stuck on the first portion 353a. For example, the volume of the second portion 353b is smaller than the total volume of the magnets 321 attached on the first portion 353a.

In the vibration power generator according to the eighth embodiment, the center-of-gravity adjusting member 353 (second portion 353b) adjusts the center-of-gravity of the weight body 350 similarly to the fourth to seventh embodiments described above. Therefore, it is possible to enhance the efficiency of the power generation and thus to realize the high output by bringing the center-of-gravity of the weight body 350 to a position close to the axial line L of the spring 303 (plane S). Further, since the components can be disposed regardless of the symmetrical disposition, it is possible to enhance the degree of freedom in the disposition of the component.

Ninth Embodiment

A vibration power generator according to a ninth embodiment will be described with reference to FIG. 22E. A weight body 360 according to the ninth embodiment includes a center-of-gravity adjusting member 363 that is different in shape and size from the center-of-gravity adjusting member 353. The center-of-gravity adjusting member 363 has, for example, the rectangular parallelepiped shape. The center-of-gravity adjusting member 363 has a first portion 363a extending along the axial line L of the spring 303 and a second portion 363b protruding from the first portion 363a on a side opposite to the magnet 321, and the second portion 363b protrudes from the entire first portion 363a on the side opposite to the magnet 321. For example, the volume of the center-of-gravity adjusting member 363 is larger than the volume of the center-of-gravity adjusting member 353 of the eighth embodiment, and the specific gravity of the center-of-gravity adjusting member 363 is lower than the specific gravity of the center-of-gravity adjusting member 353.

In the vibration power generator according to the ninth embodiment, since the center-of-gravity adjusting member 363 (second portion 363b) adjusts the center-of-gravity of the weight body 360 similarly to the fourth to eighth embodiments described above. Therefore, it is possible to realize the high output and to dispose the components regardless of the symmetrical disposition by bringing the center-of-gravity of the weight body 360 to a position close to the axial line L of the spring 303 (plane S). As a result, it is possible to enhance the degree of freedom in the disposition of the component.

Tenth Embodiment

Figure 23:
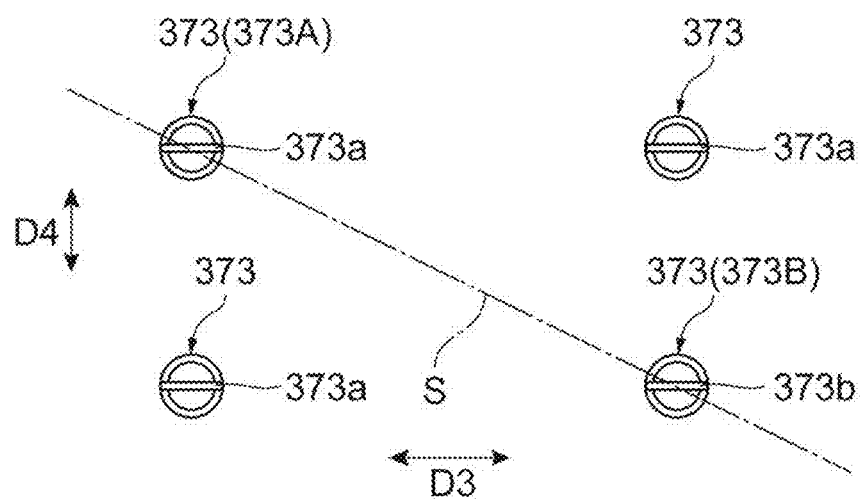
FIG. 23 is a diagram describing a plane formed by connecting a plurality of springs in a tenth embodiment.

Next, a vibration power generator according to a tenth embodiment will be described with reference to FIG. 23. In the vibration power generator according to the tenth embodiment, the disposition form of a spring 373 is different from that in the fourth embodiment. In the fourth embodiment, the plurality of springs 303 are disposed along the width direction D3 of the vibration power generator 301. On the contrary, a plurality of sets of a plurality of springs 373 disposed along the width direction D3 are disposed along the thickness direction D4 in the tenth embodiment. FIG. 23 illustrates only springs 373 at both ends in the width direction D3 and in the thickness direction D4.

In the fourth embodiment, the plane formed by connecting the attachment portions 303a of the four springs 303A located at each of both ends in the width direction D3 is set as the plane S. In the tenth embodiment, a plane formed by connecting attachment portions 373a of two springs 373A located at one end in the width direction D3 and one end in the thickness direction D4, and attachment portions 373b of two springs 373B located at the other end in the width direction D3 and the other end in the thickness direction D4 is set as the plane S. For example, the spring 373B corresponds to the spring on a side opposite to the spring 373A through the yoke. It is possible to obtain the same effects as those of the fourth to ninth embodiments described above also in the vibration power generator according to the tenth embodiment by adjusting the center-of-gravity of the weight body to bring the center-of-gravity thereof to a position close to the plane S.

The fourth to tenth embodiments of the vibration power generator according to the present disclosure have been described, but the present disclosure is not limited to the fourth to tenth embodiments. That is, the configuration of each portion of the vibration power generator is not limited to the fourth to tenth embodiments and can be changed as appropriate.

For example, the housing, the spring, the coil, the coil holder, and the shape, size, number, material, and disposition form of the fixing member for fixing the spring in the fourth to tenth embodiments are not limited to those described above and may be changed as appropriate.

Further, the example in which the magnet 311 and the center-of-gravity adjusting member 314 are attached to the first surface 312a of the yoke material 312 and the center-of-gravity adjusting member 313 is attached to the second surface 312b of the yoke material 312 has been described in the fourth embodiment described above. However, it is possible to change the disposition of each component as appropriate in the vibration power generator as described in the fifth to tenth embodiments.

Further, the example in which the center-of-gravity adjusting member 313 is the high specific gravity material configured of the tungsten-containing resin has been described in the fourth to tenth embodiments described above. However, the center-of-gravity adjusting member may not be the high specific gravity material. Furthermore, the material of the center-of-gravity adjusting member is not limited to the tungsten-containing resin and may contain, for example, lead or mercury. Further, the yoke or the magnet may be used also as the center-of-gravity adjusting member or the yoke may furthermore be omitted. In the vibration power generator, it is possible to flexibly change also the disposition of the component other than the magnet and the yoke as well as the magnet and the yoke by including the center-of-gravity adjusting member.

For example, tungsten is contained as the center-of-gravity adjusting members 313 and 314 having the specific gravity of 8.0 g/cm$^3$ or more in the fourth to tenth embodiments described above, but a material other than tungsten may be contained. For example, the center-of-gravity adjusting members 313 and 314 may contain any one or two or more of the materials such as lead, copper, brass, beryllium copper, nickel steel, austenitic stainless steel, and high-speed tool steel. An appropriate magnet such as the neodymium magnet, the isotropic ferrite magnet, the anisotropic ferrite magnet, the samarium cobalt magnet, or the alnico magnet may be used as the magnet 311. The shape of the magnet 311 is not particularly limited and may be, for example, the columnar shape, the prismatic shape, or the like. Further, an appropriate type of substance may be used as the yoke material 312 as long as the substance can form the magnetic circuit. For example, the material such as soft steel, rolled steel for general structure, carbon steel for machine structure, stainless steel, silicon steel, ferrite, FeNi alloy, or FeCo alloy may be used as the yoke material 312.

The vibration power generator 301 may include a spring having a configuration other than the coil spring instead of the spring 303 which is the coil spring. Further, the spring 303 may be connected to the center-of-gravity adjusting members 313 and 314. Furthermore, the example in which six springs 303 are respectively connected to the upper and lower surfaces of the yoke material 312 has been described in the fourth to tenth embodiments described above. However, it is possible to change the number of springs and the disposition form thereof as appropriate as described above. For example, one spring 303 is respectively connected to the upper and lower surfaces of the yoke material 312. That is, the spring 303 may not be respectively configured of the plurality of springs.

Further, three or more springs 303 may be respectively connected to the upper and lower surfaces of the yoke material 312. For example, the number of springs 303 connected to the yoke material 312 may be decided according to the spring constant required when the weight body 310 is vibrated. The plurality of springs 303 may be disposed in two rows along the width direction D3 on the upper surface of the yoke material 312. Similarly, the plurality of springs 303 may be disposed in two rows along the width direction D3 on the lower surface of the yoke material 312. Further, four springs 303 may be respectively connected to four corners on the upper surface of the yoke material 312. Further, when the plurality of springs 303 are connected to the yoke material 312 as described above, the springs 303 may also be disposed so as to be symmetrical with respect to the center position in the width direction D3 of the yoke material 312 in the width direction D3. The same effects as those of the fourth to tenth embodiments described above such as stably vibrating the weight body 310 and increasing the movement amount of the weight body 310 can be achieved also with these connection configurations of the springs 303.

Here, the average specific gravity of the weight body (weight body 310 and the like) is 8 g/cm$^3$ or more in the fourth to tenth embodiments, but the average specific gravity may not be 8 g/cm$^3$ or more. In this case, the vibration power generator can be represented as follows.

[Clause 1] A vibration power generator that generates electric power by movement of a magnet that receives a vibration comprising:
    a housing;
    a spring suspended from the housing; and
    a weight body that is supported by the spring inside the housing and to which the magnet is attached,
    wherein the magnet is attached at a position shifted from an axial line of the spring, and
    wherein the weight body has a center-of-gravity adjusting member that adjusts a position of the center-of-gravity of the weight body.

[Clause 2] The vibration power generator according to Clause 1,
    wherein the center-of-gravity adjusting member is a high specific gravity material having higher specific gravity than the magnet.

[Clause 3] The vibration power generator according to Clause 1 or 2,
    wherein the weight body has a yoke provided on the axial line, and
    wherein the yoke has a first surface on which the magnet is attached, and a second surface that is oriented to a side opposite to the first surface and on which the center-of-gravity adjusting member is attached.

[Clause 4] The vibration power generator according to any of Clauses 1 to 3,
wherein the weight body is suspended by at least four springs,
wherein two springs of the four springs extend from the weight body in a first direction and remaining two springs extend from the weight body in a second direction which is a direction opposite to the first direction, and
wherein the center-of-gravity adjusting member adjusts a position of the center-of-gravity of the weight body so as to be located inside a space obtained by offsetting by a diameter of the spring in a radial direction of the spring with respect to a plane formed by connecting attachment portions of the four springs with respect to the housing.

Eleventh Embodiment

Figure 24:
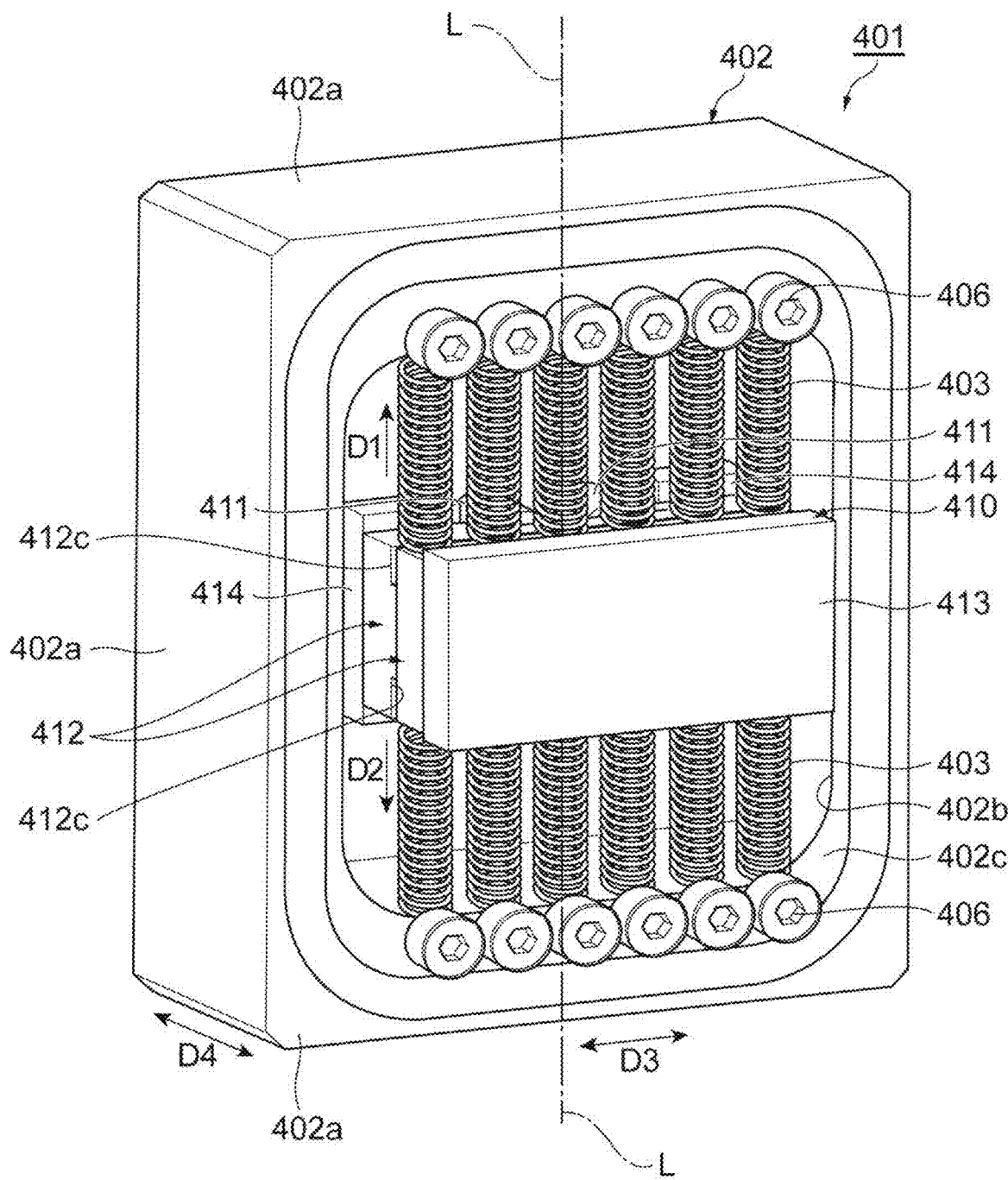
FIG. 24 is a perspective view of a vibration power generator according to an eleventh embodiment.
Figure 25:
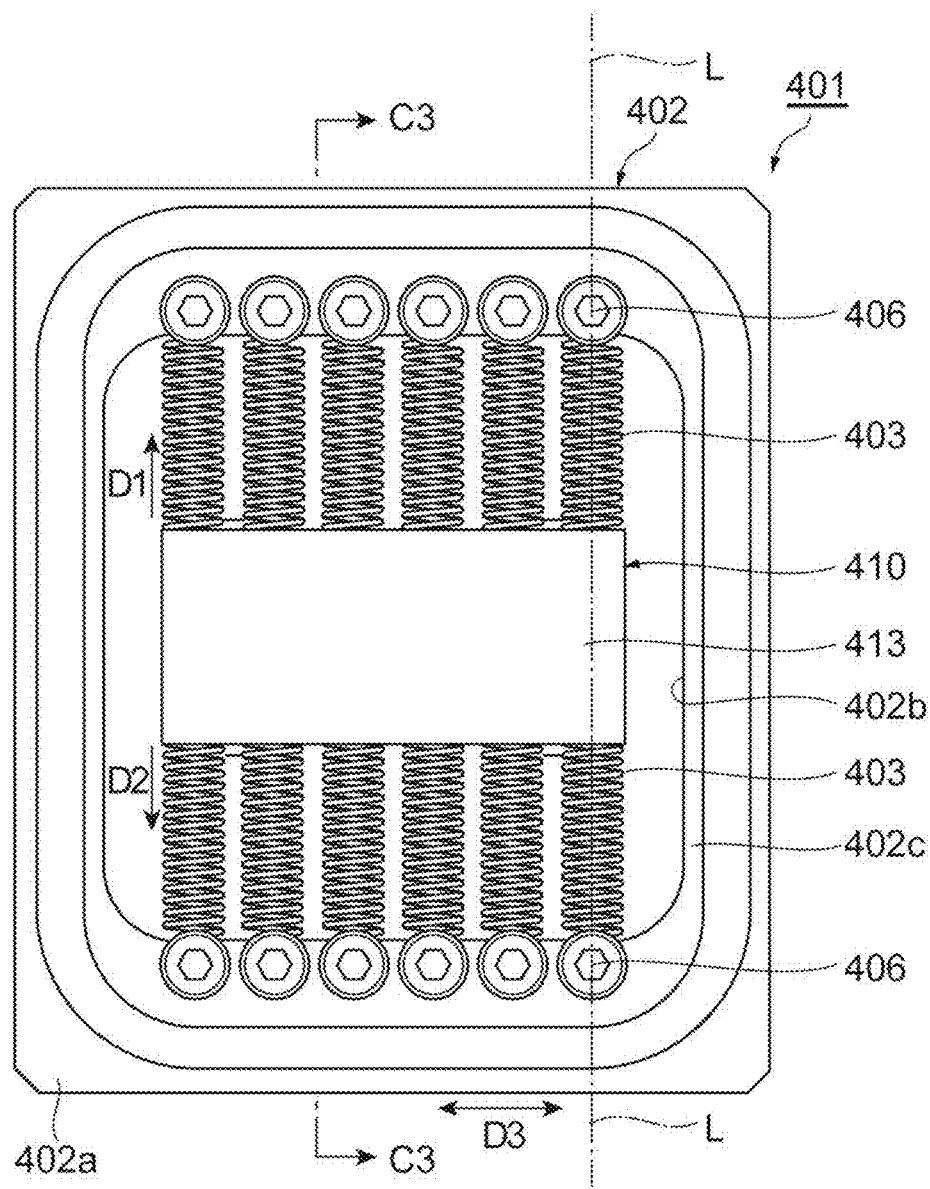
FIG. 25 is a side surface view of the vibration power generator of FIG. 24.
Figure 26:
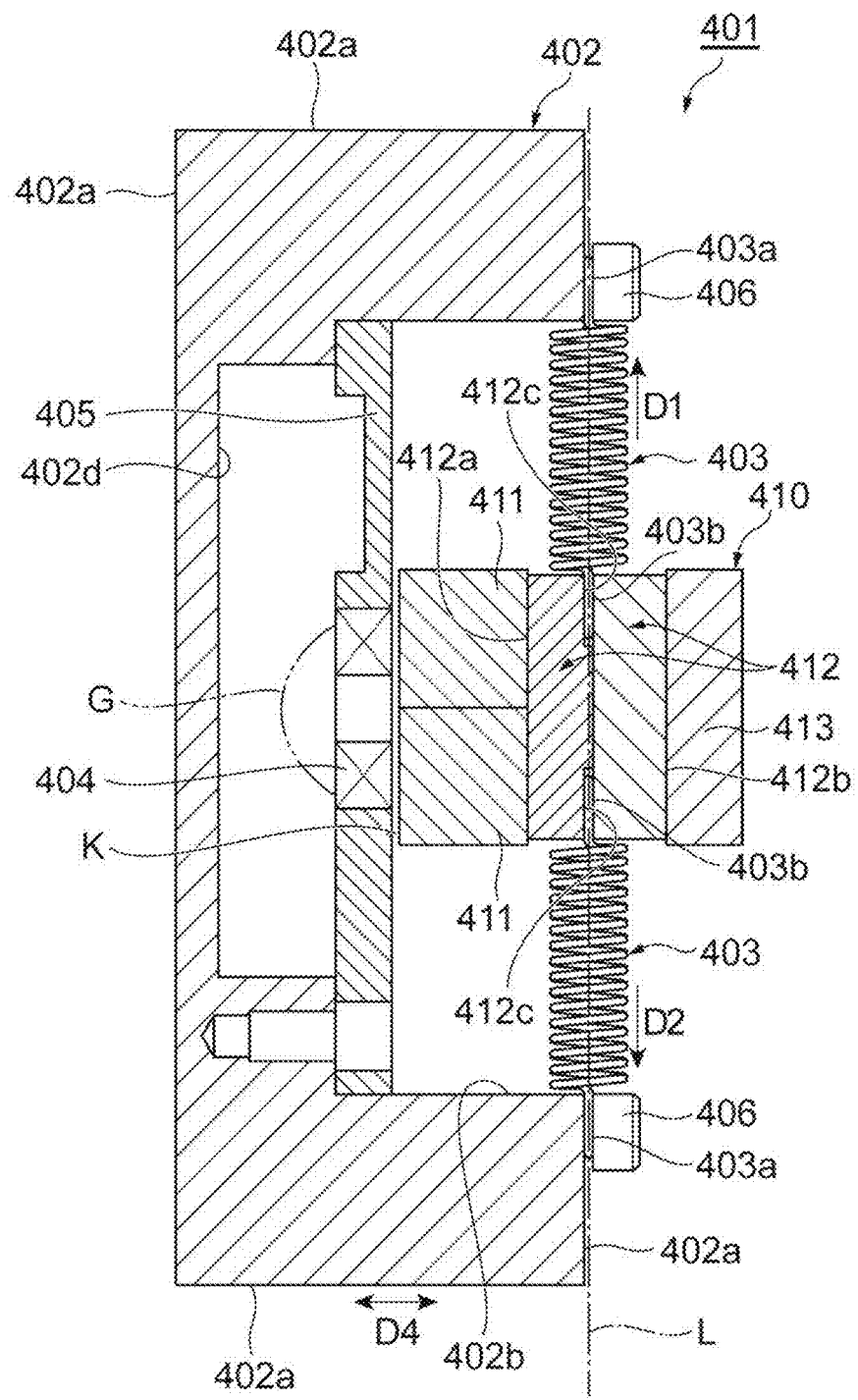
FIG. 26 is a cross-sectional view taken along a line C3-C3 in FIG. 25.

Next, an eleventh embodiment will be described. As illustrated in FIGS. 24 to 26, a vibration power generator 401 according to the embodiment includes, for example, a housing (frame) 402, a plurality of springs 403 attached to the housing 402, a coil 404 fixed inside the housing 402, and a weight body (moving body) 410 suspended by the spring 403.

A magnet 411 is attached to the weight body 410. The vibration power generator 401 receives the vibration from the outside, and the weight body 410 resonates in an extension direction of an axial line L of the spring 403 accompanied by the received vibration. The resonance frequency of the weight body 410 is, for example, 50 Hz. The magnet 411 relatively moves with respect to the fixed coil 404 to generate the induced electromotive force in the coil 404 due to the electromagnetic induction. That is, the vibration power generator 401 is the vibration power generation device that generates the electric power by the electromagnetic induction type.

The vibration power generator 401 is attached to, for example, a machine including a machine tool, a moving body, or the like, or a construction including a bridge or the like to obtain electromotive force from the vibration of the machine, the construction, or the like. The vibration power generator 401 may be attached to the vibration source such as the motor by, for example, the magnetic force of the neodymium magnet or the like attached to the housing 402. The vibration power generator 401 may be attached to the vibration source by, for example, fixing the housing 402 and the vibration source such as the motor with a band. Further, the vibration power generator 401 may be attached to the vibration source by fixing the housing 402 to the vibration source such as the motor with a bolt.

The housing 402 has a rectangular parallelepiped shape including, for example, six surfaces 402a. The shape of the housing 402 is not limited to the rectangular parallelepiped shape. For example, the housing 402 may be the box body having the appearance such as the substantially columnar shape or the semicylindrical shape (substantially semicircular cross-sectional columnar shape). In the embodiment, four corners of the widest surface 402a of the six surfaces 402a are chamfered. Further, a recessed portion 402b in which the spring 403, the coil 404, and the weight body 410 are accommodated is formed on the widest one surface 402a. A frame-shaped spring-holding frame 402c to which the plurality of springs 403 are attached is provided in the recessed portion 402b, and the spring-holding frame 402c has a shape in which rectangular corner portions are rounded. The spring-holding frame 402c is made of, for example, metal and may be configured of aluminum.

Further, the spring-holding frame 402c may be configured of the material having Young's modulus that is equal to or larger than 40 GPa. In the spring-holding frame 402c, an attachment portion 403a of each spring 403 is supported by fixing member 406. The attachment portion 403a has, for example, a ring shape, and the fixing member 406 is inserted into the attachment portion 403a and the fixing member 406 is screwed into the spring-holding frame 402c to fix the attachment portion 403a to the spring-holding frame 402c. The fixing member 406 is, for example, a hexagonal socket head bolt. Connection means of the attachment portion 403a of the spring 403 to the spring-holding frame 402c is not limited to the fixing member 406 and can be changed as appropriate. For example, a plurality of pins may be inserted into the spring-holding frame 402c of the housing 402 and each attachment portion 403a of the spring 403 may be hooked onto the plurality of pins to connect the attachment portion 403a thereof to the spring-holding frame 402c.

The spring 403 is, for example, the tension coil spring. As an example, the wire diameter of the spring 403 is 0.29 mm, the outer diameter (diameter) of the spring 403 is 2.50 mm, the free length of the spring 403 is 11.6 mm, an allowable maximum length of the spring 403 is 18.9 mm, and the spring constant of the spring 403 is 0.225 N/mm. The vibration power generator 401 includes the plurality of springs 403, and the plurality of springs 403 are disposed so as to be parallel to each other. On end of each spring 403 is attached to the spring-holding frame 402c, and the other end of each spring 403 is attached to the weight body 410. The weight body 410 is provided at least between two springs 403. That is, a part of the plurality of springs 403 extends from the weight body 410 in a first direction D1, and a remaining portion of the plurality of springs 403 extends from the weight body 410 in a second direction D2 which is a direction opposite to the first direction D1.

The first direction D1 and the second direction D2 match a direction in which the axial line L of each spring 403 extends. The plurality of springs 403 are provided side by side along a width direction D3 of the vibration power generator 401 and are disposed, for example, at regular intervals along the width direction D3. One spring 403 is disposed along a thickness direction D4 of the vibration power generator 401, but the plurality of springs 403 may be disposed along the thickness direction D4. As an example, a total of twelve springs 403 can be provided. Six springs 403 of the twelve springs 403 are provided side by side along the width direction D3 and extend from the weight body 410 in the first direction D1. Remaining six springs 403 are provided side by side along the width direction D3 and extend from the weight body 410 in the second direction D2. The weight body 410 is suspended between the six springs 403 extending in the first direction D1 and the six springs 403 extending in the second direction D2.

However, the number of the springs 403 is not limited to twelve. For example, four springs 403 respectively extending from four corners of the weight body 410 in the first direction D1 and the second direction D2 may be provided, and the number of the springs 403 can be changed as appropriate. Further, three springs 403 extending from the weight body 410 in the first direction D1 and three springs 403 extending from the weight body 410 in the second direction D2 may be included. Furthermore, the plurality of springs 403 may be disposed at mutually symmetrical positions with respect to the center-of-gravity of the weight body 410. In this case, suppression of the vibration of the weight body 410 in a direction other than the first direction D1 and the second direction D2 and of a rotation of the weight body 410, division of the spring constant of each spring 403, and ensuring of the stroke of the spring 403 can be satisfied. Furthermore, since each spring 403 can be miniaturized, it is possible to improve the stability of the vibration power generator 401 and to realize the miniaturization of the vibration power generator 401 itself.

The coil 404 is disposed between a bottom surface 402d (surface) of the recessed portion 402b of the housing 402 and the weight body 410. Further, the vibration power generator 401 includes a coil holder 405 holding the coil 404. The coil holder 405 is fixed to the housing 402 by, for example, the tape in a state of holding the coil 404. Fixing means of the coil holder 405 to the housing 402 is not limited to the tape and can be changed as appropriate. The coil holder 405 may be fixed to the housing 402 by, for example, the screw. Further, only end portion (lower side end portion of FIG. 26) of the coil holder 405 in the second direction D2 may be fixed to the housing 402, or a plurality of places of the coil holder 405 may be respectively fixed to the housing 402. The number of fixed portions and a disposition form of the coil holder 405 with respect to the housing 402 can be changed as appropriate.

The coil holder 405 is made of, for example, plastic. Further, the coil 404 is the air-core coil. For example, an open magnetic path G is formed between the magnet 411 attached to the weight body 410 and the coil 404 and the bottom surface 402d. Further, a space K is formed between the coil holder 405 and the weight body 410, and the coil holder 405 and the weight body 410 are non-contact with each other. Accordingly, since friction force accompanied by contact with the coil holder 405 is not generated in the weight body 410, it is possible to avoid the reduction in the vibration of the weight body 410.

The weight body 410 includes the magnet 411 described above, a yoke material 412, and high specific gravity materials 413 and 414. The yoke material 412 is disposed on the axial line L of the spring 403, the magnet 411 is disposed on one side as viewed from the axial line L of the spring 403, and the high specific gravity material 413 is disposed on a side opposite to the magnet 411 as viewed from the axial line L thereof. In other words, the magnet 411 and the high specific gravity material 413 are disposed at positions shifted from the axial line L of each spring 403.

In the specification, the component "disposed on one side as viewed from the axial line of the spring" includes a component disposed in a specific direction as viewed from the axial line of the spring, and a component disposed on the axial line of the spring and to be shifted in the specific direction with respect to the axial line. For example, "a magnet is disposed on one side as viewed from the axial line of the spring" includes a state where a part of the magnet 411 interferes on the axial line L of the spring 403, a state where a dimension of a portion of the magnet 411 protruded from the yoke material 412 is smaller than a dimension of a portion of the magnet 411 entered into the yoke material 412, and the like.

For example, a plurality of magnets 411 are attached to the weight body 410, and four (refer to FIG. 27) magnets 411 are disposed so as to form a square shape at the center of the yoke material 412. Among the four magnets 411, for example, two magnets 411 on a first direction D1 side expose N pole surfaces and two magnets 411 on a second direction D2 side expose S pole surfaces. Each magnet 411 is, for example, the neodymium magnet. The magnetic flux density of each magnet 411 is 5000 gauss, and the specific gravity of each magnet 411 is 7.4 g/cm$^3$. Further, each magnet 411 may have the columnar shape. In this case, a diameter of each magnet 411 is 6 mm and a height of each magnet 411 is 5 mm as an example.

An end portion 403b on a side opposite to the attachment portion 403a of each spring 403 is fixed in a state of being interposed between two yoke materials 412. For example, one of the two yoke materials 412 is provided with a recessed portion 412c into which the end portion 403b enters, and a depth of the recessed portion 412c in the thickness direction D4 is approximately the same as the wire diameter of the end portion 403b of the spring 403. The magnet 411 is attracted to one of the two yoke materials 412. Each yoke material 412 is configured of iron or steel and has, for example, a rectangular plate shape. The magnet 411 is provided on one side of the two yoke materials 412 and are oriented to the bottom surface 402d of the recessed portion 402b to form the open magnetic path G described above on a bottom surface 402d side. The yoke material 412 forms the magnetic circuit. Here, the yoke material 412 forms the closed magnetic path on a side of the magnet 411 opposite to the bottom surface 402d to suppress the flow of the magnetic flux to an outer side of the recessed portion 402b. The yoke material 412 may be configured of a SS400 material. In this case, it is possible to obtain the yoke material 412 that has relatively good magnetic characteristics and is inexpensive and easily available. The specific gravity of the yoke material 412 is, for example, 7.8 g/cm$^3$.

The yoke material 412 has a first surface 412a on which the magnet 411 is stuck and a second surface 412b that is oriented to a side opposite to the first surface 412a and on which the high specific gravity material 413 is stuck. In the specification, the high specific gravity material indicates a member configured of a material having higher specific gravity than at least the magnet 411 and may be a member configured of a material having the specific gravity of 8.0 g/cm$^3$ or more. That is, the high specific gravity material includes a member configured of a material having higher specific gravity than a common steel material (7.8 g/cm$^3$ to 7.9 g/cm$^3$).

In the embodiment, the average specific gravity of the weight body 410 is 8 g/cm$^3$ or more.

The high specific gravity material 413 is configured of, for example, a tungsten-containing resin. When the high specific gravity material 413 is configured by containing the resin, the high specific gravity material 413 can be manufactured by injection molding of the resin. Therefore, it is possible to manufacture the high specific gravity material 413 inexpensively and in large quantities, and to manufacture the high specific gravity material 413 in any shape. The tungsten-containing resin includes tungsten made into a powder and the resin such as nylon, and the specific gravity of the tungsten-containing resin is, for example, 13 g/cm$^3$. The high specific gravity material 413 has, for example, the rectangular plate shape and is stuck on a side of the yoke material 412 opposite to the magnet 411. Further, the high specific gravity material 414 is stuck on a magnet 411 side of the yoke material 412, and the high specific gravity material 414 is respectively disposed, for example, on both sides of the magnet 411 in the width direction D3. The high specific gravity material 414 is configured of, for example, the same material as the high specific gravity material 413.

In this manner, since the weight body 410 includes the high specific gravity materials 413 and 414, the mass of the weight body 410 can be increased while the miniaturization is maintained. Accordingly, it is possible to realize the miniaturization of the vibration power generator 401 and to increase an output of the electric power from the vibration power generator 401 by enhancing inertia energy of the weight body 410 to increase the amplitude of the vibration. Further, the high specific gravity materials 413 and 414 having higher specific gravity than the magnet 411 are stuck on the weight body 410 to improve the balance of the weight body 410. As a result, it is possible to move the weight body 410 only in the first direction D1 and the second direction D2. Consequently, since the weight body 410 can stably vibrate along the first direction D1 and the second direction D2 by suppressing an input of a vibration mode other than the first direction D1 and the second direction D2, it is possible to further increase the output.

As an example, the length of the weight body 410 in an axial line direction (first direction D1 and second direction D2) of the spring 403 is 12.8 mm, the length of the weight body 410 in the width direction D3 thereof is 23.0 mm, and the length of the weight body 410 in the thickness direction D4 thereof is 13.5 mm. The magnet 411, the yoke material 412, and the high specific gravity materials 413 and 414 are housed within a range of 12.8 mm×23.0 mm×13.5 mm, and the mass of the weight body 410 is, for example, 32 g.

Figure 27:
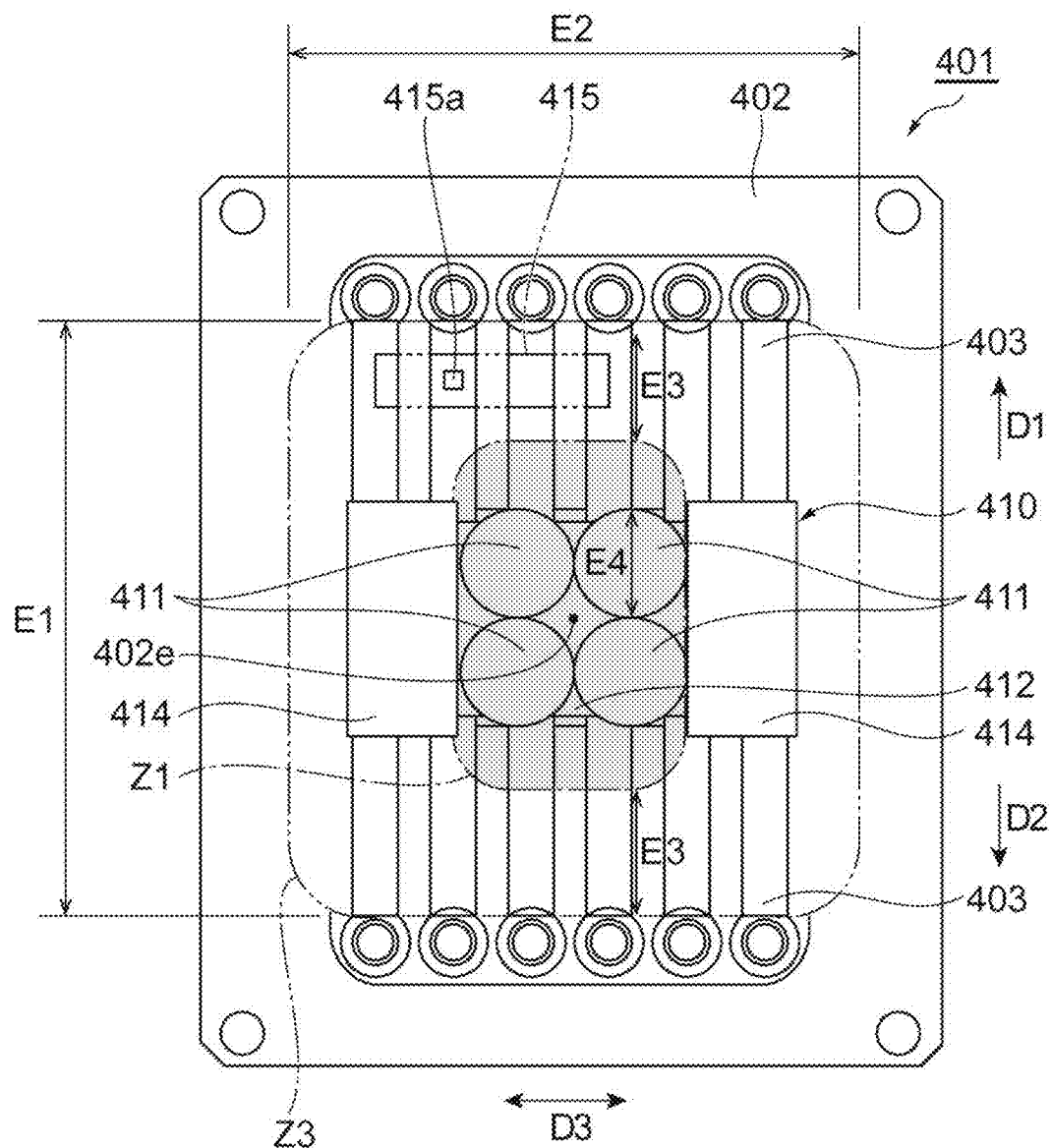
FIG. 27 is a view of an example of a movable range of a magnet in the vibration power generator of FIG. 24 and a region where a magnetic body of a circuit is located.

FIG. 27 illustrates a view of the vibration power generator 401 as viewed from the magnet 411 side, and a part thereof is omitted for simplicity. As illustrated in FIGS. 26 and 27, the vibration power generator 401 further includes a rectifier circuit 415 (circuit) that converts generated AC power into DC power and adjusts a voltage thereof. The rectifier circuit 415 has a magnetic body 415a. The rectifier circuit 415 includes an iron-core coil formed from, for example, the ferrite (magnetic material) as the magnetic body 415a.

Figure 28:
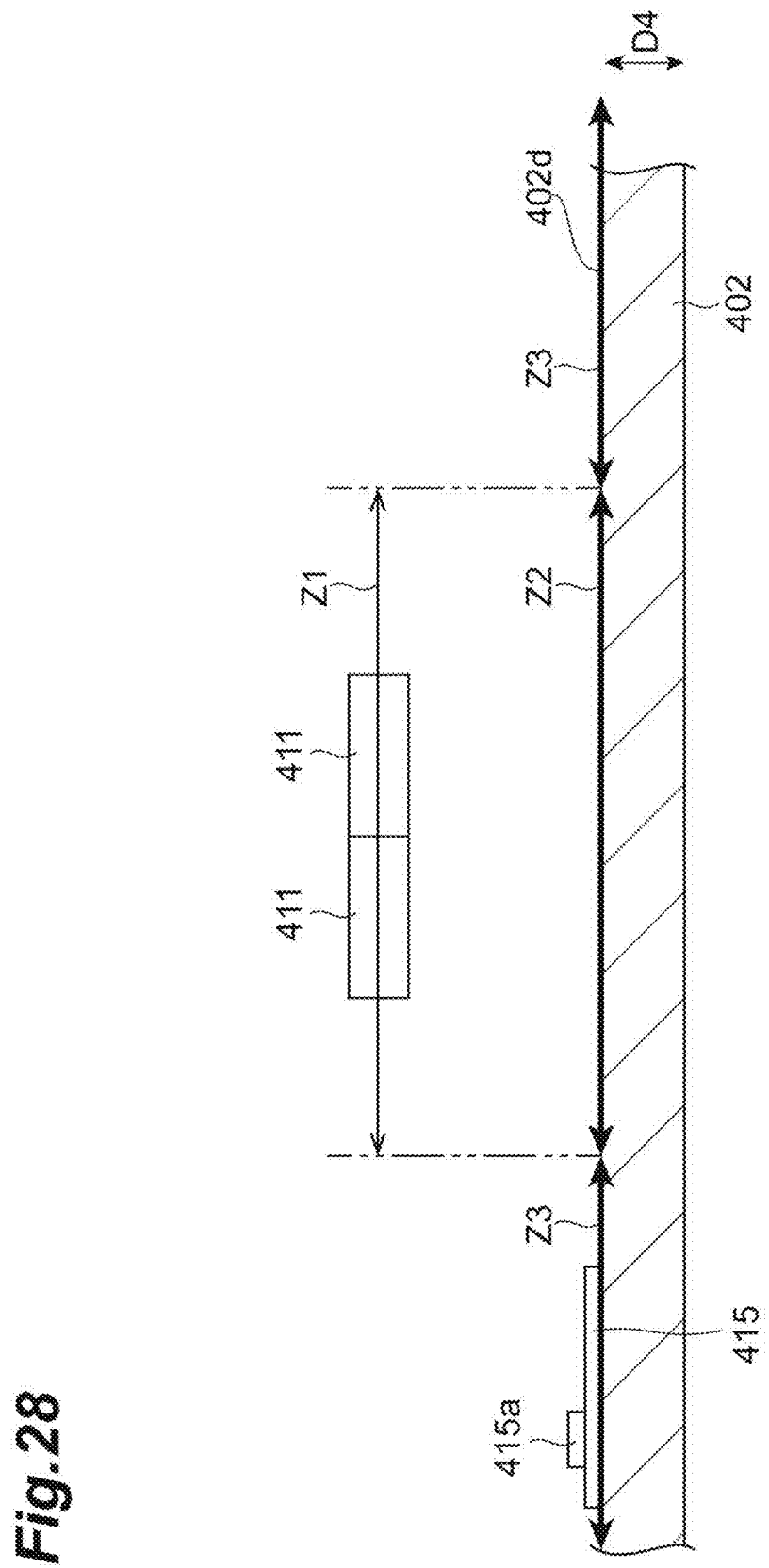
FIG. 28 is a schematic cross-sectional view of a region obtained by projecting the movable range of the magnet of FIG. 27 onto a surface of a housing.

As illustrated in FIGS. 27 and 28, the rectifier circuit 415 is fixed such that the magnetic body 415a is located outside a region Z2 where a movable range Z1 of the magnet 411 is projected onto a bottom surface 402d of the housing 402. The movable range Z1 of the magnet 411 is, for example, the maximum region where the magnet 411 can move accompanied by expansion and contraction of the spring 403. Specifically, the movable range Z1 indicates the maximum region formed by an outline of the magnet 411 by the vibration, and the magnetic body 415a of the rectifier circuit 415 is fixed to, for example, a region Z3 of the bottom surface 402d excluding the movable range Z1. The region Z3 is provided at a position surrounding the movable range Z1 provided at the center of the bottom surface 402d.

For example, when a length in a direction in which the axial line L of the bottom surface 402d extends is set as E1, a length of the bottom surface 402d in the width direction D3 is set as E2, a length of the spring 403 at the most contracted state is set as E3, and a diameter of the magnet 411 as viewed from the thickness direction D4 is set as E4, the movable range Z1 has a rectangular shape having the length of E4×2 in the width direction D3 and the length of E1−E3×2 in the direction in which the axial line L thereof extends with a center 402e of the bottom surface 402d as the center. On the other hand, the region Z3 has a region of rectangular frame shape having the length of (E2−E4×2)/2 in the width direction D3 and the length of E3 in the direction in which the axial line L thereof extends with the center 402e as the center. In this manner, the rectifier circuit 415 is fixed such that the magnetic body 415a is located outside the region Z2 where the movable range Z1 is projected onto the bottom surface 402d.

Next, the action effect obtained from the vibration power generator 401 according to the embodiment will be described in detail. The vibration power generator 401 includes the spring 403 suspending the magnet 411 inside the housing 402 and the rectifier circuit 415, and the magnet 411 is movable in the expansion and contraction direction of the spring 403 (direction in which axial line L extends, first direction D1, and second direction D2). The rectifier circuit 415 includes the magnetic body 415a and is fixable on the bottom surface 402d of the housing 402 facing the magnet 411. The rectifier circuit 415 is fixed such that the magnetic body 415a is located outside the region Z2 (for example, region Z3) where the movable range Z1 of the magnet 411 is projected onto the bottom surface 402d. Accordingly, since the magnetic body 415a of the rectifier circuit 415 is disposed outside the region Z2 which is a place affected by the magnet 411, it is possible to suppress the influence of the magnetic body 415a with respect to the magnet 411. Consequently, it is possible to vibrate the magnet 411 without attenuation.

Further, the rectifier circuit 415 converts the generated AC power into DC power and adjusts the voltage thereof. Consequently, it is possible to convert the generated AC power into DC power and to adjust the voltage thereof by the rectifier circuit 415.

Further, as illustrated in FIG. 26, the vibration power generator 401 includes the yoke material 412 that forms the closed magnetic path on a side of the magnet 411 opposite to the bottom surface 402d. Accordingly, the yoke material 412 is provided on the side opposite to the bottom surface 402d of the housing 402 on which the rectifier circuit 415 is fixable as viewed from the magnet 411. Consequently, it is possible to suppress sneaking of the magnetic flux of the magnet 411 into the side opposite to the bottom surface 402d. As a result, since the side of the magnet 411 opposite to the bottom surface 402d is less affected by the magnetic flux, it is possible to further enhance the degree of freedom in the disposition of the rectifier circuit 415 as compared with a case without the closed magnetic path.

The eleventh embodiment of the vibration power generator according to the present disclosure has been described, but the present disclosure is not limited to the eleventh embodiment described above. That is, the configuration of each portion of the vibration power generator is not limited to the eleventh embodiment and can be changed as appropriate.

For example, the vibration power generator 401 including the housing 402 having the rectangular shape, the twelve springs 403 fixed to the spring-holding frame 402c of the housing 402 by the fixing member 406, and the coil 404 fixed to the housing 402 by the coil holder 405 has been described in the eleventh embodiment described above. However, the housing, the spring, the coil, the coil holder, and the shape, size, number, material, and disposition form of the fixing member for fixing the spring are not limited to those in the eleventh embodiment described above and may be changed as appropriate.

Further, the weight body 410 in which the magnet 411 and the high specific gravity material 414 are attached on the first surface 412a of the yoke material 412, and the high specific gravity material 413 is attached on the second surface 412b of the yoke material 412 has been described in the eleventh embodiment described above. However, the configuration of the weight body 410 can also be changed as appropriate. That is, the magnet 411, the yoke material 412, and the shape, size, number, material, and disposition form of the high specific gravity materials 413 and 414 can also be changed as appropriate, and, for example, the high specific gravity material 413 or the high specific gravity material 414 can be omitted.

For example, the example containing tungsten as the high specific gravity materials 413 and 414 having the specific gravity of 8.0 g/cm³ or more has been described in the eleventh embodiment described above, but the substance other than the tungsten may be contained. For example, the high specific gravity materials 413 and 414 may contain any one or two or more of the materials such as lead, copper, brass, beryllium copper, nickel steel, austenitic stainless steel, and high-speed tool steel. An appropriate magnet such as the neodymium magnet, the isotropic ferrite magnet, the anisotropic ferrite magnet, the samarium cobalt magnet, or the alnico magnet may be used as the magnet 411. The shape of the magnet 411 is not particularly limited and may be, for example, the columnar shape, the prismatic shape, or the like. Further, an appropriate type of substance may be used as the yoke material 412 as long as the substance can form the magnetic circuit. For example, the material such as soft steel, rolled steel for general structure, carbon steel for machine structure, stainless steel, silicon steel, ferrite, FeNi alloy, or FeCo alloy may be used as the yoke material 412.

The vibration power generator 401 may include a spring having a configuration other than the coil spring instead of the spring 403 which is the coil spring. Further, the spring 403 may be connected to the high specific gravity materials 413 and 414. Furthermore, the example in which the six springs 403 are respectively connected to the upper and lower surfaces of the yoke material 412 has been described in the eleventh embodiment described above. However, it is possible to change the number of springs and the disposition form thereof as appropriate as described above. For example, one spring 403 is respectively connected to the upper and lower surfaces of the yoke material 412. That is, the spring 403 may not be respectively configured of the plurality of springs.

Further, three or more springs 403 may be respectively connected to the upper and lower surfaces of the yoke material 412. For example, the number of springs 403 connected to the yoke material 412 may be decided according to the spring constant required when the weight body 410 is vibrated. The plurality of springs 403 may be disposed in two rows along the width direction D3 on the upper surface of the yoke material 412. Similarly, the plurality of springs 403 may be disposed in two rows along the width direction D3 on the lower surface of the yoke material 412. Further, four springs 403 may be respectively connected to four corners on the upper surface of the yoke material 412. Further, when the plurality of springs 403 are connected to the yoke material 412 as described above, the springs 403 may also be disposed so as to be symmetrical with respect to the center position in the width direction D3 of the yoke material 412 in the width direction D3. The same effect as those of the eleventh embodiment described above such as stably vibrating the weight body 410 and increasing the movement amount of the weight body 410 can be achieved also with these connection configurations of the springs 403.

Furthermore, the example in which the rectifier circuit 415 is included and the rectifier circuit 415 is fixable on the bottom surface 402d has been described in the eleventh embodiment described above. However, the rectifier circuit 415 may be fixed to a place other than the bottom surface 402d. Further, the vibration power generator may include another circuit instead of the rectifier circuit 415. That is, the present disclosure can be employed also for the circuit other than the rectifier circuit 415.

Here, the average specific gravity of the weight body 410 is 8 g/cm³ or more in the eleventh embodiment, but the average specific gravity may not be 8 g/cm³ or more. In this case, the vibration power generator can be represented as follows.

[Clause 1] A vibration power generator that generates electric power by movement of a magnet that receives a vibration comprising:
a housing;
a spring that is supported by the housing and suspends the magnet inside the housing; and
a circuit that is fixable on a surface of the housing facing the magnet and includes a magnetic body,
wherein the magnet is movable in an expansion and contraction direction of the spring, and
wherein the circuit is fixed such that the magnetic body is located outside a range where a movable range of the magnet is projected onto the surface.

[Clause 2] The vibration power generator according to Clause 1,
wherein the circuit is a rectifier circuit that converts generated AC power into DC power and adjusts a voltage of the DC power.

[Clause 3] The vibration power generator according to Clause 1 or 2 comprising:
a yoke that forms a closed magnetic path on a side of the magnet opposite to the surface.

What is claimed is:
1. A vibration power generator comprising:
a coil attached to a frame; and
a moving body that is supported on the frame through a spring and has a magnet facing the coil,
the vibration power generator relatively moving the moving body with respect to the coil to generate electric power,
wherein the moving body has
the magnet,
a yoke material that is attached to the magnet and forms a magnetic circuit, and
a weight member,
wherein average specific gravity of the moving body is 8 g/cm³ or more,
wherein the yoke material is disposed on a side of the magnet opposite to the coil, and
wherein a magnetic path on the coil side of the magnet is an open magnetic path.

2. The vibration power generator according to claim 1, wherein the weight member contains a substance having specific gravity of 8 g/cm³ or more.

3. The vibration power generator according to claim 2, wherein the weight member is formed of a resin containing a powder of the substance having specific gravity of 8 g/cm³ or more.

4. The vibration power generator according to claim 2, wherein the substance having specific gravity of 8 g/cm³ or more is tungsten.

5. The vibration power generator according to claim 2, wherein the moving body has at least two weight members, and the at least two weight members are attached to the yoke material so as to interpose the magnet therebetween as viewed along a direction in which the coil and the magnet face each other.

6. The vibration power generator according to claim 2, wherein the moving body has at least two weight members, and the at least two weight members are attached to the yoke material so as to interpose the yoke material therebetween in a direction in which the coil and the magnet face each other.

7. The vibration power generator according to claim 1, wherein the magnet includes a first magnet and a second magnet,
wherein the first magnet and the second magnet are disposed side by side along a movement direction when the moving body relatively moves with respect to the coil,
wherein in the first magnet, an N pole side is oriented to the coil side and an S pole side is in contact with the yoke material, and
wherein in the second magnet, the S pole side is oriented to the coil side and the N pole side is in contact with the yoke material.

8. The vibration power generator according to claim 1, wherein the spring has a first tension coil spring and a second tension coil spring that are connected to the frame and elastically support the moving body from mutually opposite directions, and
wherein Vickers hardness of the frame is equal to or less than 700.

9. The vibration power generator according to claim 1, wherein the spring elastically supports the moving body such that a gap is formed between the moving body and the coil.

10. The vibration power generator according to claim 9, wherein the spring has a first tension coil spring and a second tension coil spring that are connected to the frame and elastically support the moving body from mutually opposite directions.

11. The vibration power generator according to claim 1, wherein the coil is an air-core coil.

12. The vibration power generator according to claim 1, wherein the magnet is attached at a position shifted from an axial line of the spring, and
wherein the weight member adjusts a position of the center-of-gravity of the moving body.

13. The vibration power generator according to claim 12, wherein the weight member is a high specific gravity material having higher specific gravity than the magnet.

14. The vibration power generator according to claim 12, wherein the yoke material has a first surface on which the magnet is attached, and a second surface that is oriented to a side opposite to the first surface and on which the weight member is attached and is provided on the axial line of the spring.

15. The vibration power generator according to claim 1, further comprising:
a circuit that is fixable on a surface of the frame facing the magnet and includes a magnetic body,
wherein the magnet is movable in an expansion and contraction direction of the spring, and
wherein the circuit is fixed such that the magnetic body is located outside a range where a movable range of the magnet is projected onto the surface.

16. The vibration power generator according to claim 15, wherein the circuit is a rectifier circuit that converts generated AC power into DC power and adjusts a voltage of the DC power.

17. A vibration power generator comprising:
a coil attached to a frame; and
a moving body that is supported on the frame through a spring and has a magnet facing the coil,
the vibration power generator relatively moving the moving body with respect to the coil to generate electric power,
wherein the moving body has
the magnet,
a yoke material that is attached to the magnet and forms a magnetic circuit, and
a weight member,
wherein average specific gravity of the moving body is 8 g/cm$^3$ or more,
wherein the spring has a first tension coil spring and a second tension coil spring that are connected to the frame and elastically support the moving body from mutually opposite directions, and
wherein Vickers hardness of the frame is equal to or less than 700,
wherein the frame has a vibration input surface to which a vibration is input, a first connecting portion to which the first tension coil spring is connected, and a second connecting portion to which the second tension coil spring is connected, and
wherein the vibration input surface is connected with the first connecting portion and the second connecting portion on the frame by a material having Young's modulus that is equal to or larger than 40 GPa.

18. The vibration power generator according to claim 17, further comprising:
a first connecting member that connects the first tension coil spring to the frame in the first connecting portion; and
a second connecting member that connects the second tension coil spring to the frame in the second connecting portion,
wherein the first connecting member and the second connecting member are formed of the material having Young's modulus that is equal to or larger than 40 GPa.

19. A vibration power generator comprising:
a coil attached to a frame; and
a moving body that is supported on the frame through a spring and has a magnet facing the coil,
the vibration power generator relatively moving the moving body with respect to the coil to generate electric power,
wherein the moving body has
the magnet,
a yoke material that is attached to the magnet and forms a magnetic circuit, and
a weight member,
wherein average specific gravity of the moving body is 8 g/cm$^3$ or more,
wherein the magnet is attached at a position shifted from an axial line of the spring,
wherein the weight member adjusts a position of the center-of-gravity of the moving body,
wherein the moving body is suspended by at least four springs,
wherein two springs of the four springs extend from the moving body in a first direction and remaining two springs extend from the moving body in a second direction which is a direction opposite to the first direction, and
wherein the weight member adjusts a position of the center-of-gravity of the moving body so as to be located inside a space obtained by offsetting by a diameter of the spring in a racial direction of the spring with respect to a plane formed by connecting attachment portions of the four springs with respect to the frame.

* * * * *